(12) United States Patent
Ricketts et al.

(10) Patent No.: US 8,412,612 B2
(45) Date of Patent: Apr. 2, 2013

(54) STOCK PURCHASE INDICES

(75) Inventors: John J. Ricketts, Omaha, NE (US); Douglas F. Schumann, Omaha, NE (US)

(73) Assignee: TD AMERITRADE IP Company, Inc., Omaha, NE (US)

(*) Notice: Subject to any disclaimer, the term of this patent is extended or adjusted under 35 U.S.C. 154(b) by 0 days.

(21) Appl. No.: 13/471,214

(22) Filed: May 14, 2012

(65) Prior Publication Data

US 2012/0226633 A1    Sep. 6, 2012

Related U.S. Application Data

(62) Division of application No. 12/975,317, filed on Dec. 21, 2010, now Pat. No. 8,180,696, which is a division of application No. 11/053,349, filed on Feb. 9, 2005, now Pat. No. 7,882,005, and a division of application No. 12/202,856, filed on Sep. 2, 2008, (Continued)

(51) Int. Cl.
G06Q 40/00    (2012.01)

(52) U.S. Cl. .................................................. 705/36 R

(58) Field of Classification Search .......... 705/35, 705/36, 36 R, 37; 345/441; 340/825.27, 340/825.26; 382/159; 707/609, 711, 748, 707/752, 753
See application file for complete search history.

(56) References Cited

U.S. PATENT DOCUMENTS

| | | | |
|---|---|---|---|
| 4,554,418 A | 11/1985 | Toy | |
| 5,185,696 A * | 2/1993 | Yoshino et al. | 705/36 R |
| 5,347,452 A | 9/1994 | Bay, Jr. | |
| 5,577,166 A | 11/1996 | Mizuno | |
| 5,805,731 A * | 9/1998 | Yaeger et al. | 382/228 |
| 5,819,238 A | 10/1998 | Fernholz | |
| 5,946,666 A | 8/1999 | Nevo et al. | |
| 6,064,985 A | 5/2000 | Anderson | |
| 6,078,904 A * | 6/2000 | Rebane | 705/36 R |
| 6,195,647 B1 | 2/2001 | Martyn et al. | |
| 6,236,980 B1 | 5/2001 | Reese | |
| 6,275,814 B1 * | 8/2001 | Giansante et al. | 705/36 R |
| 6,289,321 B1 | 9/2001 | Suganuma | |
| 6,601,044 B1 | 7/2003 | Wallman | |
| 6,681,211 B1 | 1/2004 | Gatto | |

FOREIGN PATENT DOCUMENTS

| | | |
|---|---|---|
| JP | 7168806 A | 7/1995 |
| WO | WO 99/56192 | 11/1999 |

OTHER PUBLICATIONS

Myers, Randy; "What's your mutual fund really costing you?"; Nation's Business, v84,n7; Jul. 1996; pp. 1-2.*
Bach, Christopher L.; "U.S. international transactions, fourth quarter and year 1996"; Survey of Current Business, v77,n4; Apr. 1997; pp. 1-14.*

(Continued)

Primary Examiner — Ella Colbert
(74) Attorney, Agent, or Firm — Sterne, Kessler, Goldstein & Fox, P.L.L.C.

(57) ABSTRACT

A method and system for providing a stock purchase index is provided. The system receives raw customer trading data. The raw customer trading data is segregated into buy and sell data per CUSIP to determine a number of buy CUSIP shares, a number of sell CUSIP shares, a total buy CUSIP market value, a total sell CUSIP market value, a total number of buy accounts, and a total number of sell accounts. The sorted data is processed to produce a stock purchase index report, wherein the stock purchase index report is a sell weighted index. The sell weighted index is then displayed in the stock purchase index report.

3 Claims, 46 Drawing Sheets

Related U.S. Application Data now Pat. No. 7,856,391, which is a division of application No. 11/053,349, which is a division of application No. 09/414,781, filed on Oct. 8, 1999, now Pat. No. 6,901,383.

(60) Provisional application No. 60/135,143, filed on May 20, 1999.

(56) References Cited

OTHER PUBLICATIONS

McClintock, Brent; "International financial instability and the financial derivatives market"; Journal of Economic Issues, V.30, n1; Mar. 1996; pp. 1-10.*

McGafferty, Joseph; "If you can't beat'em, join'em: Why indexing strategies are gaining favor"; CFO: The Magazine for Senior Financial Executives: V12, n2; Feb. 1996; pp. 1-4.*

Dauten, Carl A. and Valentine, Lloyd M., *Business Cycles and Forecasting*, Fifth Edition, South-Western Publishing Company, 1978, Cincinnati, OH, pp. 235-240.

Schumann, Douglas F. and Turner, Keith, "A Diffusion Index Approach to the Prediction of Natural Gas Industrial Large Volume Demand," *Western Regional Science Association, WRSA $10^{th}$ Annual Meeting*, Feb. 26, 1981, Santa Barbara, CA, pp. 1-25.

Standard and Poor's Stock Guide, Aug. 1994, pp. 1-7.

Dictionary of Finance and Investment Terms, Barrons, Fifth Edition, 1998, pp. 640, 666, and 691.

Barnea, Amir, "Performance Evaluation of New York Stock Exchange Specialists," *The Journal of Financial and Quantitative Analysis*, vol. 9, No. 4, Sep. 1974, pp. 511-535.

Office Action mailed Apr. 26, 2010 in Canadian counterpart patent application No. 2,371,441.

Anonymous, "Derivatives", *EuroMoney the 1997 Guide to Switzerland Supplement*, Jun. 1997, pp. 1-7.

Siegel, Harvey, "Creating tax-efficient investment portfolios within a framework of strategic asset allocation", CPA Journal, v. 67, No. 2, Feb. 1997, pp. 1-5.

Wang, Ko, et al., "Does the REIT Stock Market Resemble the General Stock Market?", The Journal of Real Estate Research; Apr. 1995, Accepted Jun. 1995, pp. 445-460.

\* cited by examiner

BOS DATA 102

| | CUSTOMER | | HOLDINGS 404 | | TRANSACTIONS 406 | | | | | |
|---|---|---|---|---|---|---|---|---|---|---|
| ACCOUNT NO. 408 | OWNERSHIP TYPE 410 | OPEN DATE 407 | CLOSED DATE 409 | CUSIP 412 | NO. OF SHARES 414 | DATE 416 | TIME 418 | CUSIP 419 | NO. OF SHARES 420 | VALUE 422 | BUY OR SELL 424 |
| 1234 | REGULAR | 3/6/98 | | AAAA | 500 | 1/4/99 | 13:24 | AAAA | 50 | $500 | BUY |
| | | | | BBB | 1000 | 1/7/99 | 23:04 | BBB | 500 | $2,500 | BUY |
| | | | | CCC | 500 | | | | | | |
| 4534 | GOVT | 4/6/96 | | DDD | 1000 | 1/5/99 | 12:00 | BBB | 400 | $4,000 | SELL |
| | | | | FFF | 2500 | | | | | | |
| 5560 | IRA | 1/30/97 | | AAA | 1000 | 3/24/99 | 11:21 | FFF | 250 | $2,500 | SELL |
| 6978 | REGULAR | 4/3/95 | | CCC | 400 | 1/5/99 | 14:24 | AAAA | 100 | $1,000 | SELL |
| 7210 | REGULAR | 5/16/93 | | FFF | 1000 | 1/5/99 | 14:24 | AAAA | 100 | $1,000 | BUY |
| 9921 | REGULAR | 6/7/93 | | CCC | 500 | 1/5/99 | 9:34 | AAAA | 1000 | $10,000 | BUY |
| | | | | | | 1/5/99 | 13:44 | AAAA | 1000 | $15,000 | SELL |
| 4523 | REGULAR | 5/23/91 | | EEE | 2000 | 1/5/99 | 16:45 | CCC | 300 | $6,000 | BUY |
| 8500 | GOVT | 7/30/90 | | GGG | 700 | 4/18/99 | 13:23 | GGG | 200 | $1,400 | SELL |
| 3980 | REGULAR | 5/3/98 | | GGG | 350 | 1/5/99 | 23:59 | CCC | 300 | $6,000 | SELL |
| 2583 | REGULAR | 7/6/97 | | CMQ | 5000 | 1/4/99 | 9:09 | SSS | 450 | $9,000 | BUY |
| | | | | AAAA | 3000 | 1/5/99 | 10:12 | BBB | 50 | $1,000 | BUY |
| 4266 | REGULAR | 5/4/98 | | CMQ | 500 | 1/5/99 | 7:00 | AAAA | 200 | $2,000 | BUY |
| | | | | | | 1/5/99 | 8:10 | AAAA | 250 | $2,250 | BUY |
| | | | | | | 5/12/99 | 6:30 | BBB | 300 | $3,300 | SELL |
| ... | ... | ... | | ... | ... | | | | | | |
| 1988 | REGULAR | 6/7/98 | | AAAA | 300 | 1/5/99 | 3:46 | GGG | 200 | $4,000 | SELL |

TOTAL AND STOCK COUNTS DATA 106

| DATE 416 | CUSIP 419 | BUY OR SELL 424 | NO. OF ACCOUNTS 502 | NO. OF ORDERS 504 | NO. OF SHARES 506 | VALUE 508 |
|---|---|---|---|---|---|---|
| 1/4/99 | AAAA | BUY | 3 | 4 | 400 | $4,000 |
| 1/4/99 | BBB | BUY | 2 | 2 | 2000 | $8,000 |
| 1/4/99 | CCC | BUY | 1 | 1 | 1000 | $1,000 |
| 1/4/99 TOTAL BUY COUNTS 510 | | | 6 | 7 | 1600 | $22,000 |
| 1/4/99 | AAAA | SELL | 2 | 2 | 2000 | $18,000 |
| 1/4/99 | BBB | SELL | 3 | 4 | 2000 | $10,000 |
| 1/4/99 | CCC | SELL | 1 | 1 | 1500 | $1,500 |
| 1/4/99 TOTAL SELL COUNTS 512 | | | 6 | 7 | 5500 | $29,500 |
| 1/5/99 | AAAA | BUY | 1 | 1 | 355 | $3,195 |
| 1/5/99 | BBB | BUY | 2 | 2 | 2000 | $23,000 |
| 1/5/99 TOTAL BUY COUNTS | | | | | | |
| 1/5/99 | AAA | SELL | 1 | 1 | 350 | $3,500 |
| 1/5/99 | BBB | SELL | 1 | 1 | 100 | $150 |
| 1/5/99 TOTAL SELL COUNTS | | | ... | ... | ... | ... |

FIG.5

PERIODS MOVING INDEX DATA 110

| 602 | 604 | 416 | 606 | 608 | 610 | 612 | 614 | 616 | 618 | 620 | 622 | 624 | 626 | 628 | 630 | 632 |
|---|---|---|---|---|---|---|---|---|---|---|---|---|---|---|---|---|
| SERIES | PERIOD | DATE | NO. OF BUY ACCOUNTS | NO. OF SELL ACCOUNTS | NO. OF BUY ORDERS | NO. OF SELL ORDERS | NO. OF SHARES BOUGHT | NO. OF SHARES SOLD | TOTAL VALUE BOUGHT | TOTAL VALUE SOLD | BUY WEIGHT | SELL WEIGHT | BUY SIMPLE INDEX | SELL SIMPLE INDEX | BUY WEIGHTED INDEX | SELL WEIGHTED INDEX |
| DAILY | 1 | 1/4/99 | 6 | 4 | 7 | 7 | 1,600 | 3,400 | $22,000 | $16,000 | 39 | 28 | 60% | 40% | 58% | 42% |
| DAILY | 1 | 1/5/99 | 5 | 6 | 5 | 7 | 5,000 | 5,500 | $17,000 | $29,500 | 17 | 34 | 45% | 55% | 34% | 66% |
| DAILY | 1 | 1/6/99 | 11 | 12 | 13 | 12 | 1,800 | 2,200 | $9,000 | $9,400 | 74 | 78 | 48% | 52% | 49% | 51% |
| DAILY | 1 | 1/7/99 | 7 | 6 | 7 | 8 | 3,500 | 3,500 | $25,000 | $25,000 | 37 | 36 | 53% | 47% | 50% | 50% |
| DAILY | 1 | 1/8/99 | 8 | 11 | 12 | 9 | 1,900 | 2,200 | $12,100 | $11,800 | 65 | 53 | 42% | 58% | 55% | 45% |
| ... | 1 | 1/11/99 | ... | ... | ... | ... | ... | ... | ... | ... | ... | ... | ... | ... | ... | ... |
| WEEKLY | 1 | 1/8/99 | 37 | 39 | 44 | 43 | 13,800 | 16,800 | $85,100 | $91,700 | 232 | 229 | 49% | 51% | 50% | 50% |
| WEEKLY | 1 | 1/15/99 | ... | ... | ... | ... | ... | ... | ... | ... | ... | ... | ... | ... | ... | ... |
| WEEKLY | 1 | 1/22/99 | ... | ... | ... | ... | ... | ... | ... | ... | ... | ... | ... | ... | ... | ... |
| WEEKLY | 1 | 1/29/99 | ... | ... | ... | ... | ... | ... | ... | ... | ... | ... | ... | ... | ... | ... |
| WEEKLY | 1 | 2/5/99 | ... | ... | ... | ... | ... | ... | ... | ... | ... | ... | ... | ... | ... | ... |

FIG. 6

PERIODS STOCK RANKING DATA 112

| | 604 | 416 | 419 | 606 | 608 | 610 | 612 | 614 | 616 | 702 | 704 | 618 | 620 | 622 | 624 | 706 | 708 | 710 | 712 |
|---|---|---|---|---|---|---|---|---|---|---|---|---|---|---|---|---|---|---|---|
| SERIES 602 | PERIOD | DATE | CUSIP | NO. OF BUY ACCOUNTS | NO. OF SELL ACCOUNTS | NO. OF BUY ORDERS | NO. OF SELL ORDERS | NO. OF SHARES BOUGHT | NO. OF SHARES SOLD | AVG. BUY PRICE | AVG. SELL PRICE | TOTAL VALUE BOUGHT | TOTAL VALUE SOLD | BUY WEIGHT | SELL WEIGHT | BUY SIMPLE RANK | SELL SIMPLE RANK | BUY WEIGHTED RANK | SELL WEIGHTED RANK |
| DAILY | 1 | 1/4/99 | AAA | 3 | 2 | 4 | 4 | 400 | 400 | 10 | 10 | $4,000 | $4,000 | 30 | 20 | 30% | 20% | 45% | 30% |
| DAILY | 1 | 1/4/99 | BBB | 2 | 2 | 2 | 3 | 2,000 | 3,000 | 4 | 4 | $8,000 | $12,000 | 8 | 8 | 20% | 20% | 12% | 12% |
| DAILY | 1 | 1/4/99 | CCC | 1 | 0 | 1 | 0 | 1,000 | 0 | 1 | 1 | $1,000 | $0 | 1 | 0 | 10% | 0% | 1% | 0% |
| DAILY | 1 | 1/5/99 | AAA | 0 | 2 | 0 | 2 | 0 | 2,000 | 9 | 9 | $0 | $18,000 | 0 | 18 | 0% | 18% | 0% | 35% |
| DAILY | 1 | 1/5/99 | BBB | 3 | 3 | 3 | 4 | 3,000 | 2,000 | 5 | 5 | $15,000 | $10,000 | 15 | 15 | 27% | 27% | 29% | 29% |
| DAILY | 1 | 1/5/99 | CCC | 2 | 1 | 2 | 1 | 2,000 | 1,500 | 1 | 1 | $2,000 | $1,500 | 2 | 1 | 18% | 10% | 5% | 2% |
| DAILY | 1 | 1/6/99 | AAA | 6 | 6 | 6 | 6 | 600 | 600 | 11 | 11 | $6,600 | $6,600 | 66 | 66 | 26% | 26% | 43% | 43% |
| DAILY | 1 | 1/6/99 | BBB | 1 | 2 | 2 | 2 | 400 | 400 | 4 | 4 | $1,600 | $1,600 | 4 | 8 | 5% | 9% | 3% | 5% |
| DAILY | 1 | 1/6/99 | CCC | 4 | 4 | 5 | 4 | 800 | 1,200 | 1 | 1 | $800 | $1,200 | 4 | 4 | 17% | 17% | 3% | 3% |
| DAILY | 1 | 1/7/99 | AAA | 3 | 3 | 3 | 4 | 2,000 | 2,000 | 10 | 10 | $20,000 | $20,000 | 30 | 30 | 23% | 23% | 41% | 41% |
| DAILY | 1 | 1/7/99 | BBB | 1 | 1 | 1 | 2 | 500 | 500 | 4 | 4 | $2,000 | $2,000 | 4 | 4 | 7% | 7% | 6% | 6% |
| DAILY | 1 | 1/7/99 | CCC | 3 | 2 | 3 | 2 | 1,000 | 1,000 | 3 | 3 | $3,000 | $3,000 | 3 | 2 | 23% | 16% | 3% | 3% |
| DAILY | 1 | 1/8/99 | AAA | 5 | 3 | 7 | 3 | 700 | 600 | 11 | 11 | $7,700 | $6,600 | 55 | 33 | 26% | 16% | 46% | 28% |
| DAILY | 1 | 1/8/99 | BBB | 2 | 1 | 2 | 2 | 1,000 | 1,000 | 4 | 4 | $4,000 | $4,000 | 8 | 8 | 11% | 11% | 7% | 7% |
| DAILY | 1 | 1/8/99 | CCC | 1 | 6 | 3 | 4 | 200 | 600 | 2 | 2 | $400 | $1,200 | 2 | 12 | 5% | 31% | 2% | 10% |
| DAILY | 1 | 1/11/99 | AAA | ... | ... | ... | ... | ... | ... | ... | ... | ... | ... | ... | ... | ... | ... | ... | ... |

FIG.7A

PERIODS STOCK RANKING DATA 112

| 602 | 604 | 416 | 419 | 606 | 608 | 610 | 612 | 614 | 616 | 702 | 704 | 618 | 620 | 622 | 624 | 706 | 708 | 710 | 712 |
|---|---|---|---|---|---|---|---|---|---|---|---|---|---|---|---|---|---|---|---|
| SERIES | PERIOD | DATE | CUSIP | NO. OF BUY ACCOUNTS | NO. OF SELL ACCOUNTS | NO. OF BUY ORDERS | NO. OF SELL ORDERS | NO. OF SHARES BOUGHT | NO. OF SHARES SOLD | AVG. BUY PRICE | AVG. SELL PRICE | TOTAL VALUE BOUGHT | TOTAL VALUE SOLD | BUY WEIGHT | SELL WEIGHT | BUY SIMPLE RANK | SELL SIMPLE RANK | BUY WEIGHTED RANK | SELL WEIGHTED RANK |
| DAILY | 1 | 1/11/99 | BBB | ... | ... | ... | ... | ... | ... | ... | ... | ... | ... | ... | ... | ... | ... | ... | ... |
| DAILY | 1 | 1/11/99 | CCC | ... | ... | ... | ... | ... | ... | ... | ... | ... | ... | ... | ... | ... | ... | ... | ... |
| ... | ... | ... | ... | ... | ... | ... | ... | ... | ... | ... | ... | ... | ... | ... | ... | ... | ... | ... | ... |
| WEEKLY | 1 | 1/8/99 | AAA | ... | ... | ... | ... | ... | ... | ... | ... | ... | ... | ... | ... | ... | ... | ... | ... |
| WEEKLY | 1 | 1/22/99 | AAA | ... | ... | ... | ... | ... | ... | ... | ... | ... | ... | ... | ... | ... | ... | ... | ... |
| WEEKLY | 1 | 1/29/99 | AAA | ... | ... | ... | ... | ... | ... | ... | ... | ... | ... | ... | ... | ... | ... | ... | ... |
| WEEKLY | 1 | 2/5/99 | AAA | ... | ... | ... | ... | ... | ... | ... | ... | ... | ... | ... | ... | ... | ... | ... | ... |

FIG. 7B

| 602 | 604 | 416 | 419 | 606 | 608 | 610 | 612 | 614 | 616 | 702 | 704 | 618 | 620 | 622 | 624 | 706 | 708 | 710 | 712 |
|---|---|---|---|---|---|---|---|---|---|---|---|---|---|---|---|---|---|---|---|
| SERIES | PERIOD | DATE | CUSIP | NO. OF BUY ACCOUNTS | NO. OF SELL ACCOUNTS | NO. OF BUY ORDERS | NO. OF SELL ORDERS | NO. OF SHARES BOUGHT | NO. OF SHARES SOLD | AVG. BUY PRICE | AVG. SELL PRICE | TOTAL VALUE BOUGHT | TOTAL VALUE SOLD | BUY WEIGHT | SELL WEIGHT | BUY SIMPLE RANK | SELL SIMPLE RANK | BUY WEIGHTED RANK | SELL WEIGHTED RANK |
| DAILY | 1 | 1/4/99 | AAA | 3 | 2 | 4 | 4 | 400 | 400 | 10 | 10 | $4,000 | $4,000 | 30 | 20 | 30% | 20% | 45% | 30% |
| DAILY | 1 | 1/4/99 | BBB | 2 | 2 | 2 | 3 | 2,000 | 3,000 | 4 | 4 | $8,000 | $12,000 | 8 | 8 | 20% | 20% | 12% | 12% |
| DAILY | 1 | 1/4/99 | CCC | 1 | 0 | 1 | 0 | 1,000 | 0 | 1 | - | $1,000 | $0 | 1 | 0 | 10% | 0% | 1% | 0% |
| DAILY | 1 | 1/4/99 | TOTAL | 6 | 4 | 7 | 7 | 1,600 | 3,400 | - | - | $22,000 | $16,000 | 39 | 28 | BUY SIMPLE INDEX 626 60% | SELL SIMPLE INDEX 628 40% | BUY WEIGHTED INDEX 630 58% | SELL WEIGHTED INDEX 632 42% |
| DAILY | 1 | 1/5/99 | AAA | 0 | 2 | 0 | 2 | 0 | 2,000 | - | 9 | $0 | $18,000 | 0 | 18 | 0% | 18% | 0% | 35% |
| DAILY | 1 | 1/5/99 | BBB | 3 | 3 | 3 | 4 | 3,000 | 2,000 | 5 | 5 | $15,000 | $10,000 | 15 | 15 | 27% | 27% | 29% | 29% |
| DAILY | 1 | 1/5/99 | CCC | 2 | 1 | 2 | 1 | 2,000 | 1,500 | 1 | 1 | $2,000 | $1,500 | 2 | 1 | 18% | 9% | 4% | 2% |
| DAILY | 1 | 1/5/99 | TOTAL | 5 | 6 | 5 | 7 | 5,000 | 5,500 | - | - | $17,000 | $29,500 | 17 | 34 | BUY SIMPLE INDEX 45% | SELL SIMPLE INDEX 54% | BUY WEIGHTED INDEX 33% | SELL WEIGHTED INDEX 66% |
| DAILY | 1 | 1/6/99 | AAA | 6 | 6 | 6 | 6 | 600 | 600 | 11 | 11 | $6,600 | $6,600 | 66 | 66 | 26% | 26% | 43% | 43% |
| DAILY | 1 | 1/6/99 | BBB | 1 | 2 | 2 | 2 | 400 | 400 | 4 | 4 | $1,600 | $1,600 | 4 | 8 | 4% | 9% | 3% | 5% |
| DAILY | 1 | 1/6/99 | CCC | 4 | 4 | 5 | 4 | 800 | 1,200 | 1 | 1 | $800 | $1,200 | 4 | 4 | 17% | 17% | 3% | 3% |
| DAILY | 1 | 1/6/99 | TOTAL | 11 | 12 | 13 | 12 | 1,800 | 2,200 | - | - | $9,000 | $9,400 | 74 | 78 | BUY SIMPLE INDEX 47% | SELL SIMPLE INDEX 52% | BUY WEIGHTED INDEX 49% | SELL WEIGHTED INDEX 51% |

FIG.12A

| 602 | 604 | 416 | 419 | 606 | 608 | 610 | 612 | 614 | 616 | 702 | 704 | 618 | 620 | 622 | 624 | 706 | 708 | 710 | 712 |
|---|---|---|---|---|---|---|---|---|---|---|---|---|---|---|---|---|---|---|---|
| SERIES | PERIOD | DATE | CUSIP | NO. OF BUY ACCOUNTS | NO. OF SELL ACCOUNTS | NO. OF BUY ORDERS | NO. OF SELL ORDERS | NO. OF SHARES BOUGHT | NO. OF SHARES SOLD | AVG. BUY PRICE | AVG. SELL PRICE | TOTAL VALUE BOUGHT | TOTAL VALUE SOLD | BUY WEIGHT | SELL WEIGHT | BUY SIMPLE RANK | SELL SIMPLE RANK | BUY WEIGHTED RANK | SELL WEIGHTED RANK |
| DAILY | 1 | 1/7/99 | AAA | 3 | 3 | 3 | 4 | 2,000 | 2,000 | 10 | 10 | $20,000 | $20,000 | 30 | 30 | 23% | 23% | 36% | 36% |
| DAILY | 1 | 1/7/99 | BBB | 1 | 1 | 1 | 2 | 500 | 500 | 4 | 4 | $2,000 | $2,000 | 4 | 4 | 8% | 8% | 5% | 5% |
| DAILY | 1 | 1/7/99 | CCC | 3 | 2 | 3 | 2 | 1,000 | 1,000 | 3 | 3 | $3,000 | $3,000 | 9 | 6 | 23% | 15% | 11% | 7% |
| DAILY | 1 | 1/7/99 | TOTAL | 7 | 6 | 7 | 8 | 3,500 | 3,500 | — | — | $25,000 | $25,000 | 43 | 40 | BUY SIMPLE INDEX 626 54% | SELL SIMPLE INDEX 628 46% | BUY WEIGHTED INDEX 630 52% | SELL WEIGHTED INDEX 632 46% |
| DAILY | 1 | 1/8/99 | AAA | 5 | 3 | 7 | 3 | 700 | 600 | 11 | 11 | $7,700 | $6,600 | 55 | 33 | 26% | 16% | 47% | 28% |
| DAILY | 1 | 1/8/99 | BBB | 2 | 2 | 2 | 4 | 1,000 | 1,000 | 4 | 4 | $4,000 | $4,000 | 8 | 8 | 11% | 11% | 7% | 7% |
| DAILY | 1 | 1/8/99 | CCC | 1 | 6 | 3 | 2 | 200 | 600 | 2 | 2 | $480 | $1,200 | 2 | 12 | 5% | 32% | 2% | 10% |
| DAILY | 1 | 1/8/99 | TOTAL | 8 | 11 | 12 | 9 | 1,900 | 2,200 | — | — | $12,100 | $11,800 | 65 | 53 | BUY SIMPLE INDEX 42% | SELL SIMPLE INDEX 59% | BUY WEIGHTED INDEX 56% | SELL WEIGHTED INDEX 45% |
| DAILY | 1 | 1/11/99 | AAA | | | | | | | | | | | | | | | | |
| DAILY | 1 | 1/11/99 | BBB | | | | | | | | | | | | | | | | |
| DAILY | 1 | 1/11/99 | CCC | | | | | | | | | | | | | | | | |
| DAILY | 1 | 1/11/99 | TOTAL | | | | | | | | | | | | | | | | |

FIG. 12B

Figure 12C:
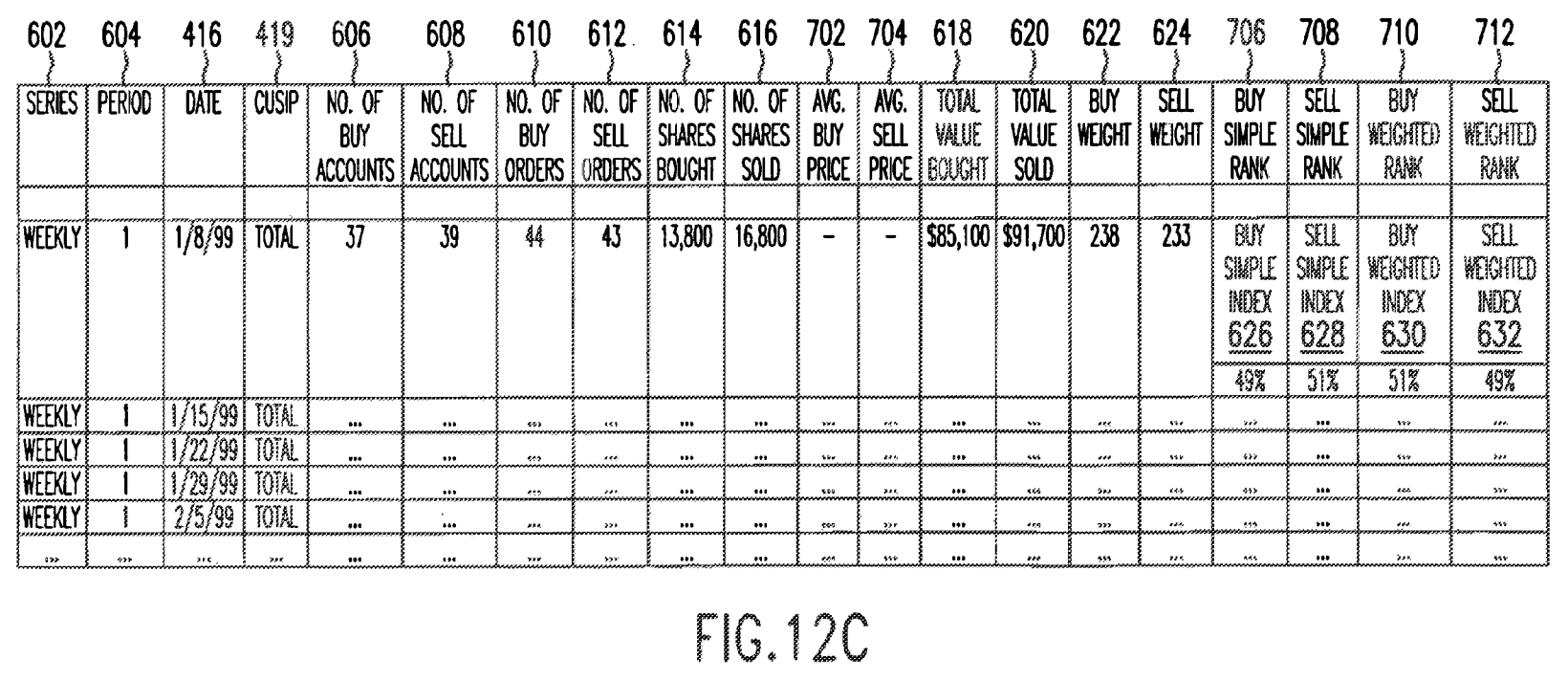

| 602 | 604 | 416 | 419 | 606 | 608 | 610 | 612 | 614 | 616 | 702 | 704 | 618 | 620 | 622 | 624 | 706 | 708 | 710 | 712 |
|---|---|---|---|---|---|---|---|---|---|---|---|---|---|---|---|---|---|---|---|
| SERIES | PERIOD | DATE | CUSIP | NO. OF BUY ACCOUNTS | NO. OF SELL ACCOUNTS | NO. OF BUY ORDERS | NO. OF SELL ORDERS | NO. OF SHARES BOUGHT | NO. OF SHARES SOLD | AVG. BUY PRICE | AVG. SELL PRICE | TOTAL VALUE BOUGHT | TOTAL VALUE SOLD | BUY WEIGHT | SELL WEIGHT | BUY SIMPLE RANK | SELL SIMPLE RANK | BUY WEIGHTED RANK | SELL WEIGHTED RANK |
| WEEKLY | 1 | 1/8/99 | TOTAL | 37 | 39 | 44 | 43 | 13,800 | 16,800 | - | - | $85,100 | $91,700 | 238 | 233 | BUY SIMPLE INDEX 626 | SELL SIMPLE INDEX 628 | BUY WEIGHTED INDEX 630 | SELL WEIGHTED INDEX 632 |
|  |  |  |  |  |  |  |  |  |  |  |  |  |  |  |  | 49% | 51% | 51% | 49% |
| WEEKLY | 1 | 1/15/99 | TOTAL | ... | ... | ... | ... | ... | ... | ... | ... | ... | ... | ... | ... | ... | ... | ... | ... |
| WEEKLY | 1 | 1/22/99 | TOTAL | ... | ... | ... | ... | ... | ... | ... | ... | ... | ... | ... | ... | ... | ... | ... | ... |
| WEEKLY | 1 | 1/29/99 | TOTAL | ... | ... | ... | ... | ... | ... | ... | ... | ... | ... | ... | ... | ... | ... | ... | ... |
| WEEKLY | 1 | 2/5/99 | TOTAL | ... | ... | ... | ... | ... | ... | ... | ... | ... | ... | ... | ... | ... | ... | ... | ... |

FIG. 12C $$\text{Weighted Moving Average} = \left[ \sum_{i=1}^{k} \left( \text{Index}_{(k-i+1)} * \text{Investors}_{(k-i+1)} \right) \right] / \left[ \sum_{i=1}^{k} \left( \text{Investors}_{(k-i+1)} \right) \right];$$

where: k = period
= 1, 5, 9, and 21.

FIG. 13

| | 1502 | 1504 | 1506 | 1508 | 1510 | 1512 |
|---|---|---|---|---|---|---|
| | SERIES | PERIOD | DATE | NO. OF BUY ACCOUNTS | NO. OF SELL ACCOUNTS | BUY SIMPLE INDEX |
| | DAILY | 1 | 1/4/99 | 6 | 4 | 60% |
| | DAILY | 1 | 1/5/99 | 5 | 6 | 45% |
| | DAILY | 1 | 1/6/99 | 11 | 12 | 48% |
| | DAILY | 1 | 1/7/99 | 7 | 6 | 53% |
| | DAILY | 1 | 1/8/99 | 8 | 11 | 42% |
| | DAILY | 1 | 1/11/99 | 9 | 7 | 56% |
| | ... | ... | ... | ... | ... | ... |
| 1514 | 5-DAY AVERAGE | 1 | 1/8/99 | 37 | 39 | 49% |
| 1516 | 5-DAY AVERAGE | 1 | 1/11/99 | 40 | 42 | 49% |
| | ... | ... | ... | ... | ... | ... |

FIG. 15

STOCK DESCRIPTION DATA 3502

| 412 | 3604 | 3606 | 3608 | CAPITALIZATION 3612 3610 | |
|---|---|---|---|---|---|
| CUSIP | CUSIP COMPANY | EXCHANGE | SECTOR | MARKET VALUE | LEVEL ~3614 |
| AAAA | A & A INDUSTRIES | NASDAQ | E COMMERCE | $3,300,000,000 | MID |
| BBB | BILL FISH, INC. | NEW YORK STOCK | COMMUNICATION | $9,600,000,000 | HIGH |
| CCC | C & C COMPUTERS, INC. | NASDAQ | E COMMERCE | $3,500,000,000 | MID |
| DDD | DEN AND DOUD, INC. | NASDAQ | E COMMERCE | $2,900,000,000 | MID |
| ... | ... | ... | ... | ... | ... |

FIG.36

FILTER CONTROLS DATA 3504

| USER | FILTER NAME | STOCK SELECTION 3708 | | | FILTER SELECTIONS 3706 | | | SERIES TYPE 3710 | GRAPHICAL DISPLAY START DATE 3711 | INDEX MEASURE 3712 | BASE SMOOTHING PERIOD LENGTH 3714 | COMPARISON SMOOTHING PERIOD LENGTH 3716 | ENDING DATE 3718 | LENGTH OF TIME FOR CHANGE MEASUREMENT 3720 |
|---|---|---|---|---|---|---|---|---|---|---|---|---|---|---|
| 3702 3704 | | EXCHANGE 3606 | SECTOR 3608 | CUSTOMER SEGMENT 3756 | | | | | | | | | | |
| | | | | COUNTRY INVESTING IN 3758 | AGE GROUP 3760 | INVESTMENT ORIENTATION 3762 | | | | | | | |
| JOHN DOE | HIGH TECH | NEW YORK STOCK | E COMMERCE | USA | 18-35 | RETIREMENT | DAILY | 1/3/97 | BUY SIMPLE INDEX | 5 | 9 | 1/8/99 | 1 |
| BOB SMITH | INDUSTRY | NEW YORK STOCK | E COMMERCE | USA | 18-35 | MAIN INCOME | WEEKLY | 1/3/97 | SELL SIMPLE INDEX | 5 | 9 | 1/8/99 | 1 |
| JIM SWIFT | HIGH TECH | NASDAQ | COMMUNICATION | GERMANY | 60+ | RETIREMENT | WEEKLY | 1/3/97 | SELL WEIGHTED INDEX | 5 | 21 | 3/30/99 | 2 |
| ... | | ... | ... | ... | ... | ... | ... | ... | ... | ... | ... | ... | ... |

FIG. 37A

FILTER CONTROLS DATA 3504

| NO. OF STOCKS TO LIST 3722 | FILTER SELECTIONS 3706 ||||||||||| |
|---|---|---|---|---|---|---|---|---|---|---|---|
| | FIRST STOCK LISTING SELECTION CONTROLS 3724 |||| SECOND STOCK LISTING SELECTION CONTROLS 3726 |||| FIRST STOCK RANKING SELECTION CRITERIA 3728 | SECOND STOCK RANKING SELECTION CRITERIA 3730 | COMPARATIVE INDEX SELECTION 3732 | SERIES AND SMOOTHING SELECTIONS FOR COMPARATIVE INDEX 3734 |
| | LISTING SELECTION 3736 | PERIOD LENGTH 3738 | SERIES TYPE 3740 | END DATE 3742 | LISTING SELECTION 3744 | PERIOD LENGTH 3746 | SERIES TYPE 3748 | END DATE 3750 | | | | |
| 10 | BUYS | 5 | WEEKLY | 1/8/99 | BUYS | 9 | DAILY | 4/8/99 | BUY SIMPLE RANK | SELL SIMPLE RANK | BIOTECH | WEEKLY, 1 |
| 15 | SELLS | 9 | DAILY | 8/3/98 | BUYS | 21 | WEEKLY | 8/3/98 | SELL SIMPLE RANK | SELL SIMPLE RANK | BIOTECH | WEEKLY, 5 |
| 10 | SELLS | 9 | DAILY | 1/8/99 | SELLS | 21 | DAILY | 1/8/99 | BUY SIMPLE RANK | BUY SIMPLE RANK | US HIGH TECH | DAILY, 5 |
| ... | ... | ... | ... | ... | ... | ... | ... | ... | ... | ... | ... | ... |

FIG. 37B

ALERT CONTROLS DATA 3506

| USER 3702 | USER EMAIL ADDRESS 3802 | FILTERS SELECTED 3804 | ALERT NAME 3806 | CHANGE MEASUREMENT 3810 | | TYPE OF ALERT 3808 | | GAP MEASUREMENT 3812 | |
|---|---|---|---|---|---|---|---|---|---|
| | | | | ACTUAL PERCENT CHANGE 3814 | PERCENT BASE CHANGE 3816 | CONSISTENCY 3818 | GAP SIZE 3820 | CHANGE COMPARED TO PRIOR GAP 3822 | CONSISTENCY 3824 |
| JOHN DOE | Johnd@xx.com | HIGH TECH | WIDE GAP ALERT | -- | -- | 5 | .05 | .03 | -- |
| BOB SMITH | BSmith@yy.com | HIGH TECH | STOCK ALERT | .03 | .05 | -- | -- | -- | 7 |
| JIM SWIFT | js@zz.com | HIGH TECH | STOCK ALERT | -- | .30 | 7 | -- | .30 | 6 |
| ... | ... | ... | ... | ... | ... | ... | ... | ... | ... |

FIG.38

STOCK PURCHASE INDICES

CROSS-REFERENCE TO RELATED APPLICATIONS

This application is a divisional of U.S. application Ser. No. 12/975,317, filed Dec. 21, 2010. U.S. application Ser. No. 12/975,317 is a divisional of U.S. application Ser. No. 11/053,349, filed Feb. 9, 2005, and Ser. No. 12/202,856, filed Sep. 2, 2008, which is also a divisional of U.S. application Ser. No. 11/053,349. U.S. application Ser. No. 11/053,349 is a divisional of U.S. application Ser. No. 09/414,781, filed Oct. 8, 1999, now U.S. Pat. No. 6,901,383, issued May 31, 2005, which claims benefit to U.S. Provisional Application No. 60/135,143, filed May 20, 1999, all of which are incorporated by reference herein in their entirety.

BACKGROUND OF THE INVENTION

1. Field of the Invention

The present invention relates to the field of information processing. More particularly, the present invention is a system and method that generates a diffusion index for measuring the breadth of individual investor participation in the stock market.

2. Related Art

An index is a statistical composite that is used to indicate the performance of a market or a market sector over various time periods. Examples of indices that are used to gauge the performance of stocks and other securities in the United States include the Dow Jones Industrial Average, the National Association of Securities Dealers Automated Quotations (NASDAQ) Composite Index, the New York Stock Exchange Composite Index, etc. In general, the Dow Jones. Industrial Average contains thirty (30) stocks that trade on the New York Stock Exchange and is a general indicator of how shares of the largest United States companies are trading. The NASDAQ Composite Index is a composite index of more than three thousand (3,000) companies listed on the NASDAQ (also referred to as over-the-counter or OTC stocks). It is designed to indicate the stock performance of small-cap and technology stocks. Finally, the New York Stock Exchange Composite index is a composite index of shares listed on the New York Stock Exchange.

All of the above-listed stock market indices are related to changes in the price of the securities included in the particular index. What is needed is an economic indicator that, measures investor confidence and participation in buying stocks rather than the value of stocks and which stocks are being traded. What is further needed is an indicator that focuses on how the participation rate of investors varies over time.

SUMMARY OF THE INVENTION

The present invention satisfies the above-mentioned needs by providing a method and system for determining investor participation driven securities trades indices, generally known as stock purchase indices. Raw customer trading data is received from an accounting system. The raw customer trading data is then aggregated to generate daily transaction total counts for all stocks (that is, total shares bought and sold, total market value, etc.) as well as daily transaction total counts for each individual stock. Aggregation of the raw customer data also addresses customer privacy concerns. The aggregated data is processed to produce moving averages, stock purchase indices, and stock rankings. The stock purchase indices are based on a diffusion index technique of segregating buyers from sellers, and with these relative counts, measure investor purchasing participation. The stock purchase indices are then displayed to a graphical user interface. The display includes stock buy and sell ranking lists.

The stock purchase indices of the present invention include a buy simple index, a sell simple index, a buy weighted index, and a sell weighted index.

Further features and advantages of the invention, as well as the structure and operation of various embodiments of the invention, are described in detail below with reference to the accompanying drawings.

BRIEF DESCRIPTION OF THE FIGURES

The features, objects, and advantages of the present invention will become more apparent from the detailed description set forth below when taken in conjunction with the drawings in which like reference characters identify corresponding elements throughout. In the drawings, like reference numbers generally indicate identical, functionally similar, and/or structurally similar elements. The drawings in which an element first appears is indicated by the leftmost digit(s) in the corresponding reference number.

FIG. 4 is a diagram illustrating an exemplary back office accounting database.

FIG. 5 is a diagram illustrating an exemplary total and stock count database.

FIG. 6 is a diagram illustrating an exemplary moving index database.

FIGS. 7A and 7B are diagrams illustrating an exemplary stock ranking database.

FIGS. 12A, 12B, and 12C are diagrams illustrating an example of how the buy simple index and sell simple index are determined.

FIG. 13 represents a formula for determining moving index averages.

FIG. 15 is a diagram illustrating an example of how a moving index average is determined.

FIG. 36 is a diagram illustrating exemplary stock description data found in the reporting controls database.

FIG. 37A and B are diagrams illustrating exemplary filter controls data found in the reporting controls database.

FIG. 38 is a diagram illustrating exemplary alert controls data found in the reporting controls database.

DETAILED DESCRIPTION OF THE PREFERRED EMBODIMENTS

Table of Contents

I. Overview of The Present Invention
II. Databases of The Present Invention
   A. Back Office System (BOS) Database
   B. Total and Stock Counts Database
   C. Periods Moving Index Database
   D. Periods Stock Ranking Database
   E. Other Index Database
   F. Reporting Controls Database
III. General System Operation
   A. Aggregator: Creation of Total and Stock Counts Database
   B. Moving Average Generator: Creation of Buy Simple Index and Sell Simple Index
   C. Moving Average Generator: Creation of Buy Simple Rank, Sell Simple Rank, Buy Weighted Index and Sell Weighted Index
   D. Moving Average Generator: Creation of Buy Weighted Rank and Sell Weighted Rank
   E. Smoothing Techniques
   F. Time Series Analysis
IV. Graphical User Interface
V. Environment
VI. Conclusion

I. OVERVIEW OF THE PRESENT INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

The present invention is directed towards a system and method for providing securities trades indices, generally known as stock purchase indices, based on investor participation. The stock purchase indices measure the participation rates of who is buying and selling stocks rather than the value of what is being bought or sold. The method of construction combines economic analysis with technical stock market analysis techniques. The present invention is a tool for identifying periods when investors are exhibiting confidence in the economy and identifying companies in which investor confidence is being demonstrated by the purchase of their stocks. This is especially important in times of general economic uncertainty, unfavorable national and international news, and falling stock prices.

The stock purchase indices of the present invention are based on a diffusion index model that measures investor purchasing participation. The stock purchase indices of the present invention measure what percentage of customers are meeting a selected criteria of executing a buy order versus a sell order.

Figure 1:
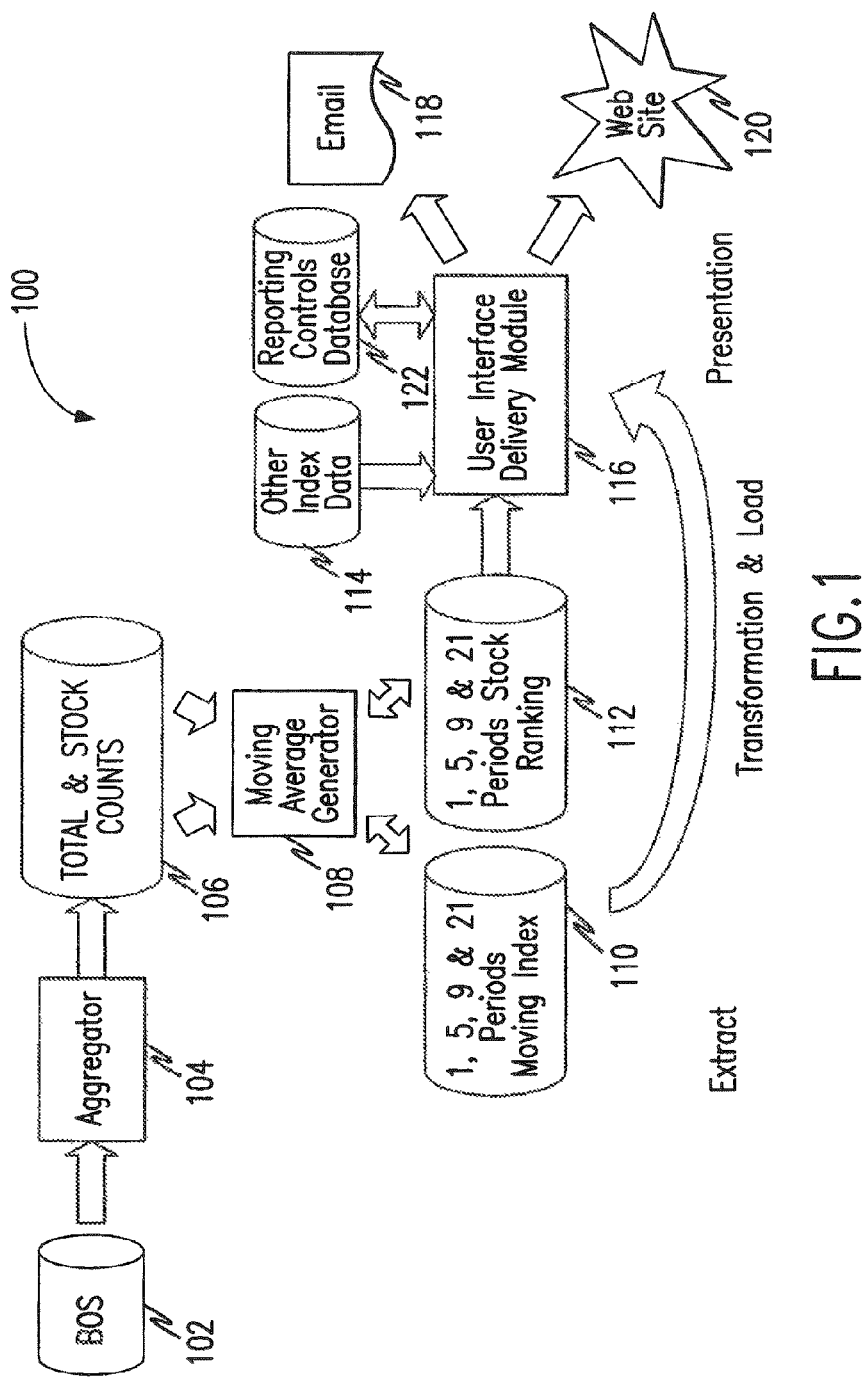
FIG. 1 is a data flow diagram illustrating the process for determining stock purchase indices of the present invention.

FIG. 1 is a data flow diagram 100 illustrating the process for determining the stock purchase indices of the present invention. Data flow diagram 100 comprises a back office accounting system (BOS) 102, an aggregator 104, a moving average generator 108, a user interface delivery module 116, and a plurality of databases 106, 110, 112, 114, and 122. Data flow diagram 100 also comprises stock purchase reports in the form of email 118 and web site 120 delivery.

BOS 102 contains customer records for investor transactions and holdings. BOS 102 is used to generate trade confirmations, monthly statements, and to satisfy government reporting requirements. Raw customer data is extracted from BOS 102 and sent to aggregator 104.

Aggregator 104 extracts and summarizes the raw customer data to obtain daily transaction total counts for all stocks bought and sold (that is, total number of accounts and orders, total number of shares bought and sold, total market value, etc.) and daily transaction counts for each individual stock bought and sold for determining stock purchase indices. Aggregator 104 also acts as a protective shield to address the privacy concerns of the customers. A more detailed description of aggregator 104 is described below with reference to FIG. 8. Database 106 is used to store each day's transaction total counts and individual stock counts data generated by aggregator 104.

In a preferred embodiment, moving average generator 108 extracts the transaction total counts and individual stock counts data from database 106 and determines the moving averages, the stock purchase indices, and the stock rankings for periods 1, 5, 9, and 21. Period time frames are typically daily or weekly. However, the present invention is not limited to periods of 1, 5, 9, and 21 and period time frames of daily and weekly. One skilled in the relevant art(s) would know that other periods and period time frames could be used without departing from the scope and spirit of the present invention.

The present invention involves the analysis of recurring and periodic variations in time series data relating to buyer and seller purchasing. Time series data includes trends, cycles, seasonal, and irregular components. The present invention removes the irregular and seasonal components from the time series data in order to obtain a clear measure of the trends and cycle variations in buyer and seller purchases. The irregular component of time series data is referred to as "noise." The noise component of the data is removed by applying smoothing techniques, such as moving averages. Moving averages are averages of the data over periods of time. The seasonal component of time series data refers to data that exhibits a recurring variation, up or down, which occurs the same time each year. An example of seasonal time series data is a retirement account. In one embodiment of the present invention, retirement accounts are excluded because of suspected seasonality related to filing deadlines. In an alternative embodiment, retirement accounts are included by using the U.S. Census Bureau's X11 procedure to treat and remove the seasonality component from the data. The U.S. Census Bureau's X11 procedure incorporates a ratio to moving average approach, which is described in *Business Cycles and Forecasting*, by Carl. A. Dauten and Lloyd M. Valentine, Southwestern Publishing Co., pp. 235-240 (1978), which is incorporated by reference herein in its entirety.

The stock purchase indices of the present invention are a measure of investor participation in the stock market. These stock purchase indices include a buy simple index, a sell simple index, a buy weighted index, and a sell weighted index. The buy, simple index is a measure of the ratio of investors that bought stocks over a period of time to the total investors that bought or sold stocks within that period. The sell simple index is a measure of the ratio of investors that sold stocks over a period of time to the total investors that bought or sold stocks within that period. Weighted indices are used to discount the value of small value transactions. For example, weighting reduces the economic impact of the relatively small value of the purchase of a "penny stock." The buy weighted index is a measure of the ratio of investors that bought stocks over a period of time to the total investors that bought or sold stocks within that period, weighted by the cost of the transactions. The sell weighted index is a measure of the ratio of investors that sold stocks over a period of time to the total investors that bought or sold stocks within that period, weighted by the cost of the transactions. Although the stock purchase indices of the present invention are directed to the number of customer executions of buy and sell transactions, the present invention is not limited to this. Other indices can be generated, such as an index relating to the number of shares bought to the total number of shares bought and sold, the number of buy orders to the total number of buy and sell orders, or the dollar value of all buy trades to the dollar value of all buy and sell trades, etc., without departing from the scope and spirit of the invention.

Stock rankings are based on the stock purchase indices of the present invention. Stock rankings comprise a list of the top stocks bought and a list of the top stocks sold over a given period of time. Each list includes each stock's percentage of the total number of stocks bought or the total number of stocks sold, respectively.

Database 110 stores the results of the stock purchase indices as well as the 1, 5, 9, and 21 period moving average indices data. Database 112 stores the results of the 1, 5, 9, and 21 period stock ranking data.

User interface delivery module 116 extracts the moving index data and stock ranking data from databases 110 and 112, respectively, for display purposes. Users can request that a stock purchase index report be delivered via email 118. Alternatively, a user may log onto web site 120 for the service providing the stock purchase index to obtain a stock purchase index report. When the user obtains the stock purchase index by logging onto web site 120, additional options are available to the user. Such options include, but are not limited to, viewing the data in conjunction with other indices, filtering the data to allow the user to select the results based on business sector, exchange, period, capitalization, country, and different customer investment profile segments, etc. Other indices data are stored in database 114. Additional options include providing user-defined alerts for enabling an automatic email 118 delivery when certain criteria are met, such as a percent change in the stock purchase index from the prior period or a percent change in gap. Gap refers to the difference between a base period series and a comparison period series. In a preferred embodiment of the present invention, the base period series is usually 9 days or 9 weeks and the comparison period series is usually 21 days or 21 weeks, respectively. Selected filters and alerts are stored in reporting controls database 122.

Figure 2:
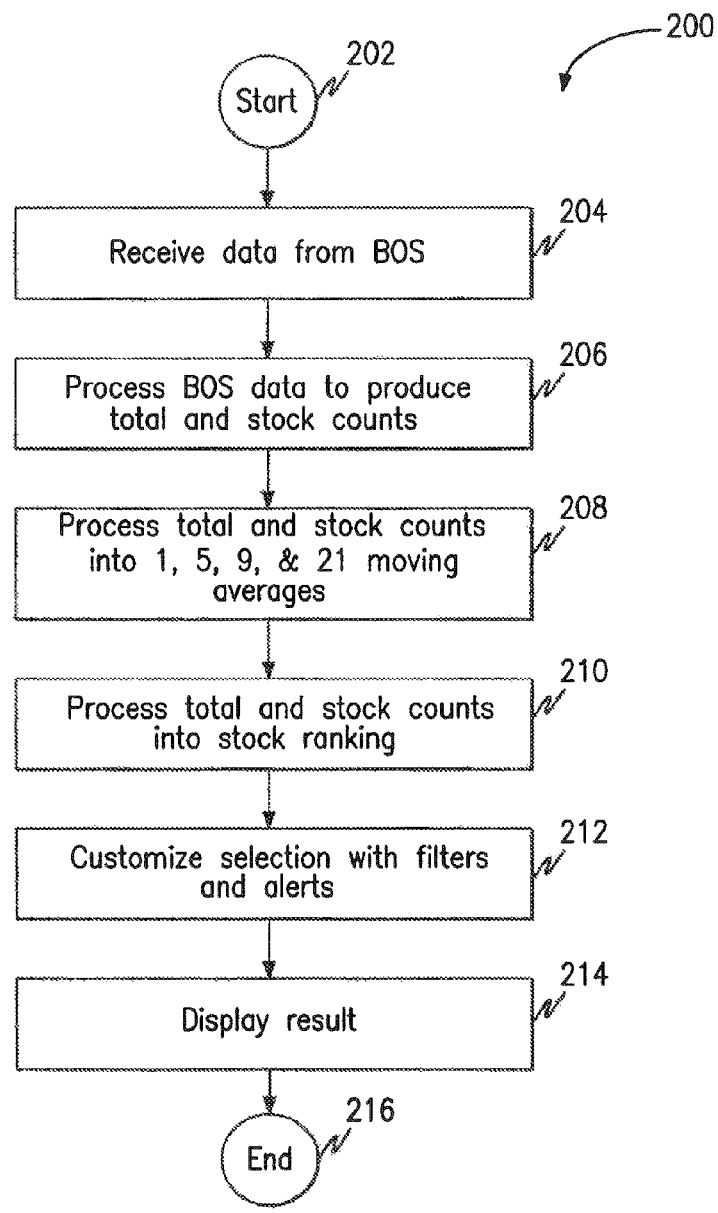
FIG. 2 is a high level flow chart illustrating a method for determining the stock purchase indices of the present invention.

A high level flow chart 200 illustrating a method for determining the stock purchase index of the present invention is shown in FIG. 2. The process begins with step 202 where control is passed to step 204.

In step 204, aggregator 104 receives customer trading data from BOS 102. Control then passes to step 206.

In step 206, aggregator 104 filters, sorts, segregates, and summarizes the data to produce total and stock counts for determining stock purchase indices. Aggregator 104 then stores the data in total and stock counts database 106. Control then passes to step 208.

In step 208, the total and stock counts data is retrieved from database 106. Moving average generator 108 processes the total and stock counts data to determine moving averages for periods of 1, 5, 9, and 21. Period time frames are daily or weekly. Stock purchase indices are also determined from the total and stock counts data. Moving index data is then stored in database 110. Control then passes to step 210.

In step 210, the total and stock counts data, as well as, the stock purchase indices, are used to determine stock ranking. Stock ranking data is then stored in database 112. Control then passes to step 212.

The process of step 212 is an optional process that is only available to the user when web site 120 delivery is activated. In step 212, the user has the option of customizing the output report. Such options include, but are not limited to, filtering the data to allow the user to select the results based on business sector, exchange, period, capitalization, country, and different customer investment profile segments; applying alerts for email delivery when the alert criteria is satisfied; and providing graphs of other stock indices for comparison with the stock purchase indices of the present invention.

When the user requests email delivery, the user does not have the option of customizing the output results of step 212. Step 212 is therefore bypassed for email 118 delivery requests. Control then passes to step 214.

In step 214, the results are displayed to the user by user interface delivery module 116. Control then passes to step 216 where the process ends.

Figure 3:
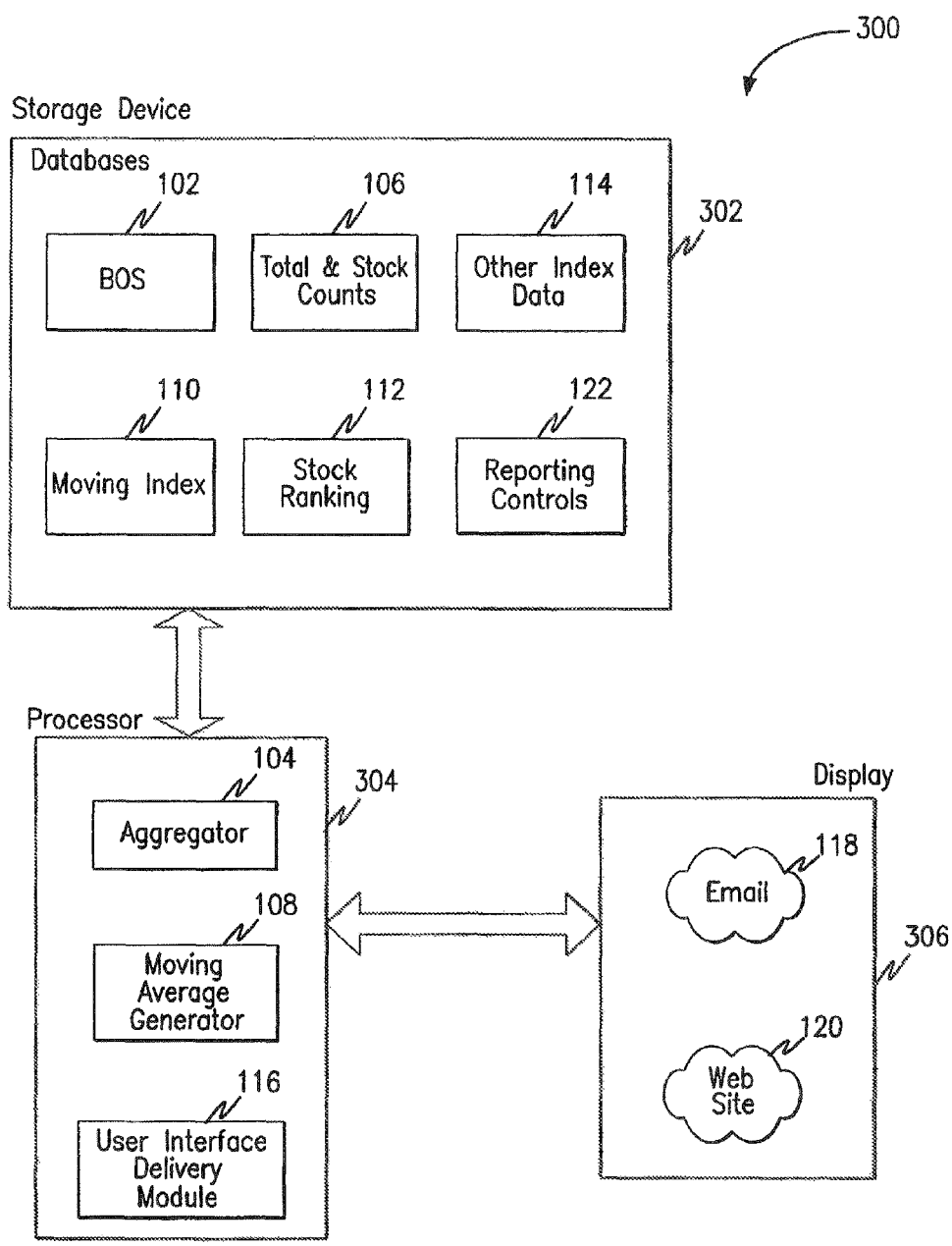
FIG. 3 is a diagram illustrating an architectural overview of a stock purchase index system of the present invention.

FIG. 3 is a diagram illustrating an architectural overview of the physical components of stock purchase index system 300, preferably connected by a network according to a preferred embodiment of the present invention. It should be understood that the particular stock purchase index system 300 in FIG. 3 is shown for illustrative purposes only and does not limit the invention. Other implementations for performing the functions described herein will be apparent to persons skilled in the relevant art(s) based on the teachings contained herein, and the invention is directed to such other implementations.

System 300 comprises a storage device 302 coupled to a processor 304, and a display 306. Storage device 302 houses, inter alia, databases 102, 106, 110, 112, 114, and 122. Processor 304 comprises aggregator 104, moving average generator 108, and user interface delivery module 116. Processor 304 processes all of the data generated by aggregator 104, moving average generator 108, and user interface delivery module 116 to provide the stock purchase indices and generate the display functions. Processor 304 is also coupled to display 306. Display 306 comprises both email 118 and web site 120 delivery of results.

More detailed descriptions of the stock purchase index system 300 components, as well as their functionality, are provided below.

II. DATABASES OF THE PRESENT INVENTION

Provided below is a description of the contents of a plurality of databases that are utilized by the present invention. It should be readily apparent to those skilled in the art that the databases described below are not limited to the described fields, but may include more fields or less fields, as required.

A. Back Office System (BOS) Database

An exemplary BOS database 102 is shown in FIG. 4. BOS database 102 comprises a customer field 402, a holdings field 404, and a transactions field 406. Customer field 402 comprises an account number field 408, an ownership type field 410, an open date field 407, and a closed date 409. Each customer 402 has a unique account number 408. Ownership type 410 comprises government ownership, corporation ownership, investment club ownership, partnerships, sole proprietors, individual regular accounts, and individual retirement accounts.

Government accounts are owned by the government. A government employee making decisions on behalf of the government account is subject to the rules and regulations of the government. Accounts owned by a corporation allow a financial officer to make the investment decisions. The financial officer is subject to the rules and regulations of the corporation. Investment clubs are owned by a group of individuals who collectively make investment decisions. Partnerships are where two or more persons agree to carry on a business together and share in its profits and losses. A single proprietorship is a solely-owned business.

Government accounts, corporate accounts, partnership accounts, and single proprietorship accounts are all subject to the rules and regulations of the U.S. Tax Code when it comes to making decisions about the stock market and what, when, and where to invest. An individual retirement account is subject to certain restrictions with respect to maximum contribution limits and the timing of contributions. Individual regular accounts are owned by individuals who make their own decisions about when, what, and where to invest in the stock market. Thus, the type of ownership account is taken into consideration when determining stock purchase indices of the present invention.

Open date field 407 indicates the date in which the account was opened. Closed date field 409 indicates the date in which the account was closed.

Holdings field 404 comprises a CUSIP field 412 and a number of shares field 414. Holdings field 404 contains every instrument currently owned by customer 402 and the number of shares 414 that are owned for each instrument. CUSIP refers to the Committee on Uniform Security Identification Procedure. CUSIP is an inter-industry security coding service. Each type of security has its own unique CUSIP number. CUSIP field 412 comprises each security interest held by customer 402. Number of shares 414 corresponds to the number of shares per CUSIP 412 holding. Although the present invention generally refers to CUSIP 412 as security interests, CUSIP 412 may also refer to options, mutual funds, bonds, futures, and currencies.

Transactions field 406 comprises a date field 416, a time field 418, a CUSIP field 419, a number of shares field 420, a value field 422, and a buy or sell field 424. Date field 416 is the date in which customer 402 performs transaction 406. Time field 418 is the time in which customer 402 performs transaction 406 on date 416. CUSIP 419 lists the security interest or instrument that customer 402 transacts on date 416 at time 418. Number of shares 420 is the number of shares that customer 402 transacts for CUSIP 419 on date 416 at time 418. Value 422 is the trade price of CUSIP 419 on date 416 at time 418 multiplied by the number of shares 420 transacted. Buy or sell field 424 lists whether customer 402 in the particular transaction 406 bought or sold CUSIP 419.

BOS database 102 also shows a day trader 426. A day trader is someone who buys and sells the same CUSIP 419 on the same date 416. In a preferred embodiment of the present invention, day trader data is excluded from the determination of the stock purchase indices. Day traders will be further described below.

B. Total and Stock Counts Database

An exemplary total and stock count database 106 is shown in FIG. 5. Database 106 comprises date field 416, CUSIP field 419, buy or sell field 424, a number of accounts field 502, a number of orders field 504, a number of shares field 506, and a value field 508. Additional records 510 and 512 are also kept in database 106 for keeping daily totals of fields 502-508.

Number of accounts 502 is the actual number of accounts in the system that bought or sold CUSIP 419. Number of orders 504 is the number of orders actually received on date 416 for CUSIP 419. Number of shares 506 is the total number of shares transacted on date 416 for CUSIP 419 for a buy or sell 424. Value 508 is the market value of CUSIP 419 on date 416 for buy or sell 424 times the number of shares 506 bought or sold. Total fields 510 and 512 contain the totals for number of accounts 502, number of orders 504, number of shares 506, and value 508 for each date 416 and for each buy and sell, respectively.

C. Periods Moving Index Database

An exemplary periods moving index database 110 is shown in FIG. 6. As stated above, moving average generator 108 extracts the total and stock counts from database 106 and determines the stock purchase indices and the moving averages for periods of 1, 5, 9, and 21. The stock purchase indices, the moving averages, and other weighted data, are stored in periods moving index database 110. Database 110 comprises a series field 602, a period field 604, date field 416, a number of buy accounts field 606, a number of sell accounts field 608, a number of buy orders field 610, a number of sell orders field 612, a number of shares bought field 614, a number of shares sold field 616, a total value bought field 618, a total value sold field 620, a buy weight field 622, a sell weight field 624, a buy simple index field 626, a sell simple index field 628, a buy weighted index field 630, and a sell weighted index field 632. It is important to note that each record in database 110 represents the grand totals of all CUSIPs 419 for the time frame indicated by series field 602, period field 604, and date field 416.

Series field 602 contains data that represents whether each record in database 110 contains daily or weekly totals for date 416. Period field 604 comprises periods of either 1, 5, 9, or 21. As stated above, moving average generator 108 processes the total and stock counts data of database 110 to determine moving averages for periods of 1, 5, 9, and 21. These periods are described for illustrative purposes. The invention is not limited to these periods.

Number of buy accounts field 606 represents the total number of buy accounts for series 602 and period 604 on date 416. In a similar manner, number of sell accounts field 608 represents the total number of sell accounts for series 602 and period 604 on date 416.

Number of buy orders 610 represents the total number of orders of buy accounts 606 for series 602 and period 604 on date 416. Number of sell orders 612 represents the total number of orders of sell accounts 608 for series 602 and period 604 on date 416.

Number of shares bought 614 represents the total number of shares bought, for series 602 and period 604 on date 416. Number of shares sold 616 represents the total number of shares sold for series 602 and period 604 on date 416.

Total value bought 618 is the summary of the total dollar value of the number of shares bought 614 for series 602 and period 604 on date 416. Total value sold 620 is the summary of the total dollar value of the number of shares sold 616 for series 602 and period 604 on date 416.

It should be noted that number of buy accounts 606, number of sell accounts 608, number of buy orders 610, number of sell orders 612, number of shares bought 614, number of shares sold 616, total value bought 618, and total value sold 620 were determined by aggregator 104 on a daily basis and stored in total and stock counts database 106. For example, referring to FIG. 5, record 510 stores the daily totals for number of buy accounts 606, number of buy orders 616, number of shares bought 614, and total value bought 618. In a similar manner, record 512 stores the daily totals for number of sell accounts 608, number of sell orders 612, number of shares, sold 616, and total value sold 620.

The present invention provides stock purchase indices (an economic indicator) that measure investor confidence and participation in buying stocks rather than the value of stocks and which stocks are being traded. One stock purchase index is buy simple index 626. Buy simple index 626 represents investor confidence and participation in buying stocks. Another stock purchase index of the present invention is sell simple index 628. Sell simple index 628 represents investor confidence and participation in selling stocks. A detailed explanation of how buy simple index 626 and sell simple index 628 are determined is described below with reference to FIGS. 9, 12A, 12B, and 12C.

Weighted stock purchase indices of the present invention are used to minimize the effects that "penny stocks" have on determining buyer/seller participation in the stock market. For example, investors may purchase a larger number of shares of a "penny stock" than they would a "blue chip"[1] stock due to the large cost per share of a blue chip stock.

[1] A "blue chip" stock is a stock from a large, safe, prestigious company of the highest class among stock market investments. A "blue chip" company would receive the appellation through being well-known, having a large paid-up capital, a good track record of dividend payments, and skilled management.

There is, no set, accepted definition of "penny stocks." Some people define "penny stocks" as stocks priced under one dollar per share. Others define "penny stocks" as stocks priced under five dollars per share. Others include only those securities traded in the "pink sheets"[2] as "penny stocks." While others include the entire OTC market as "penny stocks." The Securities Division considers a stock to be a "penny stock" if it trades at or under $5.00 per share and trades in either the "pink sheets" or on NASDAQ. In addition, a true "penny stock" will have less than $4 million in net tangible assets and will not have a significant operating history. In other words, if a company has real assets, such as equipment and inventory, and is engaged in some real business, such as manufacturing, then the Securities Division does not consider the stock to be "penny stock" even though the shares are low priced.

[2] "Pink sheets" are a major component of the OTC market. The term "pink sheets" was derived from the fact that these securities are printed on pads of long, narrow sheets of pink paper.

The present invention accounts for "penny stocks" in determining its stock purchase indices using buy weight, field 622 and sell weight field 624 in, database 110. Buy weight field 622 represents number of buy accounts 606 multiplied by the average buy price of the stocks bought for series 602 and period 604 on date 416. Sell weight field 624 represents number of sell accounts 608 multiplied by the average sell price of the stocks bought for series 602 and period 604 on date 416. Buy weight 622 and sell weight 624 are used in determining buy weighted index 630 and sell weighted index 632. Buy weighted index 630 and sell weighted index 632 are both examples of the stock purchase indices of the present invention. A detailed explanation of how buy weighted index 630 and sell weighted index 632 are determined is described below in reference to FIGS. 11, 12A, 12B, and 12C.

Although database 110 indicates that weighted indices for the stock purchase indices of the present invention are based on the average buy or sell price, the present invention is not limited to weighting by average buy and/or sell price. One skilled in the art would know that other possible weighting factors such as current market capitalization, future capitalization on growth, market value of customer portfolio holdings, etc., can be used without departing from the scope of the present invention.

D. Periods Stock Ranking Database

An exemplary periods stock ranking database 112 is shown in FIGS. 7A and 7B. As stated above, moving average generator 108 extracts the total and stock counts data from database 106 and calculates the stock rankings for periods of 1, 5, 9, and 21. These calculated rankings, among other data, are stored in periods stock ranking database 112. Database 112 comprises series field 602, period field 604, date field 416, CUSIP field 419, number of buy accounts field 606, number of sell accounts field 608, number of buy orders field 610, number of sell orders field 612, number of shares bought field 614, number of shares sold field 616, an average buy price field 702, an average sell price field 704, total value bought field 618, total value sold field 620, buy weight field 622, sell weight field 624, a buy simple rank field 706, a sell simple rank field 708, a buy weighted rank field 710, and a sell weighted rank field 712. It is important to note that each record in database 112 represents the totals for each CUSIP 419 for the time frame indicated by series field 602, period field 604, and date field 416. Average buy price 702 represents the total value bought 618 divided by the number of shares bought 614 for CUSIP 419. Average sell price 704 represents the total value sold 620 divided by the number of shares sold 616 for CUSIP 419. As with buy simple index 626 and sell simple index 628, buy simple rank 706, sell simple rank 708, buy weighted rank 710 and sell weighted rank 712 are also used as economic indicators of investor confidence and participation in the stock market. Buy simple rank 706 represents the percentage each CUSIP 419 contributes to buy simple index 626. Sell simple rank 708 represents the percentage each CUSIP 419 contributes to sell simple index 628. In a similar manner, buy weighted rank 710 and sell weighted rank 712 represent the percentage each CUSIP 419 contributes to buy weighted index 630 and, sell weighted index 632, respectively.

A detailed explanation of how buy simple rank 706 and sell simple rank 708 are determined is described below with reference to FIGS. 10, 12A, 12B, and 12C. In addition, a detailed explanation of how buy weighted rank 710 and sell weighted rank 712 are determined is described below with reference to FIGS. 11, 12A, 12B, and 12C.

E. Other Index Database

As described above, a user may log onto web site 120 to obtain the stock purchase index report of the present invention. When the user obtains the stock purchase index by logging onto web site 120, additional options are available to the user. Such options include, but are not limited to, viewing the data in conjunction with other indices; filtering the data to allow the user to select the results based on business sector, exchange, period, capitalization, country, and different customer investment profile segments; and setting alerts that, when triggered, provide automatic email delivery of the stock purchase index report. Database 114 contains information relating to other indices, smoothing factors, daily or weekly series, etc. In another embodiment of the present invention, database 114 includes customer investment profiles. Customer investment profiles can be used to provide additional information to users beyond stock purchase indices relating to regular investors only.

Figure 34:
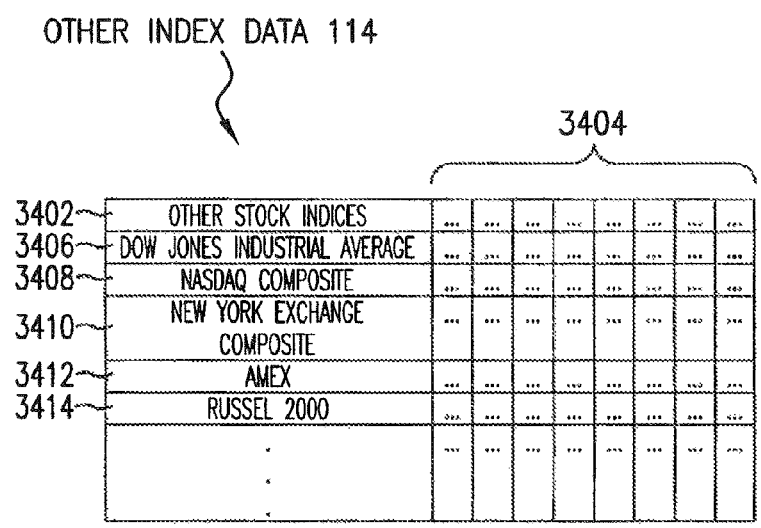
FIG. 34 is a diagram illustrating an exemplary other index database.

An exemplary database 114 representing, other types of indices is shown in FIG. 34. Database 114 comprises an other stock indices field 3402 and a plurality of other data fields 3404. Plurality of other data fields 3404 relates to the type of indices in stock indices field 3402 including, but not limited to, daily or weekly series, dates, and smoothing factors. Examples of such other stock indices 3402 include a Dow Jones Industrial Average 3406, a NASDAQ Composite Index 3408, a New York Stock Exchange Composite Index 3410, an American Exchange (Amex) Index 3412, a Russell 2000 Index 3414, etc. The present invention enables the integration of the stock purchase indices and associated measures with external data sources, such as price indices and investor attitude surveys. A user can construct statistical models using the stock purchase indices as either a dependent or independent explanatory variable.

F. Reporting Controls Database

Figure 35:
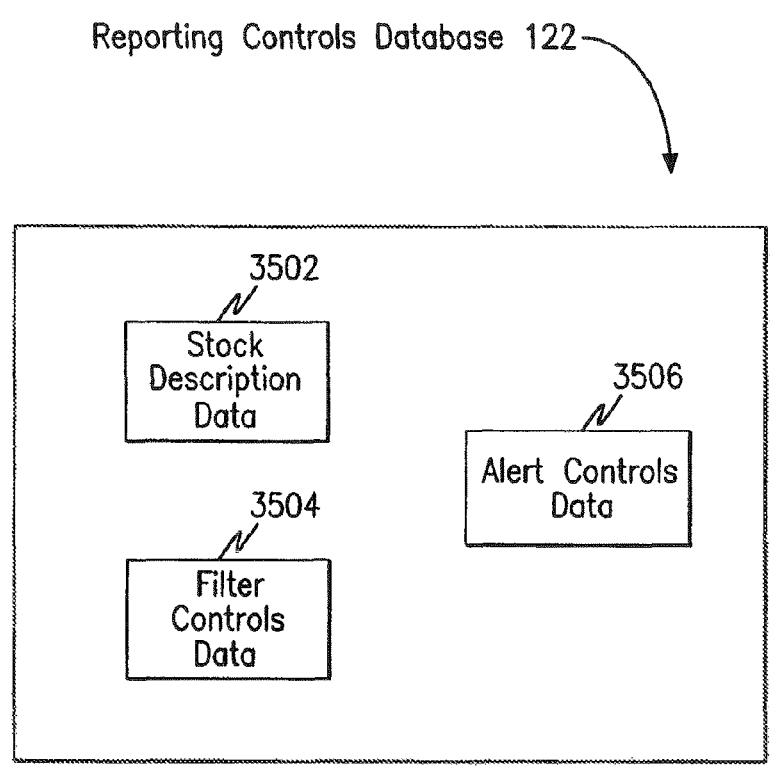
FIG. 35 is a diagram illustrating exemplary types of records found in a reporting controls database.

Reporting controls database 122 contains three types of records as shown in FIG. 35. Reporting controls database 122 contains stock description data 3502, filter controls data 3504, and alert controls data 3506. Exemplary stock description data 3502 is shown in FIG. 36. Exemplary filter controls data 3504 is shown in FIG. 37 and exemplary alert controls data 3506 is shown in FIG. 38.

Exemplary stock description data 3502 is shown in FIG. 36. Stock description data 3502 comprises CUSIP field 412, a CUSIP company field 3604, an exchange field 3606, a sector field 3608, and a capitalization field 3610. Capitalization field 3610 comprises a market value field 3612 and a level field 3614. As in BOS database 102, CUSIP 412 represents a security interest. CUSIP company 3604 is the name of the company issuing CUSIP 412. Exchange 3606 is the type of exchange CUSIP 412 is traded on. Examples of the type of exchange include NASDAQ, the New York. Stock Exchange, etc. Sector 3608 is the type of CUSIP 412 stock. Examples of sector 3608 includes E Commerce, Communication, etc.

Capitalization 3610 is the level of capital worth of CUSIP company 3604 in dollars and its capital level. Market value 3612 is the capital worth of CUSIP company 3604. Level 3614 is the capital level of CUSIP company 3604. For example, a "HIGH" indicates a company worth more than $5 billion, a "MID" indicates a company worth less than $5 billion and more than $1 billion, and a "LOW" indicates a company worth $1 billion or less.

Exemplary filter controls data 3504 is shown in FIG. 37. Filter controls data 3504 is used to customize both stock purchase, index reports and stock purchase ranking reports. Filter controls data 3504 comprises three main fields: a user field 3702, a filter name field 3704, and a filter selections field 3706.

Filter selections field 3706 is comprised of fifteen additional fields. Filter selections field 3706 comprises a stock selection field 3708, a series type field 3710, a graphical display start date field 3711, an index measure field 3712, a base smoothing period length field 3714, a comparison smoothing period length field 3716, an ending date field 3718, a length of time for change measurement field 3720, a number of stocks to list field 3722, a first stock listing selection controls field 3724, a second stock listing selection controls field 3726, a first stock ranking selection criteria field 3728, a second stock ranking selection criteria field 3730, a comparative index selection field 3732, and a series and smoothing selections for comparative index field 3734.

Stock selection field 3708 is comprised of three fields including exchange field 3606, sector field 3608, and a customer segment field 3756. In addition, customer segment field 3756 is comprised of three fields including a country investing in field 3758, an age group field 3760, and an investment orientation field 3762.

Both first and second stock listing selection controls fields 3724 and 3726 are comprised of four fields. First stock listing selection controls field 3724 is comprised of a listing selection field 3736, a period length field 3738, a series type field 3740, and an end date field 3742. Second stock listing selection controls field 3726 is also comprised of a listing selection field 3744, a period length field 3746, a series type field 3748, and an end date field 3750.

User 3702 is a registered user of the present system 300. User 3702 may request that a stock purchase index report, including stock ranking, be delivered to him or her via email 118 or web site 120. Filter name 3704 is a name defined by user 3702 for his or her particular filter. Here, once user 3702 defines fields for a filter, the filter can be stored with associated filter name 3704. This allows user 3702 to reuse the filter in the future without having to reset the fields. The last main field of filter controls data 3504 is filter selections field 3706. Filter selections field 3706 represents the various filters available to user 3702 to customize his or her desired stock purchase index report and/or ranking report.

Figure 28A:
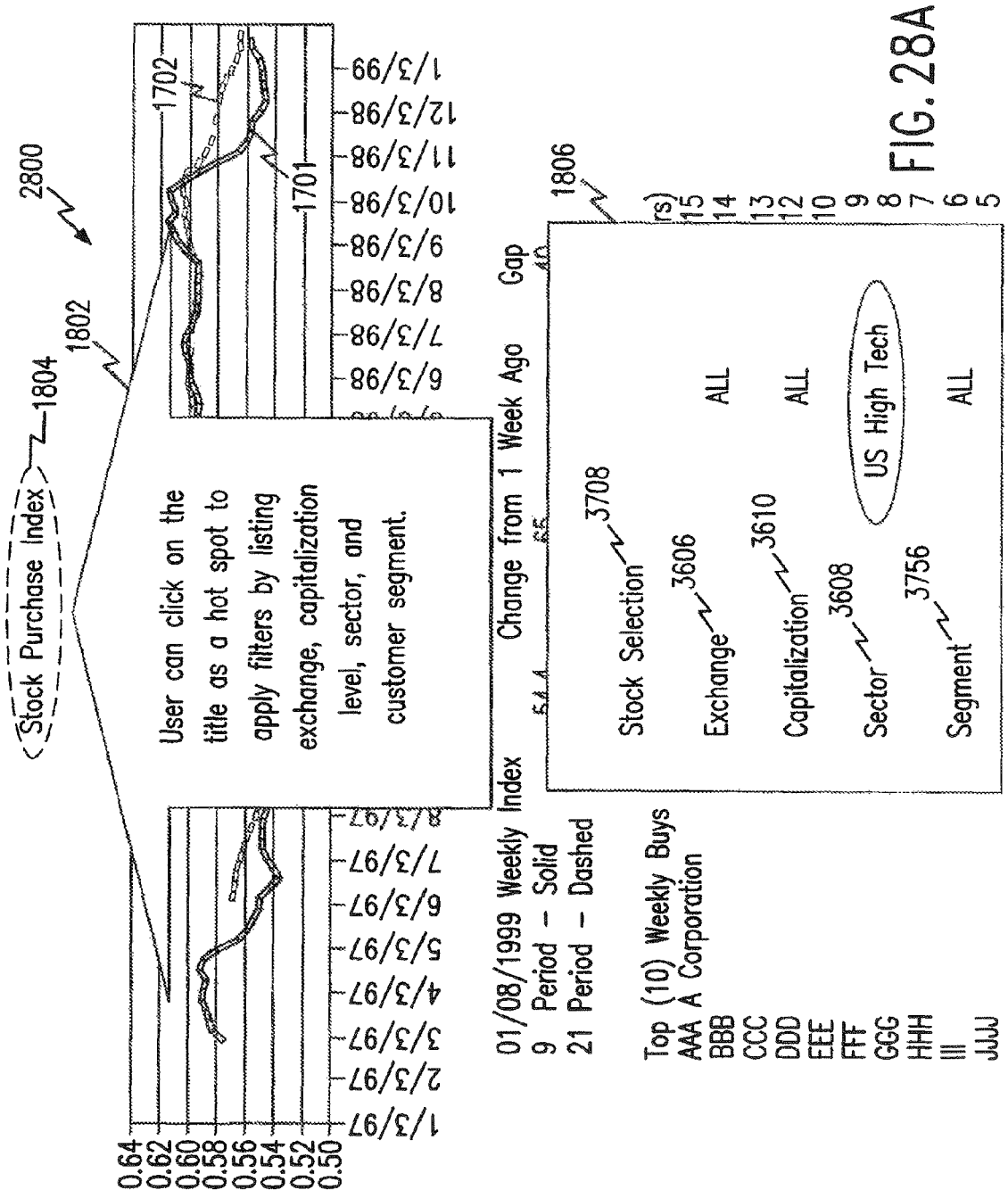
FIGS. 28A and 28B are diagrams illustrating the application of a filter for enabling all of the underlying stocks included in the index to be changed.
Figure 28B:
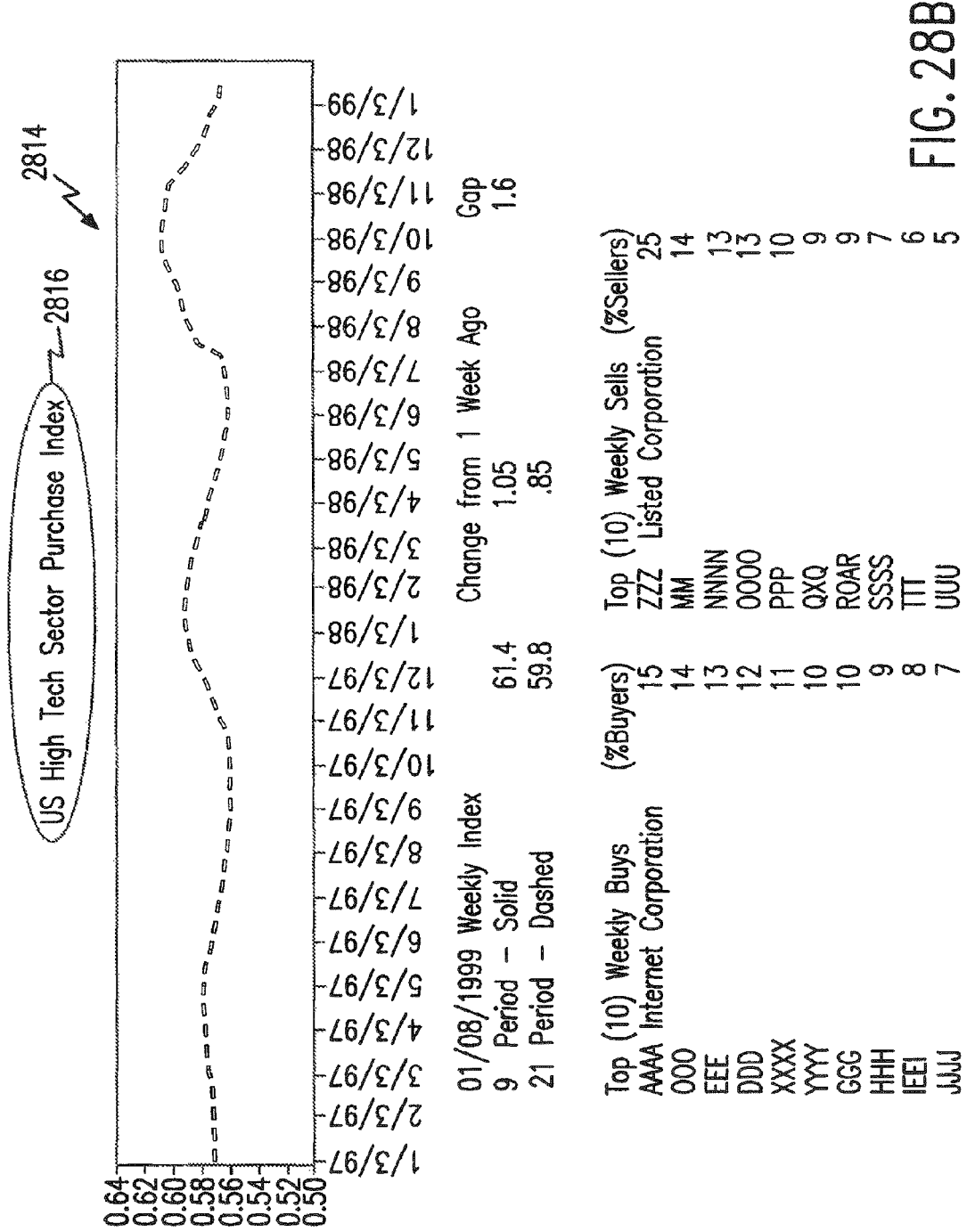

Stock selection 3708 represents a variety of options provided to user 3702 to filter the types of stocks comprised in the stock purchase index report provided. The various options include the exchange 3606 the stock is traded on and stock sector 3608. In addition, stock selection 3708 includes customer segment 3756. Customer segment 3756 represents multiple groups of the trading community, where each group may be divided into multiple subgroups. For example, one group could subdivide customers by the country in which they invest in (country investing in 3758), such as the United States, Germany, and so forth. Another group could subdivide customers by age groups (age group field 3760). Another possible group subdivides customers by investment orientation 3762, such as for retirement, main income, and so forth. Other possible groups, not shown in FIG. 37, include subdividing customers by nationality, profession, and so forth. An exemplary graphical user interface (GUI) screen for allowing user 3702 to make different stock selections 3708 is shown in FIGS. 28A and 28B and is described in detail below.

Figure 18:
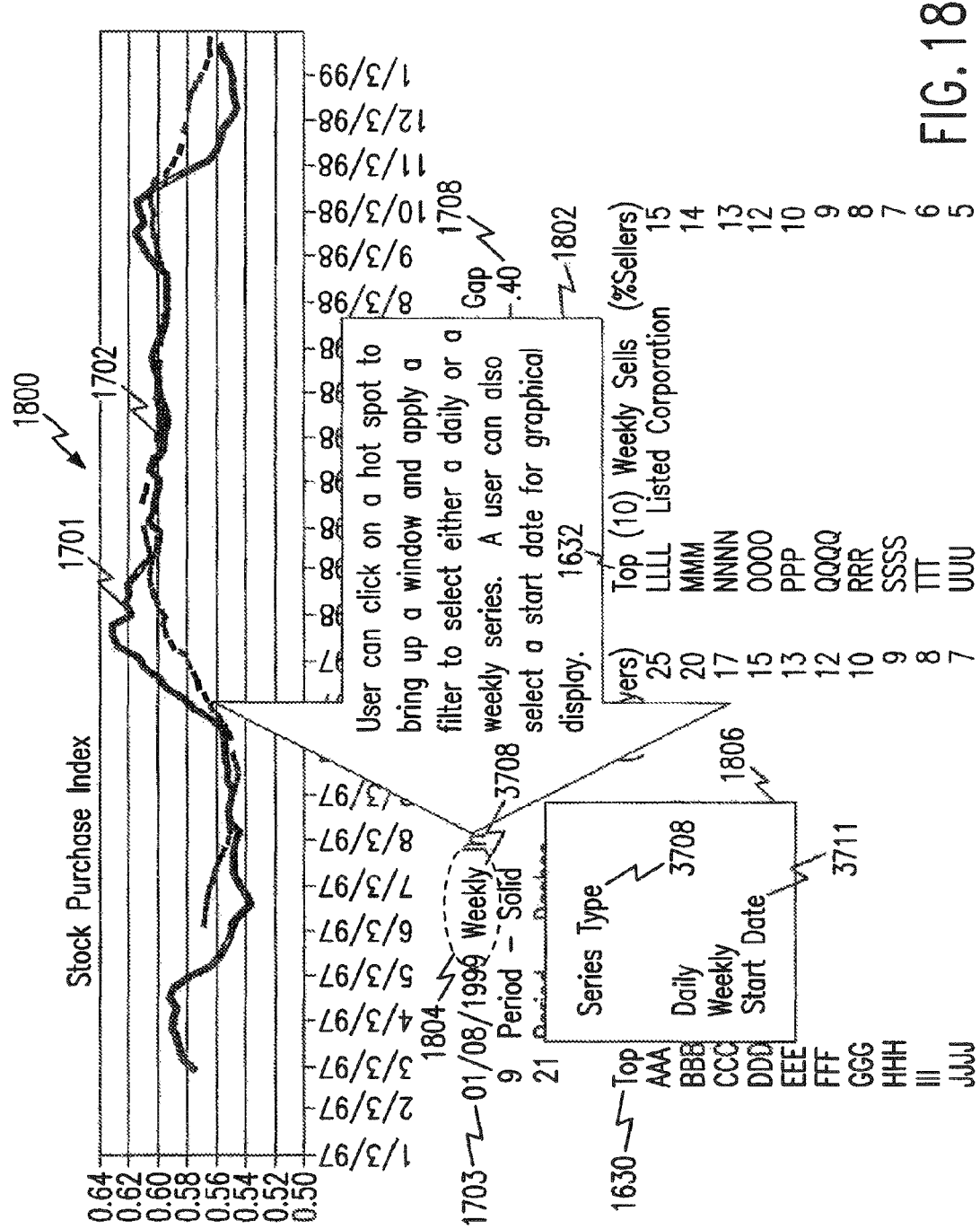
FIG. 18 is a diagram illustrating the application of a filter to select a daily or weekly series.
Figure 21:
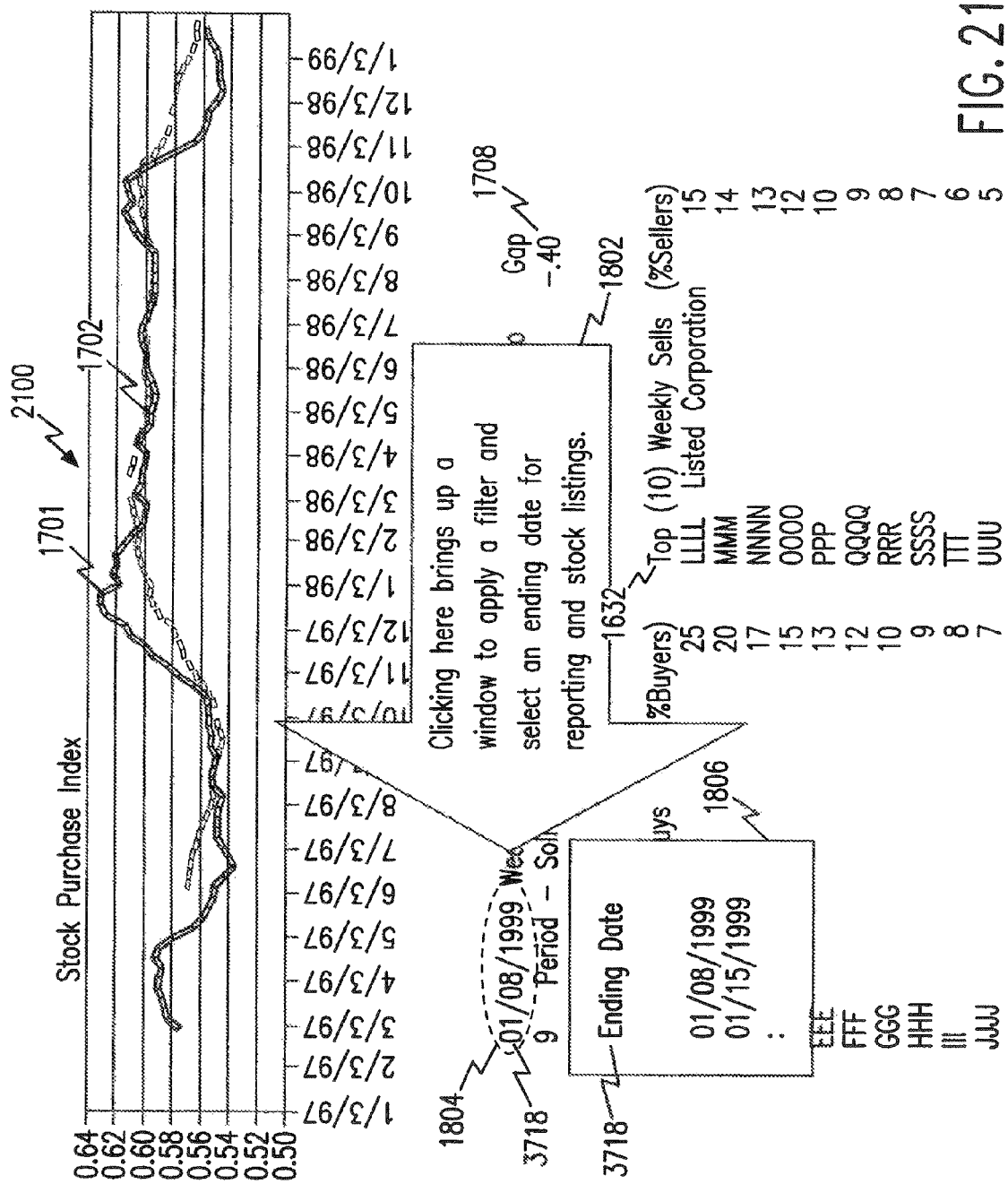
FIG. 21 is a diagram illustrating the application of a filter to select an ending date for period-to-period change reporting and stock listings.

Series type 3710 represents whether user 3702 desires the stock purchase index report to represent daily or weekly stock totals for ending date 3718. An exemplary GUI screen for allowing the user to customize series type 3710 is shown in FIG. 18 and is described in detail below. Also shown and described below with reference to FIG. 21 is an exemplary GUI screen for allowing user 3702 to customize ending date 3718.

Graphical display start date field 3711 allows the user to enter, a beginning date for the graphical display.

Index measure 3712 is the type of index to be represented by the stock purchase index report. The types of indices provided by the present invention include, but are not limited to, buy simple index 626, sell simple index 628, buy weighted index 630, and sell weighted index 632.

Figure 19:
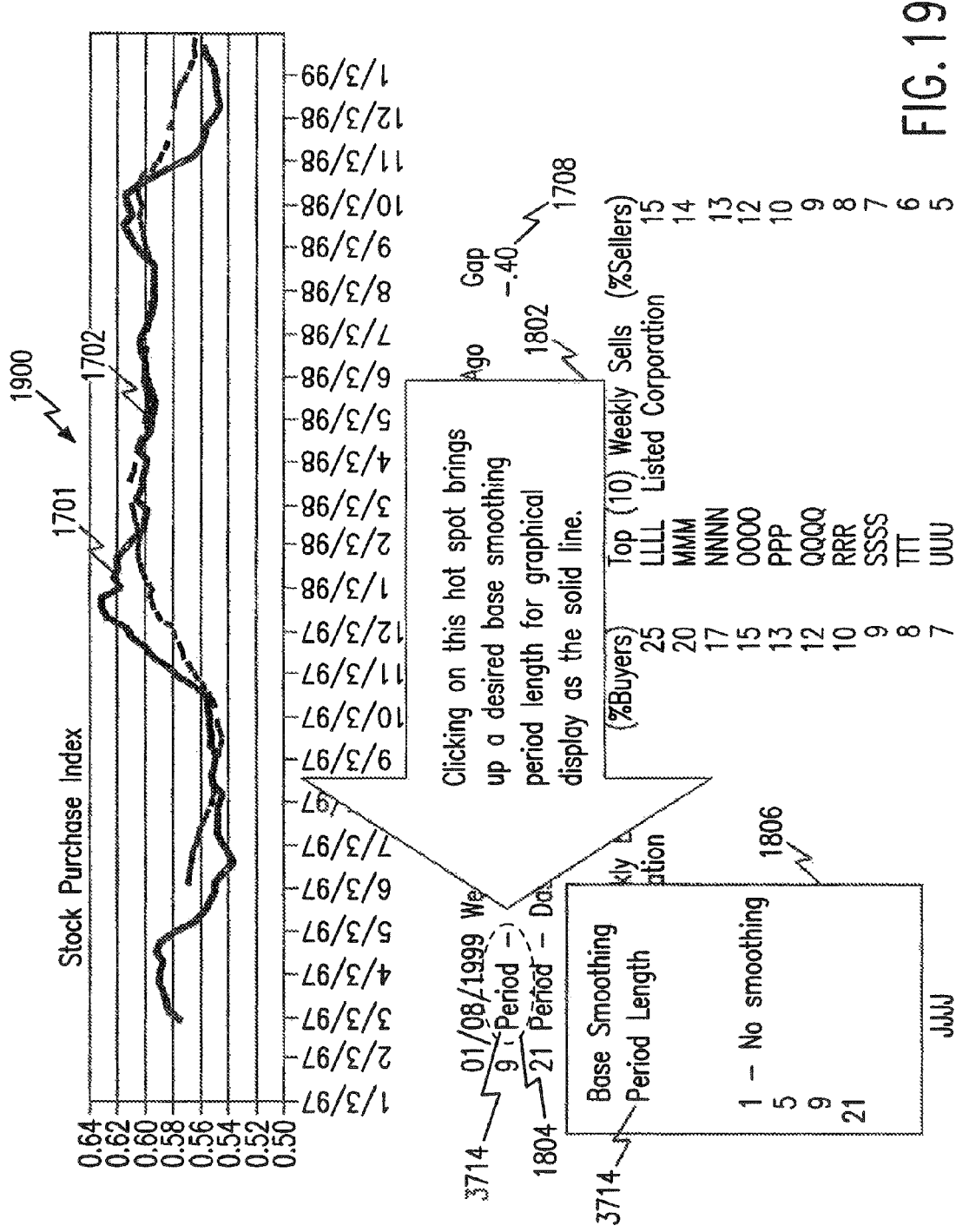
FIG. 19 is a diagram illustrating the application of a filter to select different smoothing period lengths.

Base smoothing period length 3714 allows user 3702 to select different smoothing period lengths. Base smoothing period lengths 3714 may include 5, 9, and 21. Period field 604 comprises periods of either 1, 5, 9, or 21. In an alternative embodiment, base smoothing period length 3714 includes 5, 10, and 20. This would reduce the processing required by basing smoothing on any even multiple of 5. Here, the 5 period averages would be averaged together to create the daily 5 period, as will be described below in detail. An exemplary GUI screen for allowing user 3702 to customize smoothing period lengths 3714 is shown in FIG. 19 and is described in detail below.

Figure 20:
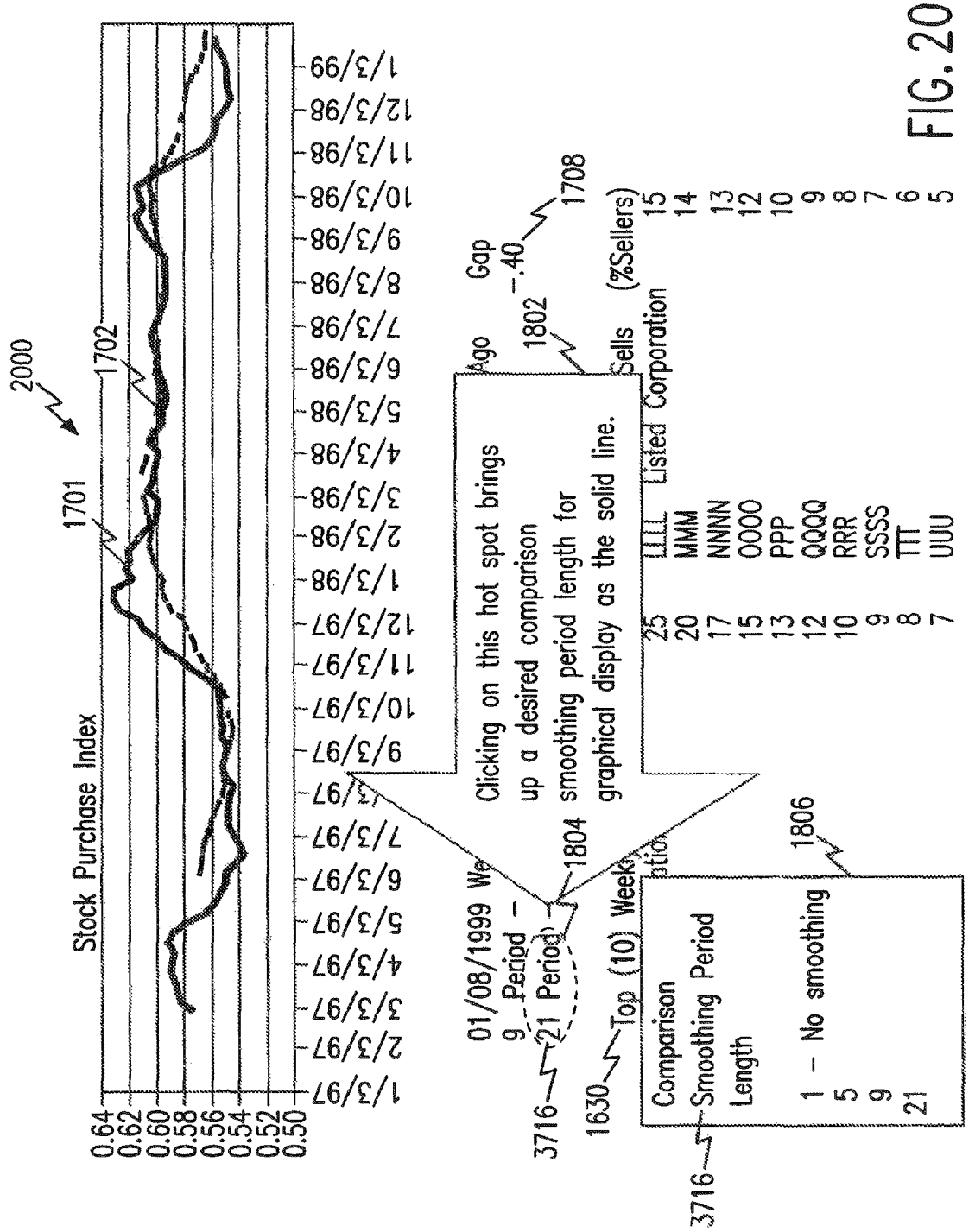
FIG. 20 is a diagram illustrating the application of a filter to select different smoothing period lengths for the comparison series.

Comparison smoothing period length 3716 allows user 3702 to select different smoothing period lengths for comparison with base smoothing period length 3714. An exemplary GUI screen for allowing user 3702 to customize comparison smoothing period length 3716 is shown in FIG. 20.

Figure 22:
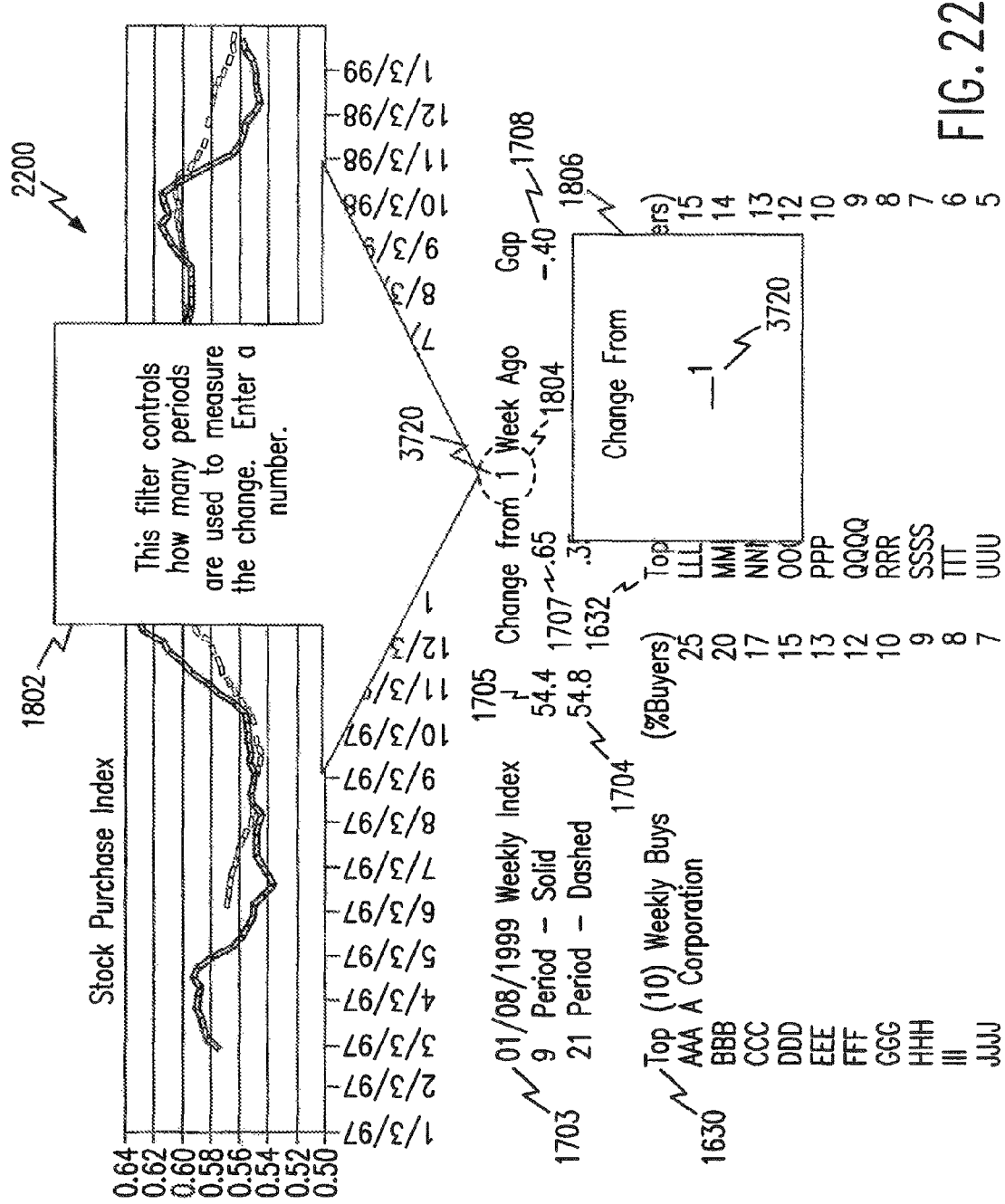
FIG. 22 is a diagram illustrating the application of a filter that allows the length of time covered by the change measurements to be altered.

Length of time for change measurement 3720 represents the length of time covered by the change measurements for base smoothing period length 3714 and comparison smoothing period length 3716. An exemplary GUI screen for allowing user 3702 to customize length of time for change measurement 3720 is shown in FIG. 22 and is described in detail below.

Figure 23:
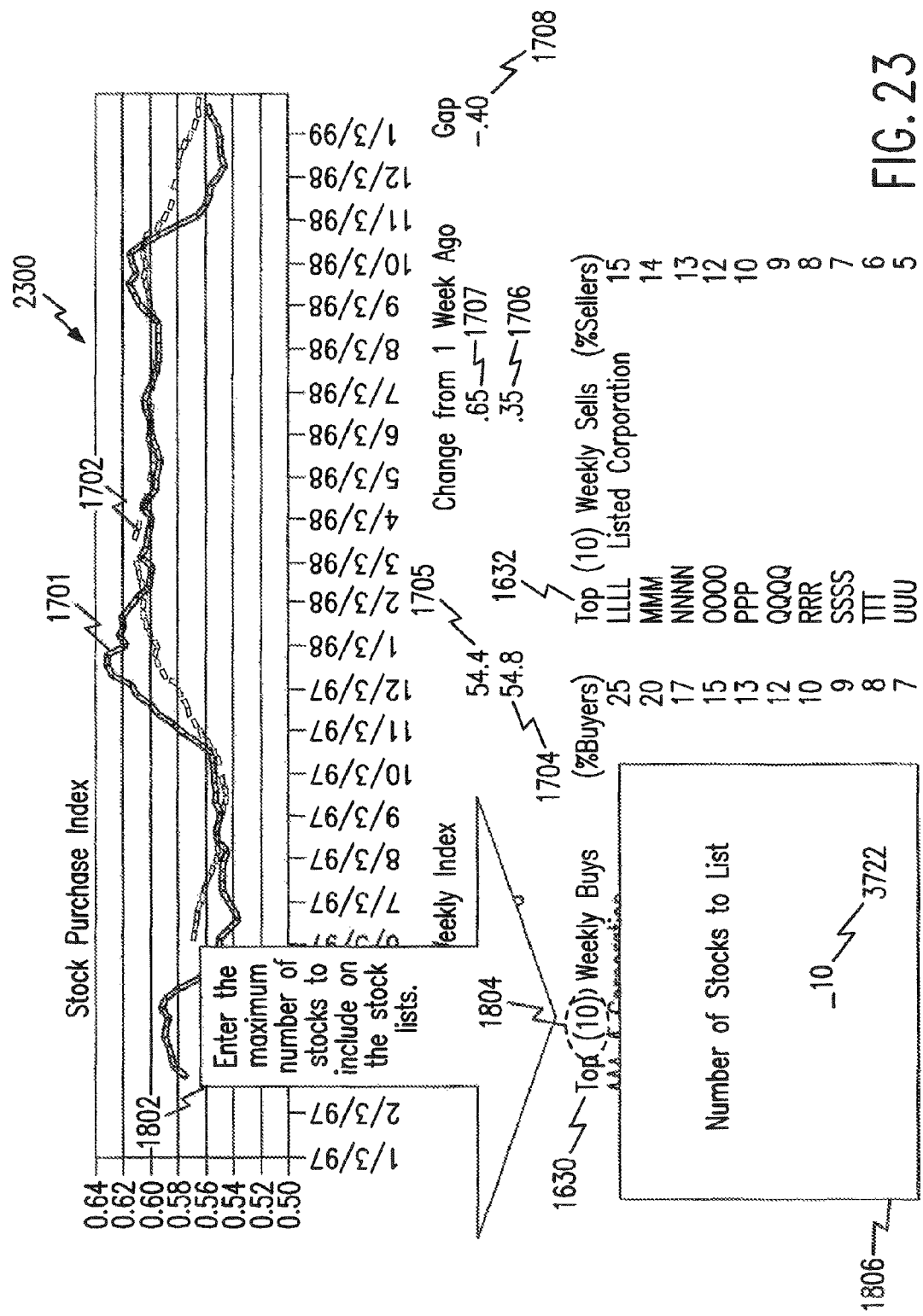
FIG. 23 is a diagram illustrating the application of a filter for changing the number of stocks listed in the top stock buys and sells lists.

Number of stocks to list 3722 represents the number of stocks provided in the stock purchase ranking lists of the present invention. An exemplary GUI screen for allowing user 3702 to customize number of stocks to list 3722 is shown in FIG. 23 and is described in detail below.

First stock listing selection controls 3724 allow user 3702 to customize a first stock listing of a stock purchase ranking list. Here, listing selection 3736 (buys or sells), period length 3738 (1, 5, 9, or 21), series type 3740 (daily or weekly), and end date 3742 are customized by user 3702. An exemplary GUI screen for allowing user 3702 to customize first stock listing selection controls 3724 are shown and described with reference to FIG. 24.

Second stock listing selection controls 3726 allow user 3702 to customize a second stock listing of a stock purchase ranking report. Here, listing selection 3744 (buys or sells), period length 3746 (1, 5, 9, or 21), series type 3748 (daily or weekly), and end date 3750 are customized by user 3702. An exemplary GUI screen for allowing user 3702 to customize second stock listing selection controls 3726 are shown and described with reference to FIG. 25.

Figure 26:
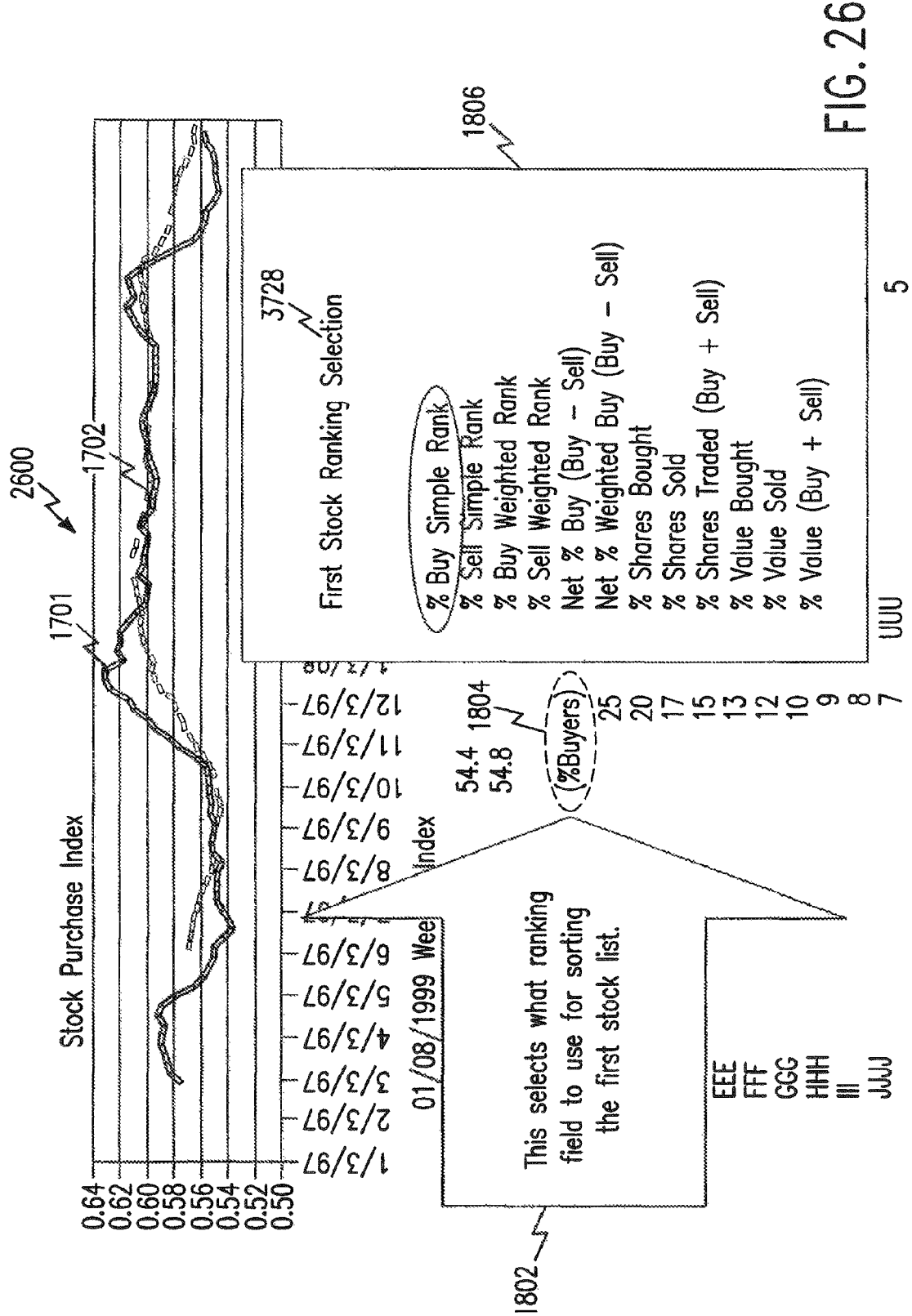
FIG. 26 is a diagram illustrating the application of a filter for allowing the first stock ranking selection criteria to be changed.
Figure 27:
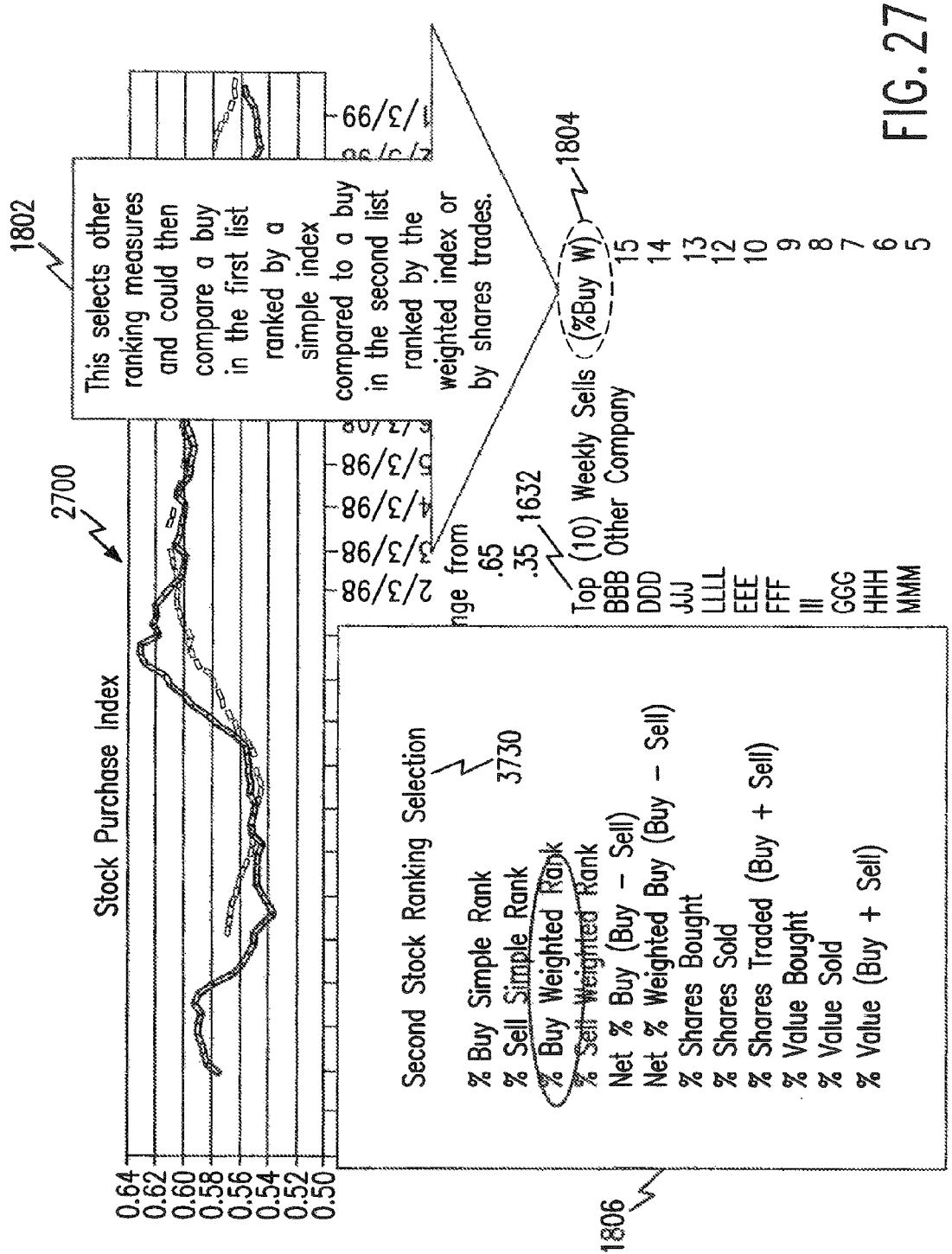
FIG. 27 is a diagram illustrating the application of a filter that enables the second stock ranking selection criteria to be changed.

First stock ranking selection criteria 3728 allows user 3702 to customize the first stock listing according to various stock purchase index parameters. Second stock ranking selection criteria 3730 allows user 3702 to customize the second stock listing according to various stock purchase index parameters. Such, stock purchase index parameters may include, but are not limited to, percent buy simple rank, percent sell simple rank, net percent buy, net percent weighted buy, and so forth. Exemplary GUI screens for first and second stock ranking selection criteria 3728 and 3730 are shown in FIGS. 26 and 27, respectively.

Figure 29A:
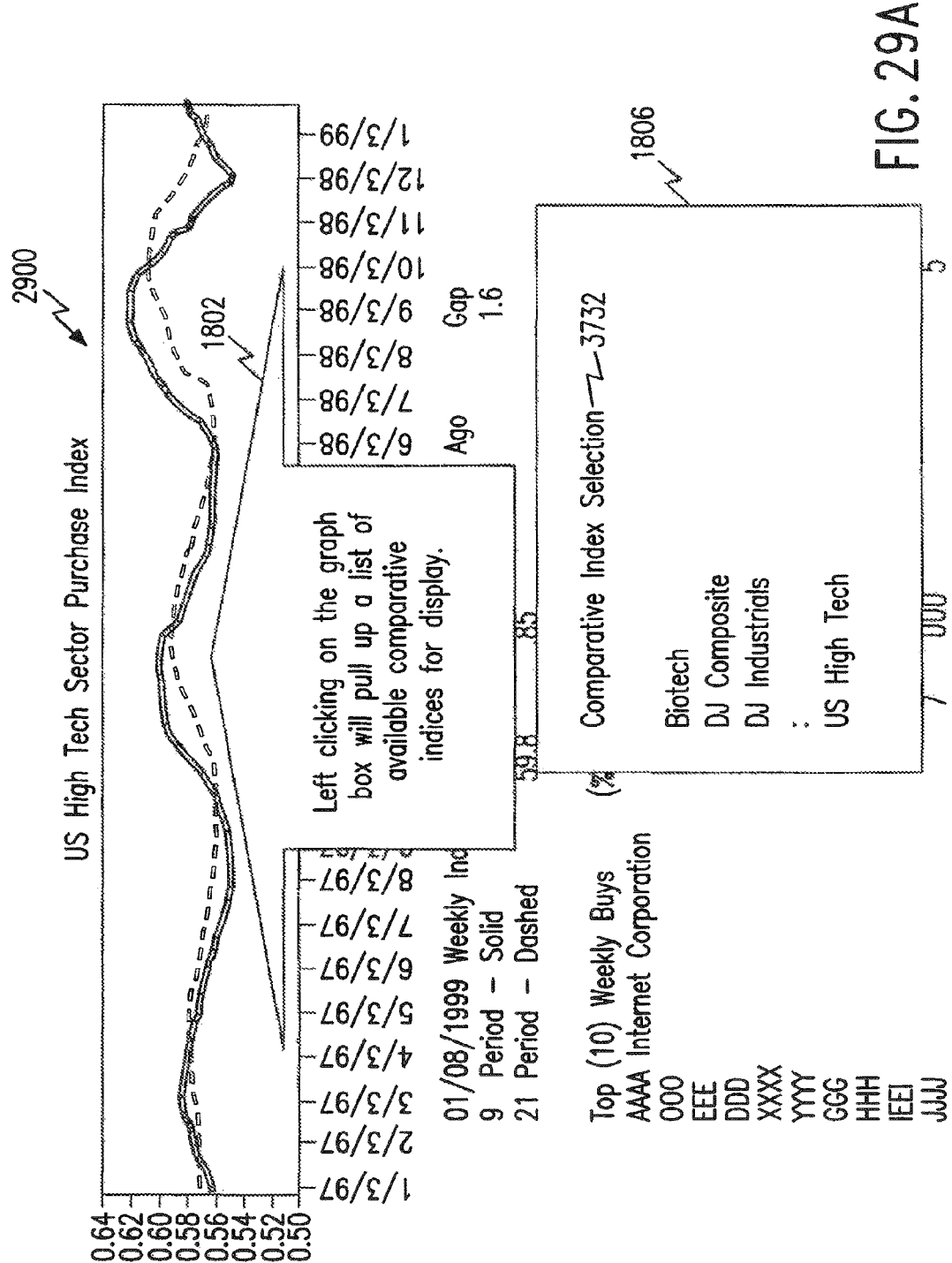
FIGS. 29A and 29B are diagrams illustrating the addition of a comparison indices graph for comparing the simple buy index to a comparative index.
Figure 29B:
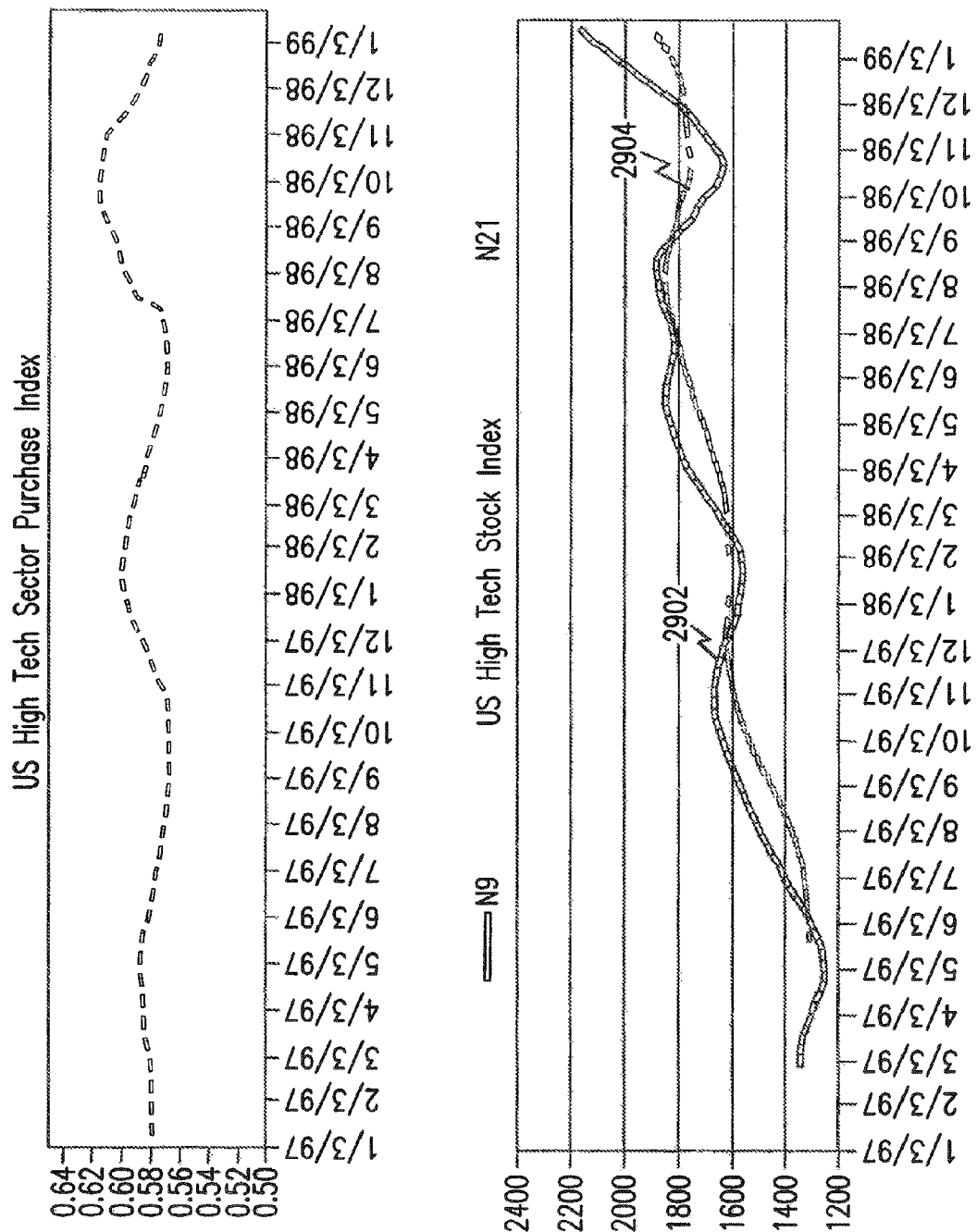

Comparative index selection 3732 allows user 3702 to add a comparison indices graph for comparing buy simple index 626 to a comparative index such as the NASDAQ or the U.S. High Tech Sector indices. The present invention includes not only other stock indices as comparative measures, but also government publications of economic indicators, such as the National Bureau of Economic Research indices, and survey research measures, such as the Index of Consumer Confidence published by the University of Michigan. Exemplary GUI screens for comparative index selection 3732 are shown in FIGS. 29A and 29B below.

Figure 30:
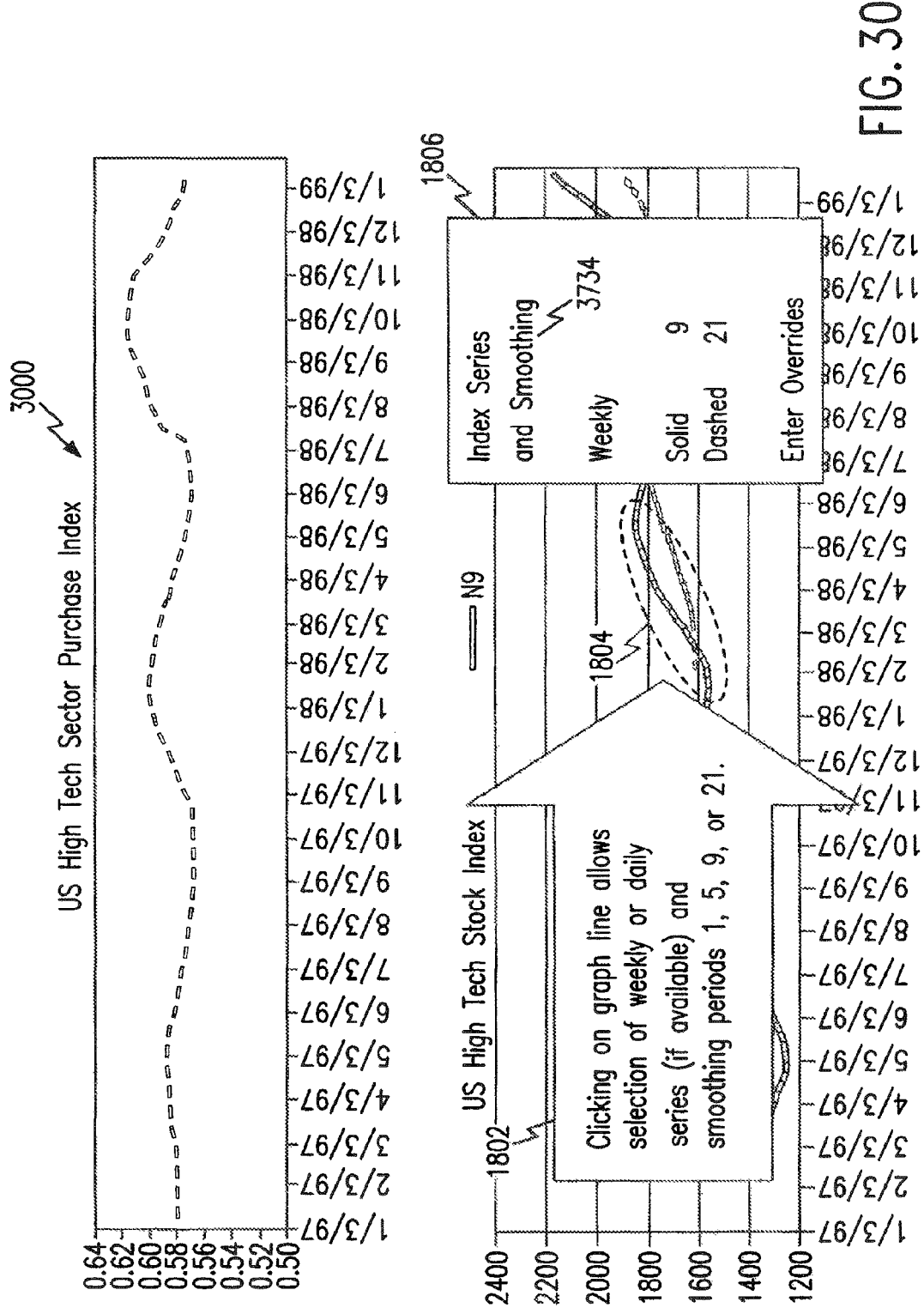
FIG. 30 is a diagram illustrating the application of a filter that enables a displayed comparative index to be altered by allowing the selection of weekly or daily series and moving average smoothing periods for the comparative index selection.

Series and smoothing selections for comparative index 3734 allows user 3702 to alter the displayed comparative index by allowing the selection of weekly or daily series and moving average smoothing periods for the comparative index selection. An exemplary GUI screen for series and smoothing selections for comparative index 3734 is shown in FIG. 30 below.

Exemplary alert controls data 3506 is shown in FIG. 38. Alert controls data 3506 is used to customize and provide alerts to user 3702 of particular changes in the stock purchase indices. Alert controls data 3506 comprises five main fields: user field 3702, a user email address field 3802, a filters selected field 3804, an alert name field 3806, and a type of alert field 3808. Type of alert field 3808 further comprises a change measurement field 3810 and a gap measurement field 3812. Both change and gap measurement fields 3810 and 3812 comprise three additional fields. Change measurement field 3810 further comprises an actual percent change field 3814, a percent base field 3816, and a consistency field 3818. Gap measurement field 3812, further comprises a gap size field 3820, a change compared to prior gap field 3822, and a consistency field 3824.

User email address 3802 is where the present invention sends stock purchase index and ranking reports to user 3702. Filters selected 3804 represents the various filters user 3702 has available to customize his or her alert email message. Alert name 3806 is a name defined by user 3702 for his or her particular alert email message to help bring the alert to user's 3702 attention. Change measurement 3810 is a type of alert 3808 that is set based on changes from the prior period. An exemplary GUI screen for actual percent change 3814, percent base change 3816, and consistency 3818 are described below with reference to FIG. 31. Gap measurement 3812 is a type of alert 3808 that is set based on measurements of the gap between the base smoothing period of an index of the present invention and the comparison smoothing index of the comparison index. An exemplary GUI screen for gap size 3820, change compared to prior gap 3822, and consistency 3824 are described below with reference to FIG. 32.

It should be understood that the types of data shown in FIGS. 4, 5, 6, 7A, 7B, 36, 37, and 38 are for example purposes only and that other types of data can also be included in databases 102, 106, 110, 112, 114, and 122, as would be obvious to one skilled in the relevant art.

III. GENERAL SYSTEM OPERATION

A. Aggregator: Creation of Total and Stock Counts Database

Figure 8:
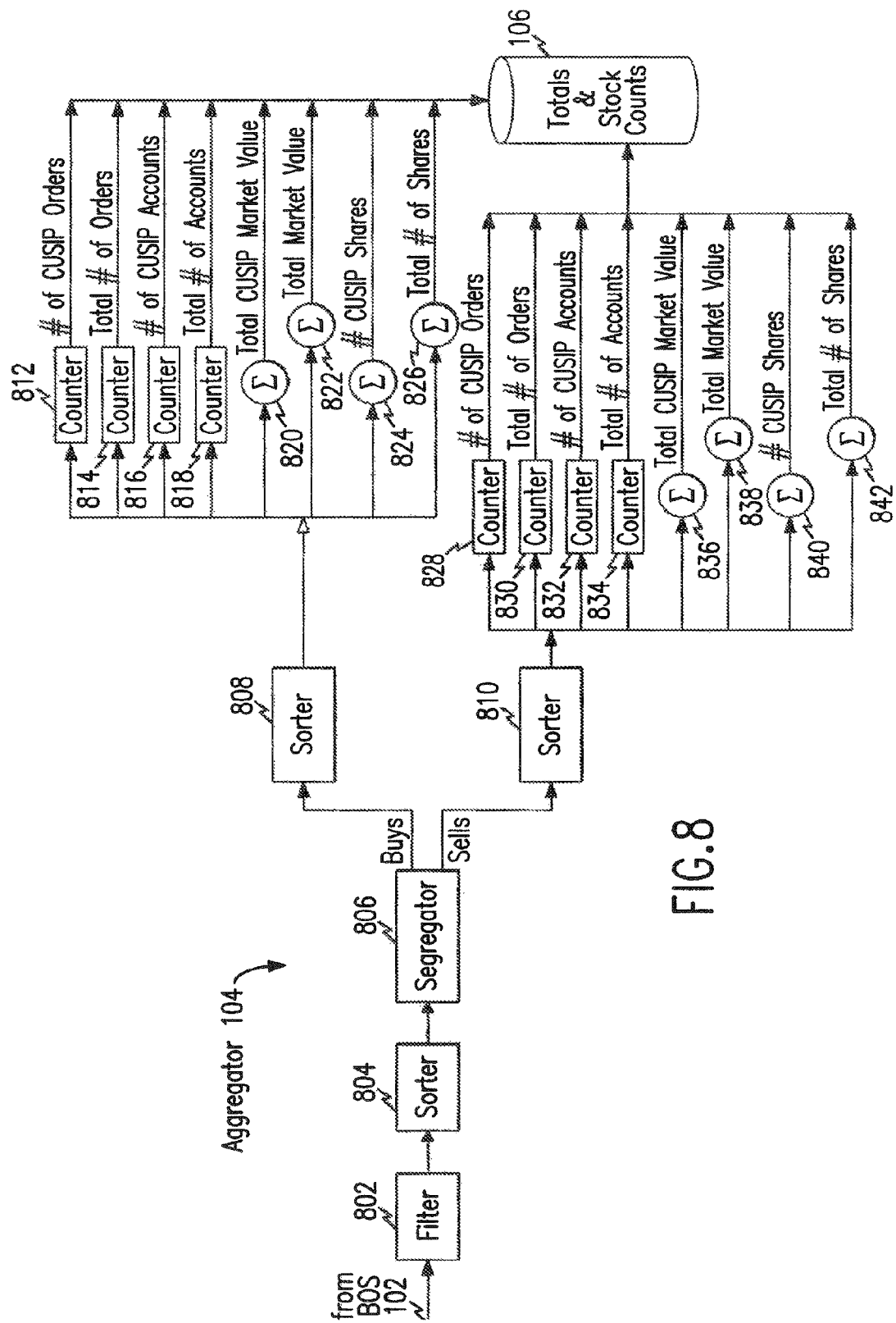
FIG. 8 is a diagram illustrating an exemplary embodiment of an aggregator.

Aggregator 104 is shown in FIG. 8. Aggregator 104 functions as a shield to protect individual investor privacy. Aggregator 104 also functions as a sieve to sift out unwanted records, separate records into categories, and count daily totals. Aggregator 104 comprises a filter 802, a plurality of sorters 804, 808, and 810, a segregator 806, a plurality of counters 812-818 and 828-834, and a plurality of summation indicators 820-826 and 836-842.

Filter 802 is coupled to sorter 804. Sorter 804 is coupled to segregator 806. Segregator 806 is coupled to sorters 808 and 810. Sorter 808 is coupled to counters 812-818 and summation indicators 820-826. Sorter 810 is coupled to counters 828-834 and summation indicators 836-842. Counters 812-818 and 828-834 are coupled to totals & stock counts database 106. Summation indicators 820-826 and 836-842 are also coupled to totals & stock counts database 106.

Filter 802 is used to eliminate suspected seasonal data. In a preferred embodiment, filter 802 eliminates all accounts except individual regular accounts. In another embodiment, filter 802 eliminates all accounts except individual regular accounts and sole proprietorship accounts. In yet another embodiment, filter 802 eliminates all accounts except individual regular accounts, sole proprietorship accounts; and partnership accounts.

Alternatively, filter 802 could be used to treat and remove the seasonal component from retirement accounts as well as other accounts that may contain seasonal data using the U.S. Census Bureau's X11 procedure.

Sorter 804 is used to sort out multiple records that show a buy order and a sell order for the same account number 408 and CUSIP 419 on the same date 416. Such a scenario having a buy order and a sell order from the same account number 408 for the same CUSIP 419 on the same date 416 indicates a "day trader." One embodiment of the present invention is directed to "investors" and not "day traders." It should be noted that another embodiment of the present invention may not only include "day traders," but also growth oriented or income oriented investors. Referring back to FIG. 4, BOS database 102 includes a day trader 426. Customer 402 having account number 408 of "9921" is day trader 426. As shown in database 102, the same number of shares 420 ("1000") was both bought and sold for the same CUSIP 419 ("AMT") on the same date 416 ("Jan. 5, 1999") by account number 408 ("9921"). As stated previously, in a preferred embodiment of the present invention, all day traders 426 are eliminated from the stock purchase indices of the present invention.

Referring back to FIG. 8, once all day traders 426 have been eliminated, segregator 806 divides the remaining records into buys and sells. A snapshot of how the data in BOS database 102 is organized after segregation by segregator 806 is shown below in Table 1. As can be seen in Table, 1, day trader 426 has been eliminated.

TABLE 1

| Date | Buy or Sell | CUSIP | Account No. | No. of Orders | No. of Shares | Value |
|---|---|---|---|---|---|---|
| Jan. 4, 1999 | Buy | AMT | 1234 | 1 | 50 | $500 |
| Jan. 4, 1999 | Buy | AMT | 3455 | 1 | 50 | $500 |
| Jan. 4, 1999 | Buy | AMT | 7210 | 2 | 250 | $2,500 |
| Jan. 5, 1999 | Buy | AMT | 4266 | 1 | 355 | $3,195 |
| ... | ... | ... | ... | ... | ... | ... |
| Jan. 4, 1999 | Sell | AMT | 6978 | 3 | 500 | $6,000 |
| Jan. 4, 1999 | Sell | AMT | 4467 | 1 | 200 | $1,000 |
| Jan. 5, 1999 | Sell | AMT | 3499 | 1 | 350 | $3,500 |
| ... | ... | ... | ... | ... | ... | ... |
| Jan. 4, 1999 | Buy | MSF | 1234 | 1 | 500 | $4,000 |
| Jan. 4, 1999 | Buy | MSF | 2855 | 1 | 1000 | $8,000 |
| Jan. 5, 1999 | Buy | MSF | 4900 | 1 | 1000 | $11,000 |
| Jan. 5, 1999 | Buy | MSF | 4523 | 1 | 1000 | $11,000 |
| ... | ... | ... | ... | ... | ... | ... |
| Jan. 4, 1999 | Sell | MSF | 3980 | 1 | 800 | $5,600 |
| Jan. 4, 1999 | Sell | MSF | 2583 | 2 | 3000 | $21,000 |
| Jan. 5, 1999 | Sell | MSF | 4266 | 1 | 100 | $150 |
| ... | ... | ... | ... | ... | ... | ... |
| Jan. 4, 1999 | Buy | CMQ | 2583 | 1 | 1000 | $5,000 |
| ... | ... | ... | ... | ... | ... | ... |
| Jan. 4, 1999 | Sell | GET | 1988 | 1 | 200 | $4,000 |
| ... | ... | ... | ... | ... | ... | ... |

Sorters 808 and 810 sort the buy and sell records respectively, by CUSIP 419. Aggregator 104 then counts and sums various, transactional values for each date 416 according to CUSIP 419. Aggregator 104 also counts and sums transactional values for each date 416, for all CUSIPs 419, to produce daily totals. A detailed description of how aggregator 104 counts and sums values for each date 416 by CUSIP 419 will be explained first. A detailed description of how aggregator 104 counts and sums values for each date 416, for all CUSIPs 419, will follow.

Referring now to both FIGS. 5 and 8, counters 812 and 828 count the number of buy and sell orders 504 for each CUSIP 419. Counters 816 and 832 count the number of accounts 502 that bought or sold a particular CUSIP 419 on date 416, respectively. The market value of CUSIP 419 refers to the value of its stock (at the time it was traded) multiplied by the number of shares 506 traded. Summation indicators 820 and 836 sum the market values 508 for each CUSIP 419 bought or sold on date 416, respectively. Summation indicators 824 and 840 sum the number of shares 506 bought or sold, respectively, for a particular CUSIP 419.

A detailed description of how aggregator 104 counts and sums values for each date 416, independent of CUSIP 419, will now be explained. Counters 814 and 830 count the total number of orders 504 for all CUSIPs 419 bought and sold on date 416, respectively. Counters 818 and 834 count the total number of accounts 502 that bought or sold stock, respectively, on date 416. Summation indicators 822 and 838 sum the total market value for all CUSIPs 419 bought and sold, respectively on date 416. Summation indicators 826 and 842 sum the total number of shares bought and sold, respectively, on date 416. Note that the total market value and the total number of shares cannot be determined by summation indicators 822, 826, 838, and 842 until all CUSIP totals for date 416 have been determined. These totals are then stored in records 510 and 512 of total and stock counts database 106 for later use by moving average generator 108.

Figure 9:
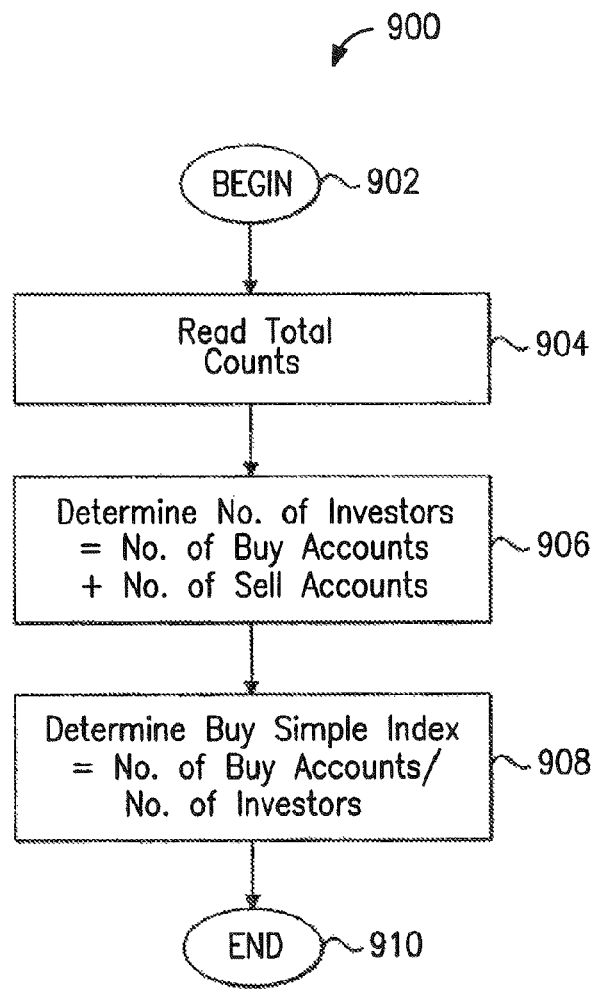
FIG. 9 is a flow diagram for determining a simple buy index.

B. Moving Average Generator: Creation of Buy Simple Index and Sell Simple Index As stated above, moving average generator 108 calculates the stock purchase indices of the present invention. Such indices include buy simple index 626 and sell simple index 628. FIG. 9 represents a flow diagram 900 of the method used to determine buy simple index 626. The process begins with step 902 where control is immediately passed to step 904. In step 904, the total and stock counts, from records 510 and 512 of database 106 are read into memory. Control then passes to step 906.

In step 906, the total number of investors are determined for each series 602, period 604, and date 416. The number of investors is determined by number of buy accounts 606 plus number of sell accounts 608. Control then passes to step 908.

In step 908, buy simple index 626 is determined. Buy simple index 626, is determined by number of buy accounts 606 divided by the number of investors. Control then passes to step 910 where the process ends.

In a similar manner, sell simple index 628 is determined. Sell simple index 628 is determined by number of sell accounts 608 divided by the number of investors.

Figure 10A:
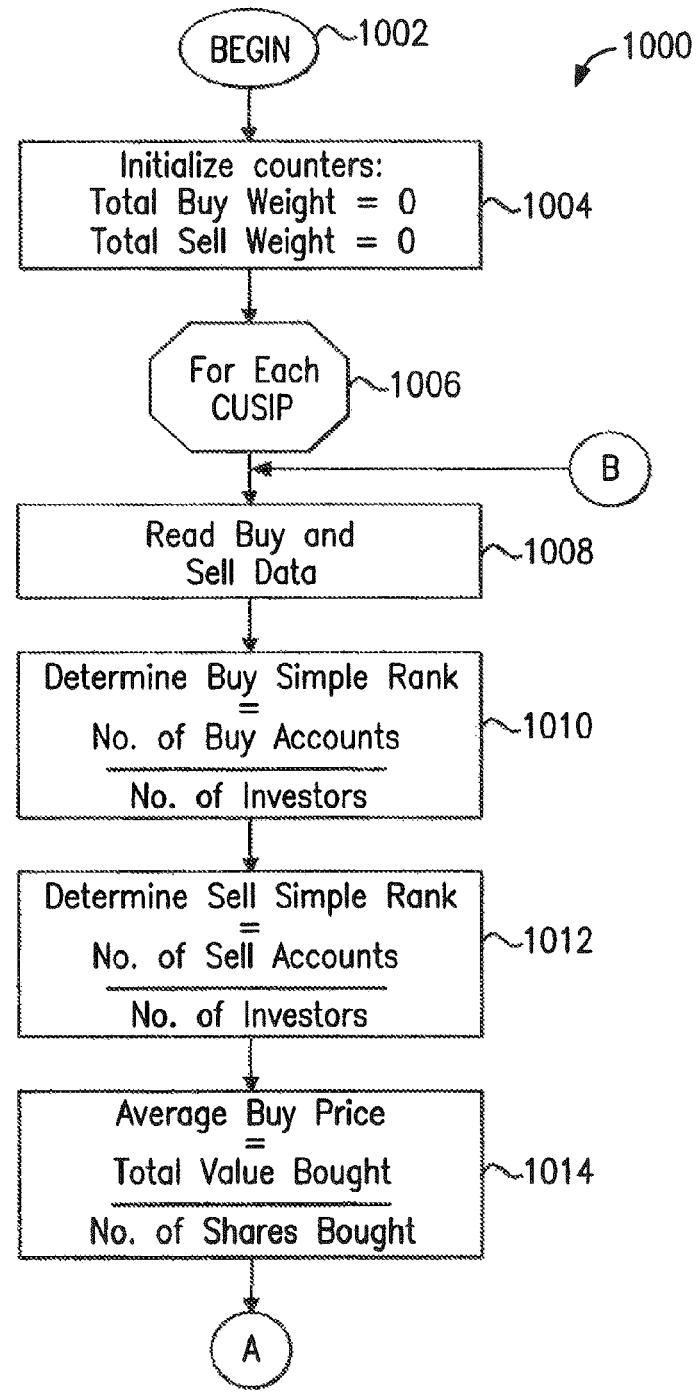
FIGS. 10A and 10B are flow diagrams for determining a weighted buy index.
Figure 10B:
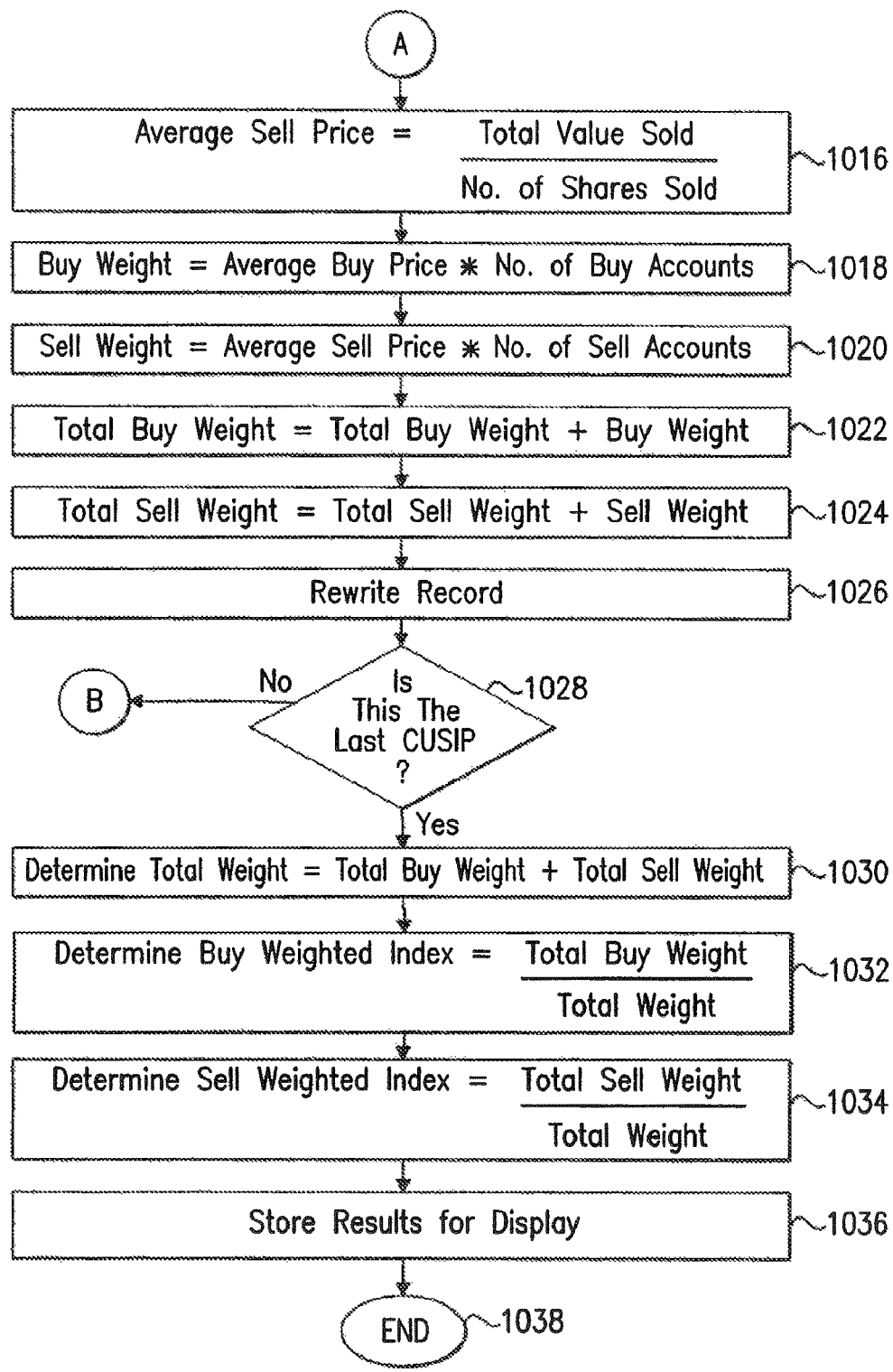

C. Moving Average Generator: Creation of Buy Simple Rank, Sell Simple Rank, Buy Weighted Index, and Sell Weighted Index As previously stated, moving average generator 108 determines the stock purchase indices of the present invention, including buy weighted index 630 and sell weighted index 632. FIGS. 10A and 10B represent a flow diagram 1000 of the method used to determine buy weighted index 630, sell weighted index 632, buy simple rank 706, and sell simple rank 708. In FIG. 10A, the process begins with step 1002 where control is immediately passed to step 1004.

In step 1004, counters are initialized. Specifically, a total buy weight counter and a total sell weight counter are initialized to zero. Control then passes to step 1006.

In step 1006, an iterative loop process begins for determining buy weighted index 630, sell weighted index 632, buy simple rank 706, and sell simple rank 708 for each CUSIP 419. This iterative loop process is repeated for each CUSIP 419 sold on day 416. Control then passes to step 1008.

In step 1008, all required data from total and stock counts database 106 for the current CUSIP are read into memory. Control then passes to step 1010. In step 1010, buy simple rank 706 is determined. Buy simple rank 706 is equal to number of buy accounts 606 divided by the number of investors. As described above with reference to FIG. 9, the number of investors is determined by number of buy accounts 606 plus number of sell accounts 608. Control then passes to step 1012.

In step 1012, sell simple rank 708 is determined. Sell simple rank 708 is equal to number of sell accounts 608 divided by the number of investors. Control then passes to step 1014.

In step 1014, average buy price 702 is determined. Average buy price 702 is equal to total value bought 618 divided by number of shares bought 614. Control then passes to step 1016 in FIG. 10B.

In step 1016, average sell price 704 is determined. Average sell price 704 is equal to total value sold 620 divided by number of shares sold 616. Control then passes to step 1018.

In steps 1018 and 1020, buy weight 622 and sell weight 624 are determined, respectively. In step 1018, buy weight 622 is equal to average buy price 702 multiplied by number of buy accounts 606. Control then passes to step 1020.

In step 1020, sell weight 624 is equal to average sell price 704 multiplied by number of sell accounts 608. Control then passes to step 1022.

In steps 1022 and 1024, the total buy weight and the total sell weight are determined, respectively. In step 1022, the total buy weight is equal to the previously determined total buy weight plus current buy weight 622. Control then passes to step 1024.

In step 1024, the total sell weight is equal to the previously determined total sell weight plus current sell weight 624. Control then passes to step 1026.

In step 1026, for the current CUSIP 419, buy simple rank 706, sell simple rank 708, average buy price 702, average sell price 704, buy weight 622, and sell weight 624 are stored in memory. Control then passes to decision step 1028.

In decision step 1028, it is determined whether the current CUSIP 419 is the last CUSIP 419 for the same period for day 416. If the current CUSIP 419 is not the last CUSIP 419, control passes back to step 1008 in FIG. 10A where the process is repeated for the next CUSIP 419.

Referring back to step 1028, if it is determined that the current CUSIP 419 is the last CUSIP 419 for the same period on day 416, then control passes to step 1030.

In step 1030, the total weight is determined. The total weight is equal to the total buy weight plus the total sell weight. Control then passes to step 1032.

In step 1032, buy weighted index 630 is determined. Buy weighted index 630 is equal to the total buy weight divided by the total weight. Control then passes to step 1034.

In step 1034, sell weighted index 632 is determined. Sell weighted index 632 is equal to the total sell weight divided by the total weight. Control then passes to step 1036.

In step 1036, buy weighted index 630, sell weighted index 632, buy simple rank 706, and sell simple rank 708 are stored in database 110 for future display to a user. Control then passes to step 1038 where the process ends.

Figure 11:
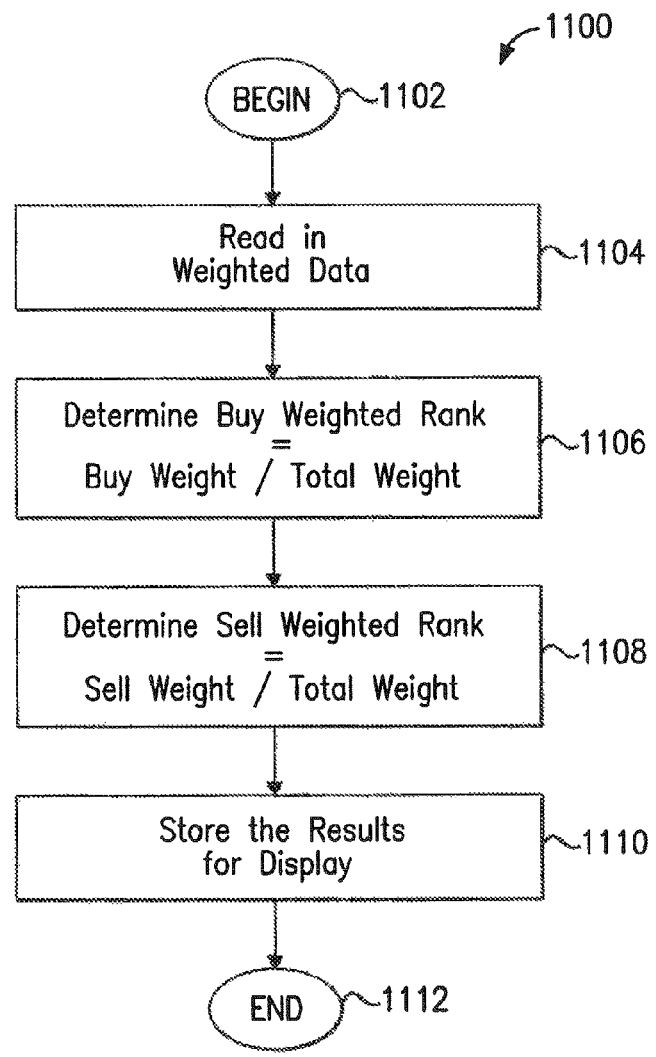
FIG. 11 is a flow diagram for determining stock ranking.

D. Moving Average Generator: Creation of Buy Weighted Rank and Sell Weighted Rank Moving average generator 108 also calculates buy weighted rank 710 and sell weighted rank 712. FIG. 11 represents a flow diagram 1100 of the method used to determine buy weighted rank 710 and sell weighted rank 712 of the present invention. The process begins with step 1102 where control is immediately passed to step 1104.

In step 1104, buy weight 622, sell weight 624, and the total weight (all calculated in flow diagram 1000) are read from memory. Control then passes to step 1106.

In step 1106, buy weighted rank 710 is determined. Buy weighted rank 710 is equal to buy weight 622 divided by the total weight. Control then passes to step 1108.

In step 1108, sell weighted rank 712 is determined. Sell weighted rank 712 is equal to sell weight 624 divided by the total weight. Control then passes to step 1110.

In step 1110, buy weighted rank 710 and sell weighted rank 712 are stored in database 112 for future selection ranking and display to a user. Control then passes to step 1112 where the process ends.

FIGS. 12A, 12B, and 12C contain examples of specific values for buy and sell simple ranks 706 and 708, buy and sell weighted ranks 710 and 712, buy and sell simple indices 626 and 628, and buy and sell weighted indices 630 and 632.

E. Smoothing Techniques

To reduce the amount of data variation that is generated from daily tallies of the stock purchase indices, smoothing techniques over a period of time are employed. The smoothing technique used by the present invention is a moving average that is determined for periods of 5, 9, and 21 days or weeks. A weighted moving average formula 1302 used to smooth the stock purchase indices data is shown in FIG. 13. Data in weighted moving average formula 1302 is weighted by the number of investors. Stock purchase indices data is stored as an array of records sorted by date, with the last array element being the most current day's record. The (k−i+1) index is used to represent the current day's records as well as the record's offset from the current day to the period covered.

Figure 14:
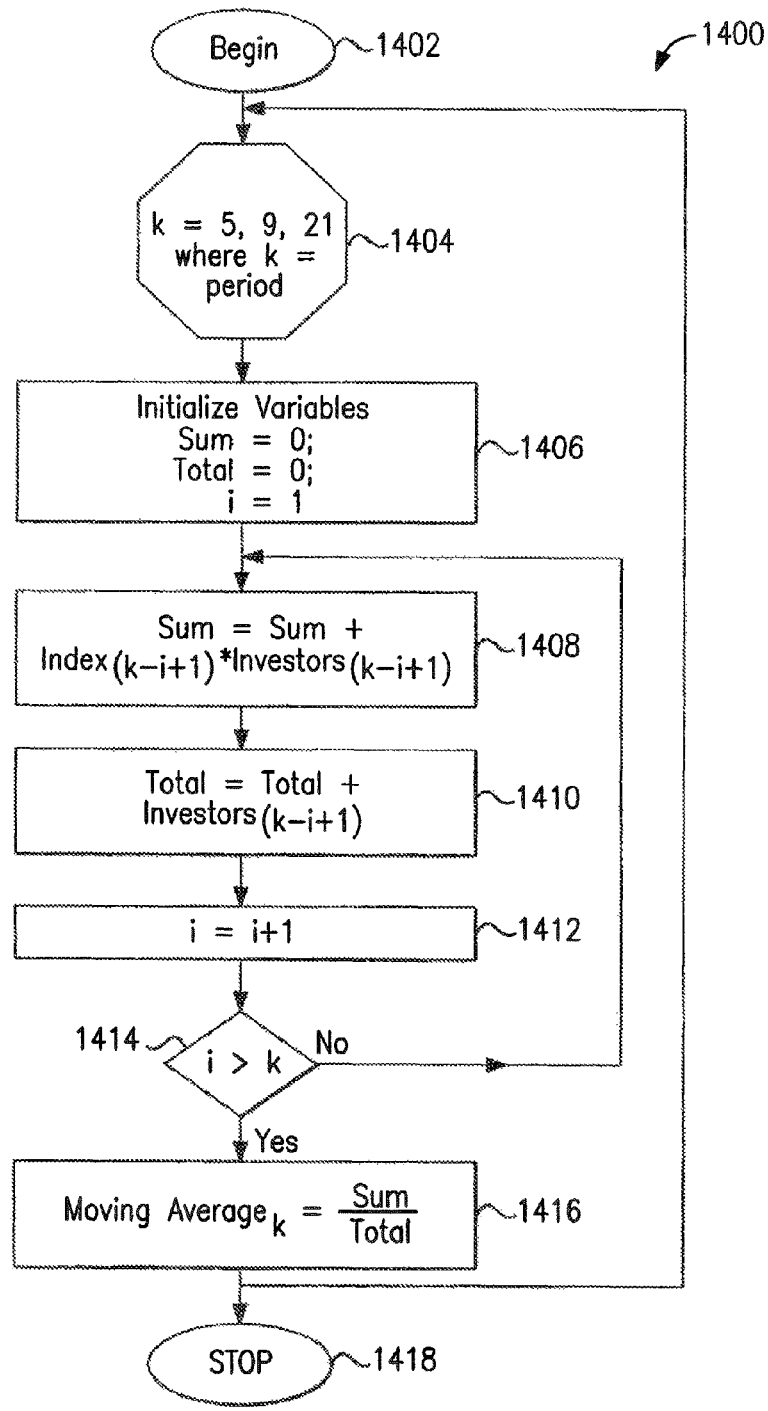
FIG. 14 is a flow diagram for determining moving index averages.

For example, a five-day period beginning on ending date Jan. 8, 1999 uses records of Jan. 8, 1999-Jan. 4, 1999. The method used to generate a 5, 9, or 21 period average is shown in FIG. 14. The process begins with step 1402 where control is passed to step 1404.

In step 1404, k is set equal to 5, where k is the period. Control then passes to step 1406.

In step 1406 variables are initialized. Here, sum is set equal to 0, total is set equal to 0, and i is set equal to 1. The variable, sum is used to sum the stock purchase index times the number of investors for each day within the period. The variable total is used to sum the number of investors for each day within the period. Control then passes to step 1408.

In step 1408, sum is set equal to the previously determined sum plus index(k−i+1) times the number of investors(k−i+1). Control then passes to step 1410. In step 1410, total is set equal to the previously determined total plus the number of investors(k−i+1). Control then passes to step 1412.

In step 1412, i is incremented by 1 in order to select the previous day or week in period k. Control then passes to decision step 1414.

In decision step 1414, if it is determined that i is less than or equal to k, control passes back to step 1408 where the sum and the totals are determined for each day or week within period k, and where i is incremented.

Referring back to decision step 1414, if it is determined that i is greater than k, all the data for the current period k has been determined. Control then passes to step 1416.

In step 1416, the moving average index for period k is determined. The moving average index is equal to the sum divided by the total. Control then passes back to, step 1404 where the process repeats for moving averages of k=9 and/or k=21 are determined. Once the moving averages for all three periods have been calculated, control then passes from step 1416 to 1418 where the process ends.

An example 1500 of a five (5) period moving average is shown in FIG. 15. Five (5) period moving averages are determined by applying formula 1302 to the current and four preceding daily or weekly stock purchase index, results. Example 1500 is a five (5) period daily moving average. A first 5-day period average is shown in a record 1514. In record 1514, buy simple index 1512 of 49% was determined by using daily totals from ending date Jan. 8, 1999 through starting date Jan. 4, 1999 (i.e., ((60%*6)+(45%*5)+(48%*11)+(53%*7)+(42%*8))/(6+5+11+7+8)=49%). A second 5-day period average is shown in a record 1516. In record 1516, buy simple index 1512 of 49% was determined by using daily totals from ending date Jan. 11, 1999 through starting date Jan. 5, 1999 (i.e., ((45%*5)+(48%*11)+(53%*7)+(42%*8)+(56%*9))/(5+11+7+8+9)=49%). As can be seen from the dates used in the determination of record 1516, a new moving average is determined by dropping the oldest of the 5 preceding stock purchase index results and adding the sixth now current day, stock purchase index results and reapplying formula 1302 to determine the average as shown in record 1516. Note that market holidays and weekends will be adjusted to include only trading days in the period average. This continues as each new daily stock purchase index results are available at market close. The 5-day moving averages that result on Friday, or the end of the trading week, are used to generate the weekly period series. This weekly series is then used as the basis for a similar process to determine weekly moving averages.

For periods of 9 and 21 the above process is repeated with the exception that in the case of the 9 period, formula 1302 uses the current day or week and the 8 preceding daily or weekly stock purchase index results, and for the 21 period formula, the 21$^{st}$ day or week and the 20 preceding daily or weekly stock purchase index results are used.

F. Time Series Analysis

Time series decomposition involves analysis of the recurring and periodic variations in data, especially economic series. All time series include trend, cycle, seasonal, and irregular components expressed as the following formula:

Time Series=trend*cycle*seasonal*irregular

The purpose of our statistical treatment is to remove the irregular and seasonal factors from the data so as to have a clear measure of any trend and cycle variations in buyer purchasing. The irregular component or "noise" is removed by applying a moving average. The seasonal component is removed by aggregator 104 by removing undesirable records. For example, aggregator 104 removes all individual retirement accounts as described above and puts them into a separate time series. A seasonal component is a recurring variation up or down that occurs in a time series at about the same time each year. A seasonal component could be related to year-end tax requirements such as a deadline for when individual retirement accounts contributions have to be deposited. This seasonal component could be measured using a ratio to moving average technique if there is a sufficient number of periods to apply the analysis.

By segregating out the individual retirement accounts and their seasonable component and by using a moving average to remove the irregular component, we have isolated the trend and cycle components. Now, Time Series=(trend*cycle*seasonal*irregular)/(seasonal*irregular)=trend*cycle.

This focuses on the desired measurement of variation in how investor participation relates to economic trend and business cycles.

Figure 16A:
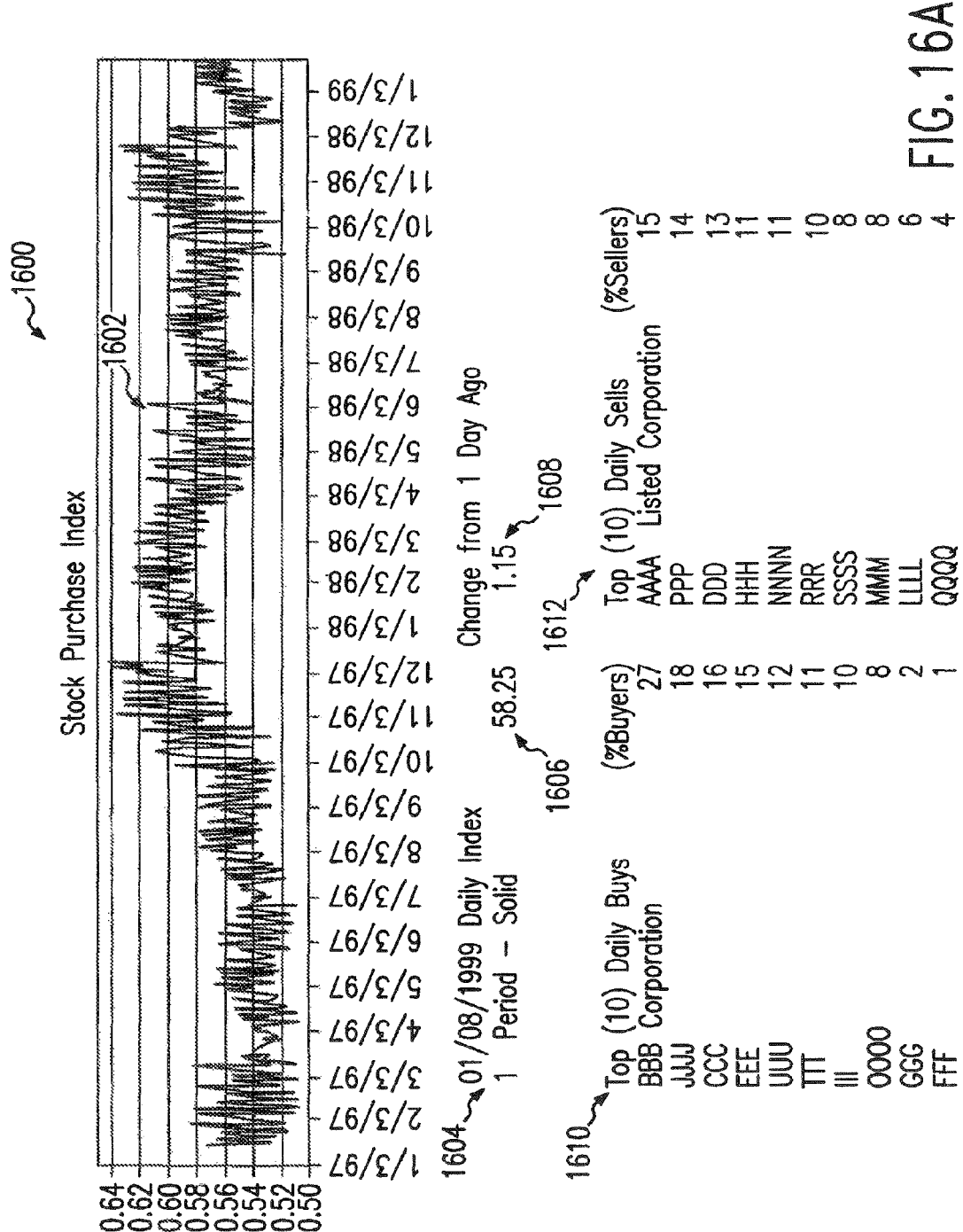
FIG. 16A is a diagram illustrating a standard daily default email report of the simple buy index.
Figure 16B:
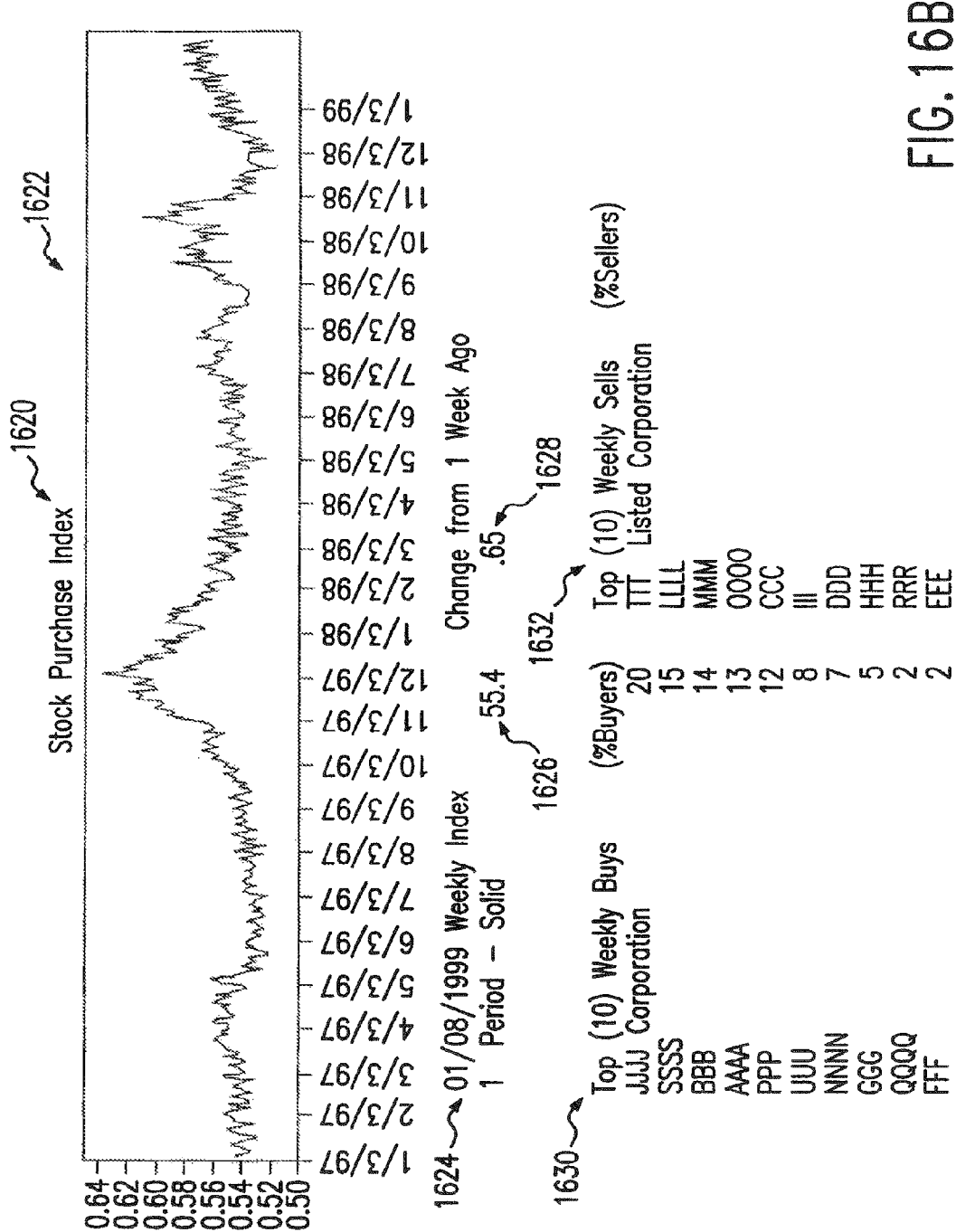
FIG. 16B is a diagram illustrating a standard weekly default email report of the simple buy index.
Figure 17:
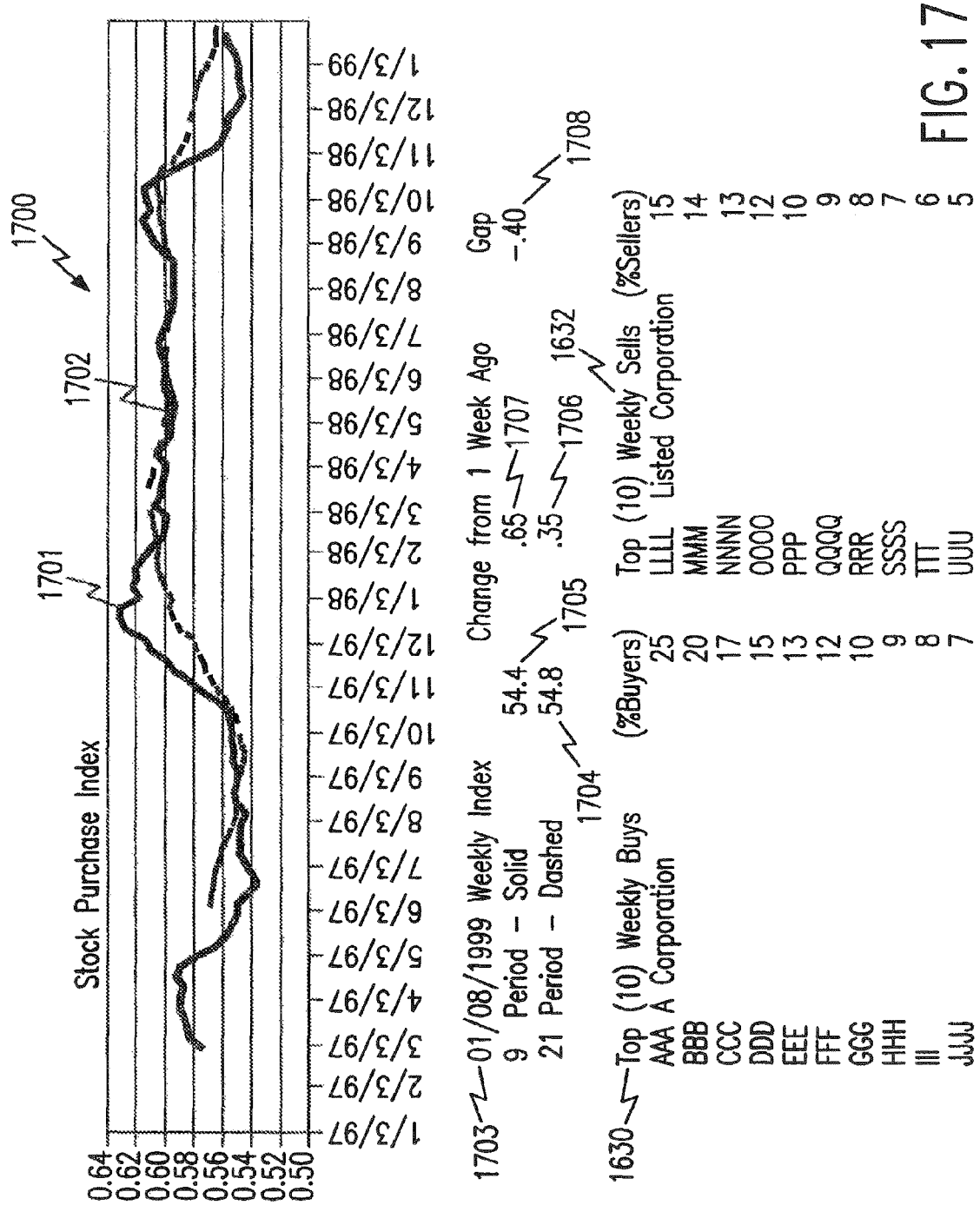
FIG. 17 is a diagram illustrating a graphical representation of the simple buy index as seen by a user logging onto the services web site.

The impact of applying the moving average, and thus removing the irregular component or "noise" from the time series data, is seen by comparing the graphs in FIGS. 16A, 16B, and 17. FIGS. 16A, 16B, and 17 represent standard default reports of buy simple index 626. FIG. 16A represents a daily buy simple index in which no smoothing techniques were applied. The data in FIG. 16A is very irregular or "noisy." FIG. 16B uses a 5 period smoothing technique in which the data is averaged over a 5-day (or weekly) period. FIG. 16B exhibits data that is less "noisy" than FIG. 16A. FIG. 17 provides a 9 and 21 period weekly smoothing technique. FIG. 17 exhibits data that is the least "noisy."

As illustrated by FIGS. 16A, 16B, and 17, the longer the time period used for smoothing the less variation or "noise" there is in the data. Although a long time period for smoothing would produce the most stable and smoothest line, there is a disadvantage to using a long time period. The disadvantage is a loss of sensitivity to changes and the delay in providing the signal of the changes. What is needed is a balance between the desired sensitivity and the desired stability. This balance leads to the use of combinations of smoothing periods, one more sensitive with a short period for smoothing such as 9, and one for more stability such as a 21 period average. By using these combinations of different periods, we can most clearly see the pattern in changes. When the 9 period average crosses the 21 smoothing line and stays consistently above it for some period of time then the underlying series is rising. When the 9 period average goes below and stays consistently below the 21 period average, then the underlying series is falling.

IV. GRAPHICAL USER INTERFACE

The user interface delivery module 116 allows a subscriber to receive a standard default report. The standard default report can be delivered to the subscriber via electronic mail (email) 118 by service subscription. Alternatively, the subscriber can actually use the system to select various output configurations by logging onto the service's web site 120. Web site 120 provides a graphical user interface that allows the user to personalize the analysis by applying filters and alerts.

The filters allow a user to select subsets of the data as well as view the data over different periods of time. The filters also allow a user to expand the stock ranking list to view more than the default top ten stocks bought and sold. Other indices may also be selected for comparison with the stock purchase indices.

Web site 120 users can also have email 118 delivery. Web site 120 users can establish criteria as to when a report can be sent by email 118 based on a change in the index from period to period or when the gap difference between two selected period measurements exceeds a specified limit. This is accomplished using alerts.

An exemplary standard daily default email report 1600 of the buy simple index 626 is shown in FIG. 16A. Standard daily default email report 1600 comprises a graphical representation of a 1 period daily buy simple index 1602, an ending date that the report issues 1604, and a numerical value for the most current buy simple index 1606. Graph 1602 shows how the buy simple index 626 varies over time. Default email report 1600 further comprises the change from the previous day's buy simple index 1608 and lists of the current day's top ten stocks bought 1610 and top ten stocks sold 1612. The current day's top ten stocks bought 1610 and top ten stocks, sold 1612 include the buy and sell percentage for each stock listed, respectively.

An exemplary standard weekly default email report 1620 of buy simple index 626 is shown in FIG. 16B. Standard weekly default email report 1620 comprises a graphical representation of a 1 period weekly buy simple index 1622, a date that the report issues 1624, and a numerical value for the most current buy simple index 1626. Graph 1622 shows how the buy simple index 626 varies, over time. Default email report 1620 further comprises the change from the previous week's buy simple index 1628 and lists of the current week's top ten stocks bought 1630 and top ten stocks sold 1632. The current week's top ten stocks bought 1630 and top ten stocks sold 1632 include the buy and sell percentage for each stock listed, respectively.

FIG. 17 is an exemplary standard default web site report 1700 of buy simple index 626 as seen by users that log onto the service's web site 120. Standard default web site report 1700 comprises a base series graphical representation of a 9 period weekly buy simple index 1701, a comparison series graphical representation of a 21 period weekly buy simple index 1702, a first numerical value of the weekly buy simple index for the most current 9-week period 1705, a second numerical value of the weekly buy simple index for the most current 21-week period 1704, a first measurement change from the previous week for the 9-week period 1707, a second measurement change from the previous week for the 21-week period 1706, and a gap measurement 1708, representing the difference between the ending reported 9 period average versus the 21 period average. Although the base series graph and the comparison series graph are presented for the 9 and 21 period weekly buy simple index, it should be readily apparent to those skilled in the art that other period time frames can be used for the base and comparison series graphs. Standard default web site report 1700 further includes lists of the current week's top ten stocks bought 1630 and top ten stocks sold 1632. The current week's top ten stocks bought 1630 and top ten stocks sold 1632 include the buyer and seller percentage for each stock listed, respectively.

As previously stated, a user logging onto web site 120 has the ability to customize the output. Customization of the output is provided via the use of filters and alerts. Filters and alerts are enabled when a user selects a desired parameter to be changed on the graphical display. The user can select the desired parameter to be changed by positioning the cursor on the parameter and right clicking on that parameter using a mouse. The location or spot in which the user right clicks: is referred to as a hot spot. Right clicking on the hot spot activates a user help function and causes a filter or an alert display arrow to appear. The display arrow includes instructions and explanations of filter and alert functions. The user can also left click on the hot spot to activate a control selection window. Left clicking on the hot spot causes the control selection window to appear. The control selection window comprises a list of possible choices to change the desired parameter. The user can position the cursor on one of the choices presented in the control selection window and double click on the mouse to activate the new selection. Double clicking the mouse updates the displayed results according to the new parameter selection. After the display is updated, the display arrow and control selection box are no longer shown on the display. A detailed, description of the types of filters that can be applied by a user to customize the output is described below. The following description will be better understood if read in conjunction with filter controls database 3504, shown in FIG. 37.

FIG. 18 illustrates the application of a filter to select a daily or weekly series for standard default web site report 1800. The desired parameter to be changed is series type 3710. Series type 3710 parameter is presently set to "Weekly" in FIG. 18. Positioning the cursor within or in close proximity to the parameter "Weekly" and right clicking using the mouse causes a display arrow 1802 to appear. The area surrounding the parameter "Weekly" is now referred to as a hot spot 1804. Hot spot 1804 is shown in phantom. Display arrow 1802 points directly to series type 3710 parameter. Positioning the cursor within hot spot 1804 and using a left click will cause a control selection window 1806 to appear. Control selection window 1806 comprises series type 3710 parameters and start date 3711. The user can change series type 3710 parameter from "Weekly" to "Daily" by double clicking the mouse on the desired selection. The user can also enter a start date 3711 for the graphical display.

FIG. 19 illustrates the application of a filter to select different smoothing period lengths. The desired parameter to be changed is base smoothing period length 3714. Base smoothing period length 3714 is presently set to "9 Period" in FIG. 19. Positioning the cursor within or in close proximity to the parameter "9 Period" and right clicking using the mouse causes a display arrow 1802 to appear. The area surrounding the parameter "9 Period" is now hot spot 1804. Hot spot 1804 is shown in phantom. The user can also position the cursor within hot spot 1804 and left click the mouse to cause control selection window 1806 to appear. Control selection window 1806 provides a list of all of the desired base smoothing period lengths that can be selected by the user. Base smoothing period length 3714 parameters include 1 (indicating no smoothing), 5, 9, and 21. The user can now select the desired base smoothing period length 3714 parameter by double clicking the mouse on the desired selection.

FIG. 20 illustrates the application of a filter to select different smoothing period lengths for comparison series 1702. The desired parameter to be changed is comparison smoothing period length 3716. Comparison smoothing period length 3716 is presently set to "21 Period" in FIG. 20. Positioning the cursor within or in close proximity to the parameter "21 Period" and right clicking using the mouse causes display arrow 1802 to appear. The area surrounding the parameter "21 Period" is now hot spot 1804. Hot spot 1804 is shown in phantom. The user can also position the cursor within hot spot 1804 and left click the mouse to cause control selection window 1806 to appear. Control selection window 1806 provides a list of all of the desired comparison smoothing period lengths that can be selected by the user. Comparison smoothing period length 3716 parameters include 1 (indicating no smoothing), 5, 9, and 21. The user can now select the desired comparison smoothing period length 3716 parameter by double clicking the mouse on the desired selection.

Figure 24:
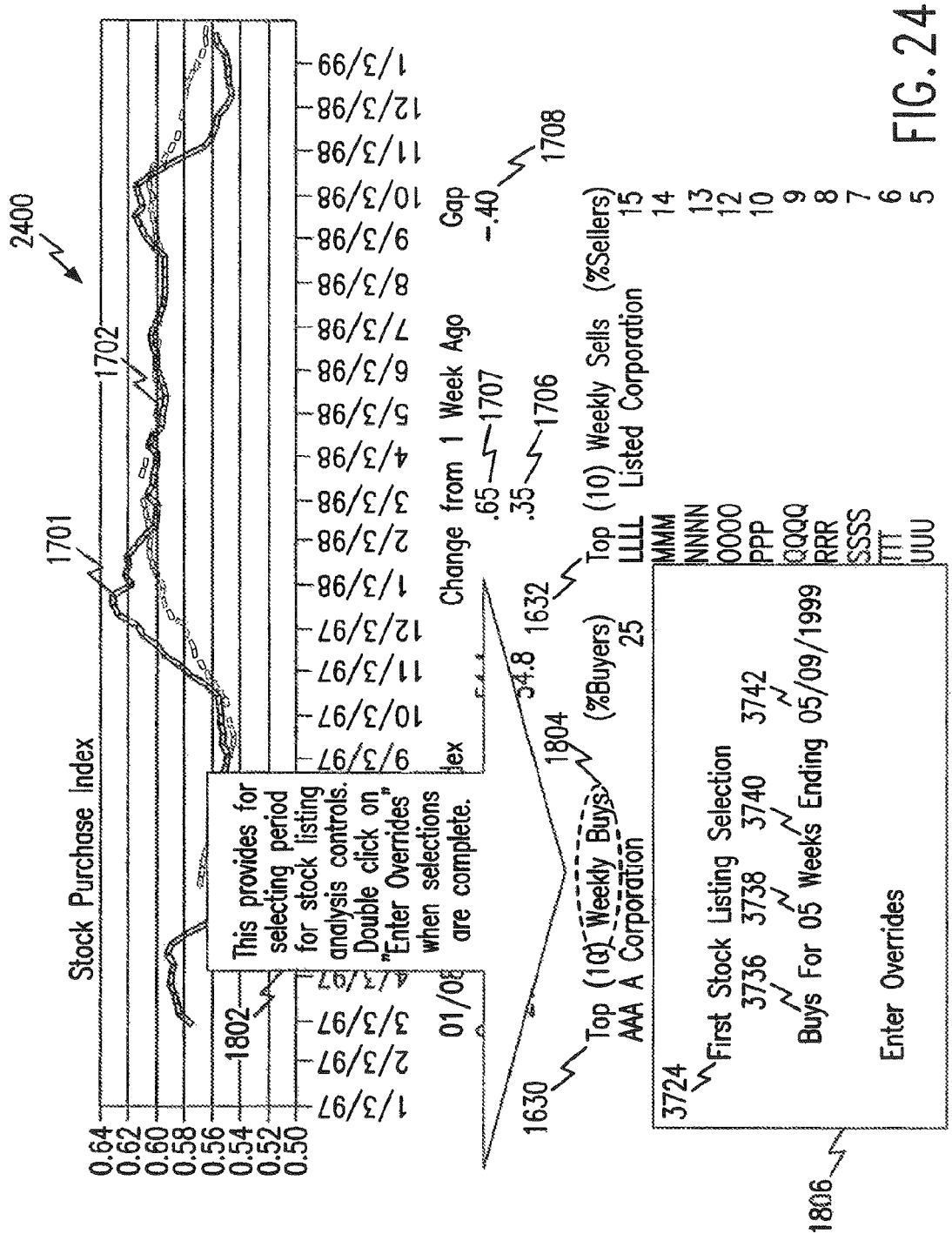
FIG. 24 is a diagram illustrating the application of a filter that allows the first stock listing selections to be changed.
Figure 25:
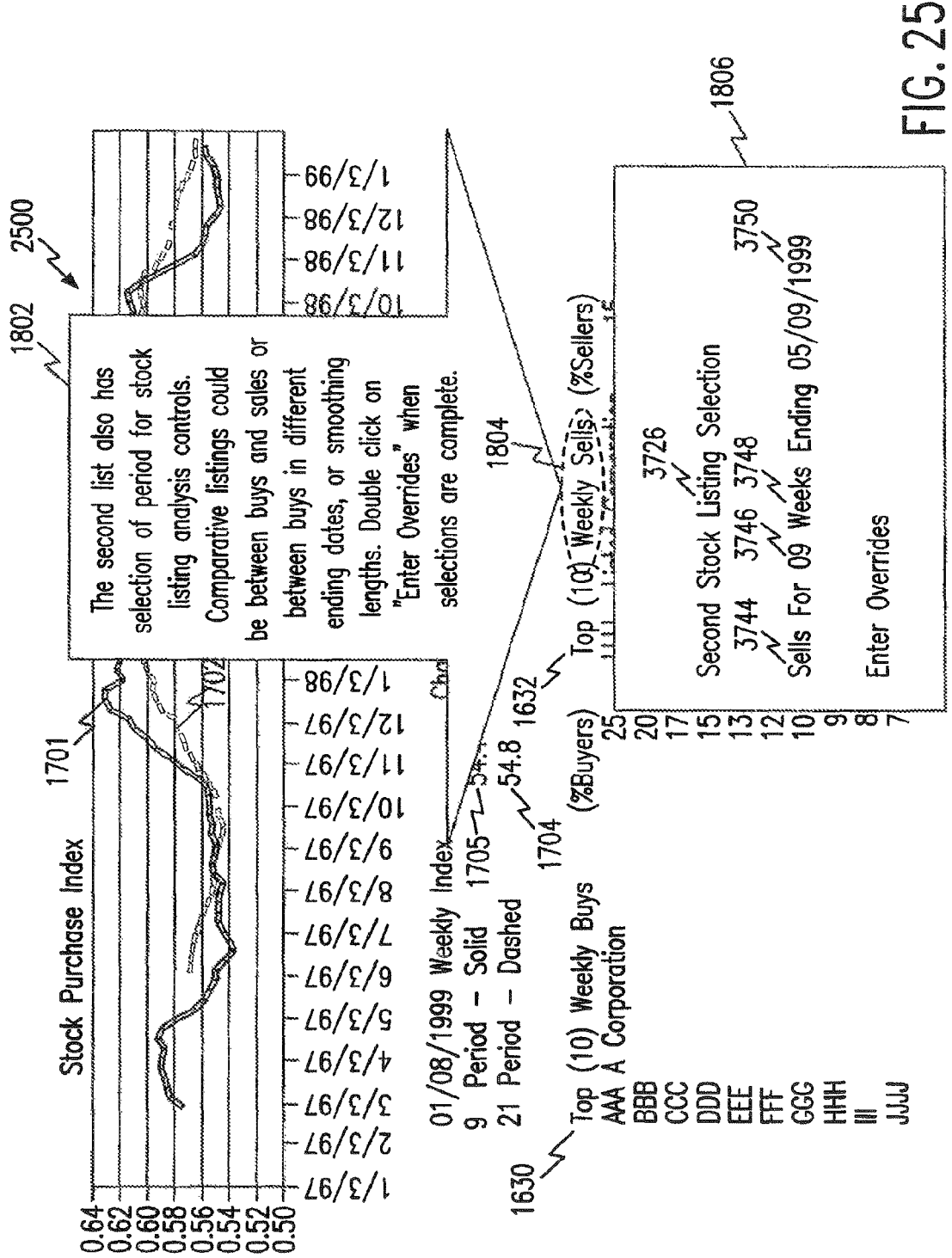
FIG. 25 is a diagram illustrating the application of a filter for allowing the second stock listing selections to be changed.

FIG. 21 illustrates the application of a filter to select an ending date for period-to-period change reporting and stock listings. The desired parameter to be changed is ending date 3718. Ending date 3718 parameter is presently set to "Jan. 8, 1999" in FIG. 21. Note that the default filter setting for the ending date is always the current date, but the user can select other dates for comparison. The ending date 3718 selected will be used as the default for filter stock listing selection controls 3724 and 3726, as shown in FIGS. 24 and 25. The current ending date is automatically reset when the user has completed his or her analysis. Positioning the cursor within or in close proximity to the parameter "Jan. 8, 1999" and right clicking using the mouse causes display arrow 1802 to appear. The area surrounding the parameter "Jan. 8, 1999" is now hot spot 1804. Hot spot 1804 is shown in phantom. The user can also position the cursor within hot spot 1804 and left click the mouse to cause control selection window 1806 to appear. Control selection window 1806 provides a list of all of the desired ending dates 3718 that can be selected by the user. The user can now select the desired ending date 3718 parameter by double clicking the mouse on the desired selection. The change of ending date 3718 also causes a change in top ten stocks bought 1630, top ten stocks sold 1632, first numerical value of the weekly buy simple index for the most current 9-week period 1705, second numerical value of the weekly buy simple index for the most current 21-week period 1704, first measurement change from the previous week for the 9-week period 1707, second measurement change from the previous week for the 21-week period 1706, and gap measurement 1708.

FIG. 22 illustrates the application of a filter that allows the length of time covered by first measurement change 1707 and second measurement change 1706 to be changed. The desired parameter to be changed is length of time for change measurement 3720. Length of time for change measurement 3720 is presently set to "1" in FIG. 22. Positioning the cursor within or in close proximity to the parameter "1" and right clicking using the mouse causes display arrow 1802 to appear. The area surrounding the parameter "1" is now hot spot 1804. Hot spot 1804 is shown in phantom. The user can also position the cursor within hot spot 1804 and left click the mouse to cause control selection window 1806 to appear. Control selection window 1806 provides an entry line for which the user can type in the desired length of time for change measurement 3720 and press "Enter." Note that beside the entry line is the current setting of length of time for change measurement 3720.

FIG. 23 illustrates the application of a filter for changing the number of stocks listed in the top ten stocks bought 1630 and top ten stocks sold 1632. The desired parameter to be changed is number of stocks to list 3722. Number of stocks to list 3722 is presently set to "10" in FIG. 23. Positioning the cursor within or in close proximity to the parameter "10" and right clicking, using the mouse causes display arrow 1802 to appear. The area surrounding the parameter "10" is now hot spot 1804. Hot spot 1804 is shown in phantom. The user can also position the cursor within hot spot 1804 and left click the mouse to cause control selection window 1806 to appear. Control selection window 1806 provides an entry line for which the user can enter the desired number of stocks to list 3722 and press "Enter." Note that to the right of the entry line is the current setting of number of stocks to list 3722.

FIG. 24 illustrates the application of a filter that allows the first stock listing selections to be changed. The desired parameters to be changed are listing selection 3736, period length 3738, series type 3740, and end date 3742 for first stock listing selection controls 3724. Positioning the cursor within or in close proximity to the parameter "Weekly Buys" and right clicking using the mouse causes display arrow 1802 to appear. The area surrounding the parameter "Weekly Buys" is now hot spot 1804. Hot spot 1804 is shown in phantom. The user can also position the cursor within hot spot 1804 and left click the mouse to cause control selection window 1806 to appear. Control selection window 1806 provides four fields: listing selection 3736, period length 3738, series type 3740, and end date 3742 for which the user can double click on each of them to change parameter settings. Double clicking on listing selection 3736 parameter (that is, "Buys") causes listing selection 3736 parameter to toggle back and forth between "Buys" and "Sells." Double clicking on period length 3738 parameter allows the user to enter the desired period. Double clicking on series type 3740 (that is, "Weeks") causes series type 3740 to toggle between "Weeks" and "Days." Double clicking on end date 3742 allows the user to enter the desired end date. The user indicates that all parameters have been entered correctly by double clicking on "Enter Overrides."

FIG. 25 illustrates the application of a filter for allowing the second stock listing selections to be changed. The desired parameters to be changed are listing selection 3744, period length 3746, series type 3748, and end date 3750 for second stock listing selection controls 3726. Positioning the cursor within or in close proximity to the parameter "Weekly Sells" for the second stock listing and right clicking using the mouse causes display arrow 1802 to appear. The area surrounding the parameter "Weekly Sells" is now hot spot 1804. Hot spot 1804 is shown in phantom. The user can also position the cursor within hot spot 1804 and, left click the mouse to cause control selection window 1806 to appear. Control selection window 1866 provides four fields: listing selection 3744, period length 3746, series type 3748, and end date 3750 for which the user can double click on each of them to change parameter settings. Double clicking on listing selection 3744 parameter (that is, "Sells") causes listing selection 3744 parameter to toggle back and, forth between"Buys" and- "Sells." Double clicking on period length 3746 parameter allows the user to enter the desired period. Double, clicking on series, type 3748 (that is, "Weeks") causes series type 3748 to toggle between "Weeks" and "Days." Double clicking on end date 3750 allows the user to enter the desired end date. The user indicates that all parameters have been entered correctly by double clicking on "Enter Overrides."

FIG. 26 illustrates the application of a filter for allowing the first stock ranking, election criteria to be changed. The desired parameter to be changed is first stock ranking selection criteria 3728. Positioning the cursor within or in close proximity to the parameter "% Buyers" and right clicking using the mouse causes display arrow 1802 to appear. The area surrounding the parameter "% Buyers" is now hot spot 1804. Hot spot 1804 is shown in phantom. The user can also position the cursor within hot spot 1804 and left click the mouse to cause control, selection window 1806 to appear. Control selection window 1806 provides a list of all of the desired first stock ranking selection criteria 3728 that can be selected by the user. First stock ranking selection criteria 3728 include % Buy Simple Rank, % Sell Simple Rank, % Buy Weighted Rank, % Sell Weighted Rank, Net % Buy, Net % Weighted Buy, % Shares Bought, % Shares Sold, % Shares Traded, % Value Bought, % Value Sold, and % Value. The user can now select the desired first stock ranking selection criteria 3728 by double clicking the mouse on the desired selection. The circle displayed around "% Buy Simple Rank" indicates that "% Buy Simple Rank" is the selection.

FIG. 27 illustrates the application of a filter that enables the second stock ranking selection criteria to be changed. The desired parameter to be changed is second stock ranking selection criteria 3730. Positioning the cursor within or in close proximity to the parameter "% Buy W" and right clicking using the mouse causes display arrow 1802 to appear. The area surrounding the parameter "% Buy W" is now hot spot 1804. Hot spot 1804 is shown in phantom. The user can also position the cursor within hot spot 1804 and left click the mouse, to cause control selection window 1806 to appear. Control selection window 1806 provides a list of all of the desired second stock ranking selection criteria that can be selected by the user. Second stock ranking selection criteria 3730 includes % Buy Simple Rank, % Sell Simple Rank, % Buy Weighted Rank, % Sell Weighted Rank, Net % Buy, Net % Weighted Buy, % Shares Bought, % Shares Sold, % Shares Traded, % Value Bought, % Value Sold, and % Value. The user can, now select the desired, second stock ranking selection criteria 3730 by double clicking the mouse on the desired selection. The circle displayed around "% Buy W" indicates that "% Buy W" is the selection.

FIGS. 28A and 28B illustrate the application of a filter for enabling all of the underlying stocks included in the stock purchase index to be changed. The desired parameter to be changed is stock selection 3708. Positioning the cursor within or in close proximity to the title of the graph and right clicking using the mouse causes display arrow 1802 to appear. The area surrounding the title of the graph is now hot spot 1804. Hot spot 1804 is shown in phantom. The user can also position the cursor within hot spot 1804 and left click the mouse to cause control selection window 1806 to appear. Control selection window 1806 provides a list of all of the desired stock selections 3708 that can be selected by the user. Stock selection 3708 includes: exchange 3606, capitalization 3610, sector 3608, and customer segment 3756. Stocks can be changed by changing the exchange the stock is listed on, the level of market capitalization, business sector, and customer segments. Exchange 3606 refers to the stock exchange that the actual stocks are listed on. Capitalization refers to the market value of the stock, that is, whether it is a penny stock, a mid-range stock, or a large capitalization stock. Sector 3608 refers to the different types of businesses, such as utilities, high tech stocks, industrials, transportation, airlines, etc. Customer segment 3756 refers to whether the customers are Americans or foreign nationals, whether the customers are high risk investors or low risk investors, etc. As shown in selection window 1806, sector was chosen to be U.S. high tech stocks. This selection is reflected in FIG. 28B where the title 2816 is revised to indicate "U.S. High Tech Sector Purchase index." All of the graphs and data of FIG. 28B reflect the new stock selection 3708 of "High Tech Stocks."

FIGS. 29A and 29B illustrate the addition of a comparison indices graph for comparing buy simple index 626 to a comparative index. The desired parameter to be changed is comparative index selection 3732. Positioning the cursor on the graph itself and right clicking using the mouse causes display arrow 1802 to appear. The user can left click the mouse to cause control selection window 1806 to appear. Control selection window 1806 provides a list of some of the desired comparative index selection 3732's that can be selected by the user by double clicking on the desired comparative index. Such comparative indices include, but are not limited to, Biotech, Dow Jones Composite, Dow Jones Industrials, U.S. High Tech, NASDAQ stock index, etc. Selecting one of the comparative index selection 3732's, causes the top 10 stock buys and top 10 stocks sold to be replaced with comparative index graphs 2902 and 2904 (representative of 9 period and 21 period comparative index graphs, respectively) shown in FIG. 29B. These additional graphs allow the direct comparison of the buy simple index in order to better understand the relationship between the indices.

FIG. 30 illustrates the application of a filter that enables a displayed comparative index to be altered by allowing the selection of weekly or daily series and moving average smoothing periods for the comparative index selection. The desired parameters to be changed are series type and smoothing selections for comparative index 3734. Positioning the cursor on the comparative index graph and right clicking using the mouse causes display arrow 1802 to appear. The area surrounding the comparative index graph is now hot spot 1804. Hot spot 1804 is shown in phantom. The user can also position the cursor within hot spot 1804 and left click the mouse to cause control selection window 1806 to appear. Control selection window 1806 provides a list of all of the current settings for the series type and smoothing selections for comparative index 3734. The user can double click on the series type to toggle it between "Weekly" and "Daily." The user can also double click on both the solid and dashed selections to enter the desired period for the base and comparison period graphs.

Next, a detailed description of the types of alerts that can be applied by a user to customize the output is described below. The following description will be better understood if read in conjunction with alert controls data 3506, shown in FIG. 38.

Figure 31:
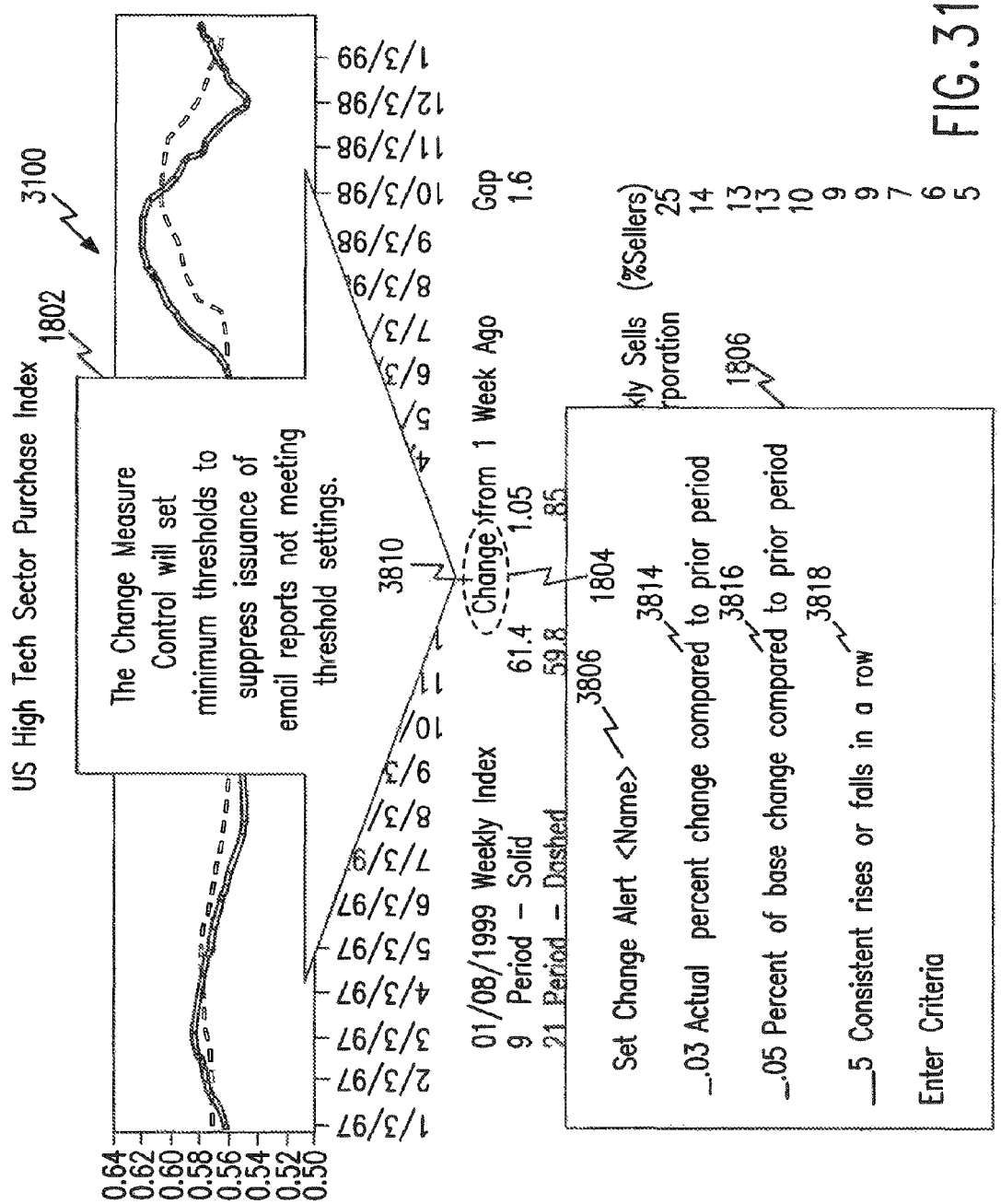
FIG. 31 is a diagram illustrating an exemplary alert setting based on changes from the prior period.

As previously stated, alerts can be set to establish criteria upon which a report for web site 120 delivery customers can be sent by email upon the triggering of an event defined by the alert. Two types of alerts are common: (1) a change measurement 3810 alert and (2) a gap measurement 3812 alert. FIG. 31 illustrates an exemplary alert setting based on change measurements from the prior period. The desired parameter to be changed is change measurement 3810. Positioning the cursor within or in close proximity to the word "Change" and right clicking using the mouse causes display arrow 1802 to appear. The area surrounding the word "Change" is now hot spot 1804. Hot spot 1804 is shown in phantom. The user can also position the cursor within hot spot 1804 and left click the mouse to cause control selection window 1806 to appear. Control selection window 1806 provides a list of all of the selections of the desired change measurement 3810 which can be chosen by the user. Change measurement 3810 parameters include: (1) Actual percent change 3814 compared to prior period; (2) Percent of base change 3816 compared to prior period; and (3) Consistent rises or falls in a row 3818. The user can select the desired change measurement 3810 by double clicking the mouse on the desired selection and entering the amount desired. A title field for an alert name 3806 can be customized by user 3702 so that on receipt of the alert email, user 3702 can immediately identify the alert setting by name. Double clicking on "Enter Criteria" will update alert controls data 3506 and cause display arrow 1802 and control selection window 1806 to disappear.

Figure 32:
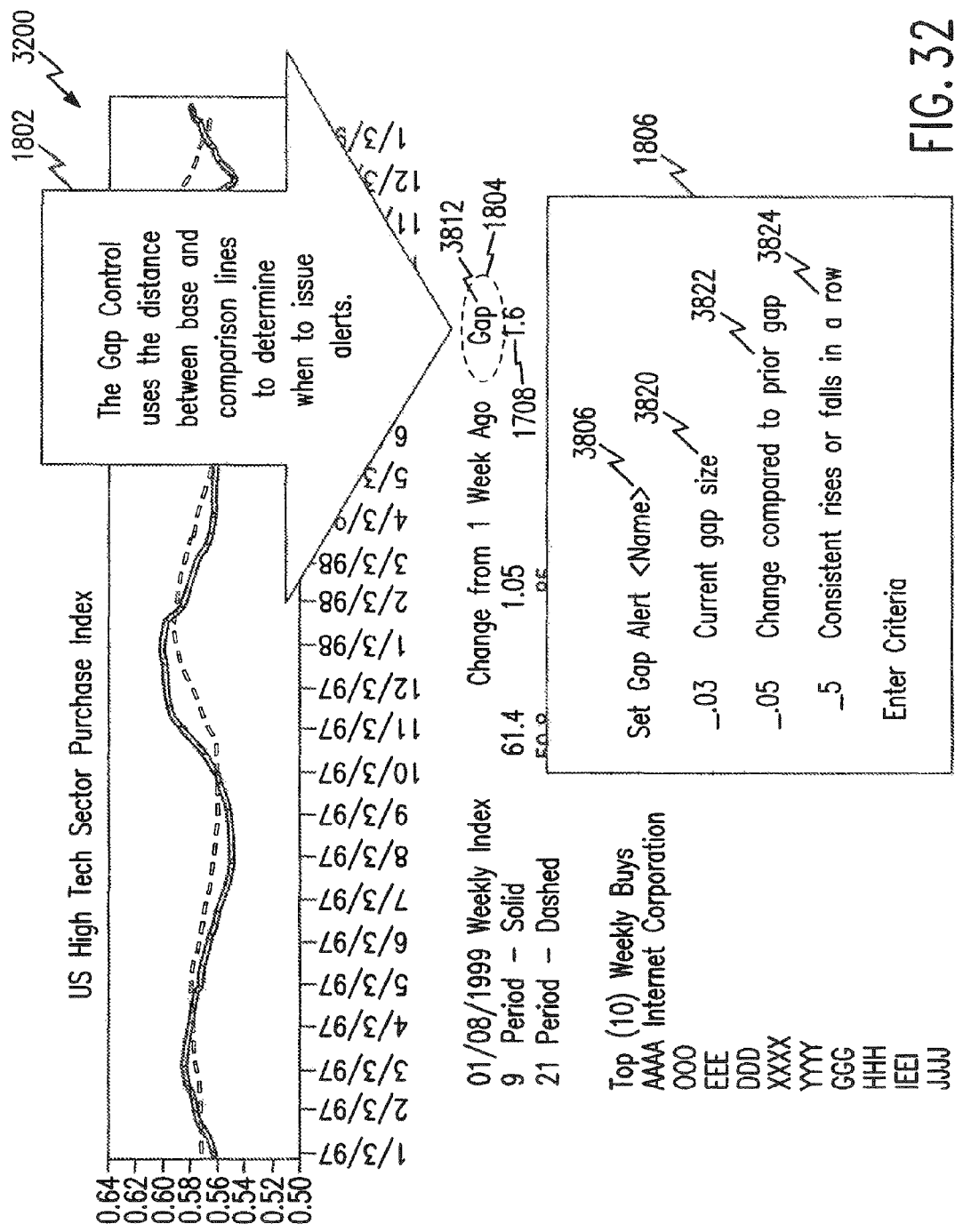
FIG. 32 is a diagram illustrating an exemplary alert setting based on measurements of the gap.

FIG. 32 illustrates an exemplary alert setting based on measurements of gap 1708. As previously stated, gap is a measure of the amount of variation between the 9 period and the 21 period graphical results. The desired parameter to be changed is gap measurement 3812. Positioning the cursor within or in close proximity to the word "Gap" and right clicking using the mouse causes display arrow 1802 to appear. The area surrounding the word "Gap" is now hot spot 1804. Hot spot 1804 is shown in phantom. The user can also position the cursor within hot spot 1804 and left click the mouse to cause control selection window 1806 to appear. Control selection window 1806 provides a list of all of the selections of the desired gap measurement 3812 which can be chosen by the user. Gap measurement 3812 parameters include: (1) Current gap size 3820; (2) Change compared to prior gap 3822; and (3) Consistent rises or falls in a row 3824. User 3702 can select the desired gap measurement 3812 by double clicking the mouse on the desired selection and entering the amount desired. A title field for alert name 3806 can be customized by user 3702 so that on receipt of the alert email, user 3702 can immediately identify the alert setting by name. Double clicking on "Enter Criteria" will update alert controls data 3506 and cause display arrow 1802 and control selection window 1806 to disappear.

V. ENVIRONMENT

Figure 33:
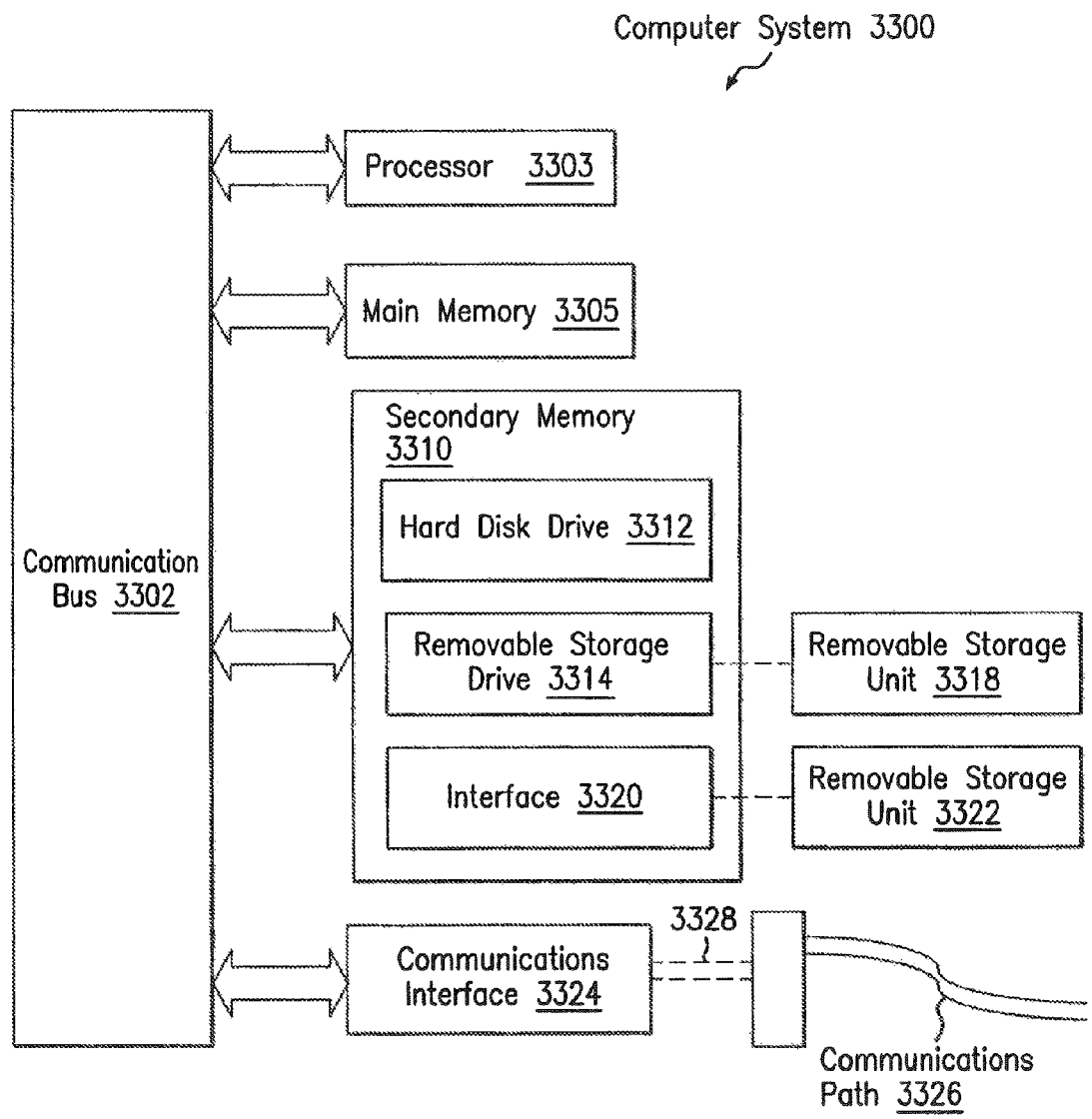
FIG. 33 is a diagram illustrating an exemplary computer system.

The present invention (i.e., aggregator 104, moving average generator 108, user interface delivery module 116, or any part thereof) may be implemented using hardware, software, or a combination thereof and may be implemented in one or more computer systems or other processing systems. In fact, in one embodiment, the invention is directed toward one or more computer systems capable of carrying out the functionality described herein. An example of a computer system 3300 is shown in FIG. 33. The computer system 3300 includes one or more processors, such as processor 3303. The processor 3303 is connected to a communication bus 3302. Various software embodiments are described in terms of this exemplary computer system. After reading this description, it will be apparent to a person skilled in the relevant art how to implement the invention using other computer systems and/or computer architectures.

Computer system 3300 also includes a main memory 3305, preferably random access memory (RAM), and may also include a secondary memory 3310. The secondary memory 3310 may include, for example, a hard disk drive 3312 and/or a removable storage drive 3314, representing a floppy disk drive, a magnetic tape drive, an optical disk drive, etc. The removable storage drive 3314 reads from and/or writes to a removable storage unit 3318 in a well-known manner. Removable storage unit 3318, represents a floppy disk, magnetic tape, optical disk, etc., which is read by and written to by removable storage drive 3314. As will be appreciated, the removable storage unit 3318 includes a computer usable storage medium having stored therein computer software and/or data.

In alternative embodiments, secondary memory 3310 may include other similar means for allowing computer programs or other instructions to be loaded into computer system 3300. Such means may include, for example, a removable storage unit 3322 and an interface 3320. Examples of such may include a program cartridge and cartridge interface (such as that found in video game devices), a removable memory chip (such as an EPROM, or PROM) and associated socket, and other removable, storage units 3322 and interfaces 3320 which allow software and data to be transferred from the removable storage unit 3322 to computer system 3300.

Computer system 3300 may also include a communications interface 3324. Communications interface 3324 allows software and data to be transferred between computer, system 3300 and, external devices. Examples of communications interface 3324 may include a modem, a network interface (such as an Ethernet card), a communications port, a PCMCIA slot and card, etc. Software and data transferred via communications interface 3324 are in the form of signals 3328 which may be electronic, electromagnetic, optical, or other signals capable of being received by communications interface 3324. These signals 3328 are provided to communications interface 3324 via a communications path (i.e., channel) 3324. This channel 3326 carries signals 3328 and may be implemented using wire or cable, fiber optics, a phone line, a cellular phone link, an RF link, and other communications channels.

In this document, the term "computer program product" refers to removable storage units 3318, 3322, and signals 3328. These computer program products are means for providing software to computer system 3300. The invention is directed to such computer program products.

Computer programs (also called computer control logic) are stored in main memory 3305, and/or secondary memory 3310 and/or in computer program products. Computer programs may also be received via communications interface 3324. Such computer programs, when executed, enable the computer system 3300 to perform the features of the present invention as discussed herein. In particular, the computer programs, when executed, enable the processor 3303 to perform the features of the present invention. Accordingly, such computer programs represent controllers of the computer system 3300.

In an embodiment where the invention is implemented using software, the software may be stored in a computer program product and loaded into computer system 3300 using removable storage drive 3314, hard drive 3312 or communications interface 3324. The control logic (software), when executed by the processor 3303, causes the processor 3303 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

VI. CONCLUSION

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A system for providing a stock purchase index, comprising:
   a processor; and
   a computer-readable storage medium, the computer-readable storage medium having instructions stored thereon that, when executed, cause the processor to:
   receive raw customer trading data;
   segregate the raw customer trading data into buy and sell data;
   sort the buy and sell data per CUSIP to determine a number of buy CUSIP shares, a number of sell CUSIP shares, a total buy CUSIP market value, a total sell CUSIP market value, a total number of buy accounts, and a total number of sell accounts;
   process the sorted data using the processor to produce a stock purchase index, wherein the stock purchase index is a sell weighted index; and
   display the sell weighted index in a stock purchase index report, wherein the instructions that cause the processor to process comprise instructions that, when executed, cause the processor to:
   initialize a total buy weight and a total sell weight;
   determine an average buy price and an average sell price, wherein the average buy price is the ratio of the total buy CUSIP market value to the number of buy CUSIP shares, and wherein the average sell price is the ratio of the total sell CUSIP market value to the number of sell CUSIP shares;
   determine a buy weight and a sell weight, wherein the buy weight is the average buy price times the total number of buy accounts, and wherein the sell weight is the average sell price times the total number of sell accounts;
   increment the total buy weight and the total sell weight, wherein the total buy weight is incremented by adding the buy weight for each CUSIP to the total buy weight counter, and wherein the total sell weight is incremented by adding the sell weight for each CUSIP to the total sell weight counter;
   determine a total weight, wherein the total weight is the total buy weight plus the total sell weight; and
   determine the sell weighted index, wherein the sell weighted index is the ratio of the total sell weight to the total weight.

2. A system for providing a stock purchase index, comprising:
   a processor; and
   a computer-readable storage medium, the computer-readable storage medium having instructions stored thereon that, when executed, cause the processor to:
   receive raw customer trading data;
   segregate the raw customer trading data into buy and sell data;
   sort the buy and sell data to determine a total number of buy accounts, a total number of sell accounts and a total number of investors, wherein the total number of investors is determined by the total number of buy accounts plus the total number of sell accounts;
   process the sorted data using the processor to produce a stock purchase index, wherein the stock purchase index is a buy simple index, wherein the buy simple index is the ratio of the total number of buy accounts to the total number of investors, thereby providing a measurement of investor purchasing participation; and
   display the buy simple index in a stock purchase index report.

3. A system for providing a stock purchase index, comprising:
   a processor; and
   a computer-readable storage medium, the computer-readable storage medium having instructions stored thereon that, when executed, cause the processor to:
   receive raw customer trading data;
   segregate the raw customer trading data into buy and sell data;
   sort the buy and sell data per CUSIP to determine a number of buy CUSIP shares, a number of sell CUSIP shares, a total buy CUSIP market value, a total sell CUSIP market value, a total number of buy accounts, and a total number of sell accounts;
   process the sorted data using the processor to produce a stock purchase index, wherein the stock purchase index is a buy weighted index; and
   display the buy weighted index in a stock purchase index report, wherein the instructions that cause the processor to process comprise instructions that, when executed, cause the processor to:
   initialize a total buy weight and a total sell weight;
   determine an average buy price and an average sell price, wherein the average buy price is the ratio of the total buy CUSIP market value to the number of buy CUSIP shares, and wherein the average sell price is the ratio of the total sell CUSIP market value to the number of sell CUSIP shares;
   determine a buy weight and a sell weight, wherein the buy weight is the total buy CUSIP market value times the total number of buy accounts, and wherein the sell weight is the total sell CUSIP market value times the total number of sell accounts;
   increment the total buy weight and the total sell weight, wherein the total buy weight is incremented by adding the buy weight of each CUSIP to the total buy weight counter, and wherein the total sell weight is incremented by adding the sell weight of each CUSIP to the total sell weight counter;
   determine a total weight, wherein the total weight is the total buy weight plus the total sell weight; and
   determine the buy weighted index, wherein the buy weighted index is the ratio of the total buy weight to the total weight.

* * * * *